US010295893B2

(12) United States Patent
Terashima

(10) Patent No.: US 10,295,893 B2
(45) Date of Patent: May 21, 2019

(54) DISCHARGE LAMP DRIVING DEVICE, LIGHT SOURCE DEVICE, PROJECTOR, AND DISCHARGE LAMP DRIVING METHOD

(71) Applicant: SEIKO EPSON CORPORATION, Tokyo (JP)

(72) Inventor: Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 250 days.

(21) Appl. No.: 15/448,311

(22) Filed: Mar. 2, 2017

(65) Prior Publication Data
US 2017/0277032 A1  Sep. 28, 2017

(30) Foreign Application Priority Data

Mar. 23, 2016 (JP) ................. 2016-058101
Mar. 23, 2016 (JP) ................. 2016-058105
Mar. 23, 2016 (JP) ................. 2016-058106

(51) Int. Cl.
*G03B 21/20* (2006.01)
*H05B 41/36* (2006.01)
(Continued)

(52) U.S. Cl.
CPC ..... *G03B 21/2053* (2013.01); *G03B 21/2026* (2013.01); *H05B 41/2887* (2013.01); *H05B 41/36* (2013.01); *G03B 21/005* (2013.01)

(58) Field of Classification Search
CPC ............ H05B 41/2928; H05B 41/2883; H05B 41/2886; G03B 21/00; G03B 21/2026; G03B 20/208
(Continued)

(56) References Cited

U.S. PATENT DOCUMENTS 6,670,780 B2   12/2003 Ono et al.
8,378,581 B2   2/2013 Terashima
(Continued)

FOREIGN PATENT DOCUMENTS

JP     3893042 B2    3/2007
JP   2007-515047 A   6/2007
(Continued)

*Primary Examiner* — Wei (Victor) Chan
(74) *Attorney, Agent, or Firm* — Oliff PLC

(57) ABSTRACT

A discharge lamp driving device includes a discharge lamp driving section configured to supply a driving current to a discharge lamp, a control section configured to control the discharge lamp driving section, and a voltage detecting section configured to detect an inter-electrode voltage. The control section supplies a driving current including a first alternating current when the inter-electrode voltage is equal to or higher than a first voltage, supplies a driving current including a second alternating current having a frequency which is lower than a frequency of the first alternating current when the inter-electrode voltage is lower than the first voltage and equal to or higher than a second voltage lower than the first voltage, and supplies a driving current including a third alternating current having a frequency which is higher than the frequency of the first alternating current when the inter-electrode voltage is lower than the second voltage.

24 Claims, 19 Drawing Sheets

(51) Int. Cl.
*H05B 41/288* (2006.01)
*G03B 21/00* (2006.01)

(58) Field of Classification Search
USPC ... 315/287, 291, 300, 302, 360, 312, 209 R, 315/307, 246
See application file for complete search history.

(56) References Cited

U.S. PATENT DOCUMENTS

| | | |
|---|---|---|
| 8,797,313 B2 | 8/2014 | Soma et al. |
| 2003/0001518 A1 | 1/2003 | Riederer |
| 2003/0080693 A1 | 5/2003 | Ono et al. |
| 2005/0206326 A1* | 9/2005 | Suzuki .................. H01J 61/20 |
| | | 315/246 |
| 2007/0194723 A1 | 8/2007 | Pekarski et al. |
| 2010/0141634 A1 | 6/2010 | Soma et al. |
| 2011/0018456 A1 | 1/2011 | Terashima |
| 2016/0270196 A1 | 9/2016 | Sato |
| 2016/0270197 A1 | 9/2016 | Sato et al. |

FOREIGN PATENT DOCUMENTS

| | | |
|---|---|---|
| JP | 4436605 B2 | 3/2010 |
| JP | 2010-157482 A | 7/2010 |
| JP | 5333764 B2 | 11/2013 |
| JP | 2016-162613 A | 9/2016 |
| JP | 2016-167345 A | 9/2016 |
| JP | 2016-167346 A | 9/2016 |
| JP | 2016-167347 A | 9/2016 |

\* cited by examiner

DISCHARGE LAMP DRIVING DEVICE, LIGHT SOURCE DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

There has been known a configuration for changing a normal operation mode according to a combustion voltage of a lamp. For example, in JP-T-2007-515047 (Patent Literature 1), when the combustion voltage is higher than a first limit value, a first normal operation mode having a first operating frequency works and, when the combustion voltage decreases to be equal to or lower than the first limit value, a second normal operation mode having a second operating frequency higher than the first operating frequency works. When the combustion voltage decreases to be equal to or lower than a second limit value smaller than the first limit value, a third normal operation mode having a third operating frequency lower than the first operating frequency works.

However, when the combustion voltage decreases to be equal to or lower than the first limit value, if the lamp is driven at the second operating frequency higher than the first operating frequency, protrusions at electrode distal ends are reduced in thickness and size. Deterioration of the lamp is sometimes accelerated.

When the combustion voltage further decreases to be equal to or lower than the second limit value, if the lamp is driven at the third operating frequency lower than the first operating frequency, the protrusions at the electrode distal ends, which are reduced in thickness and size in the second normal operation mode, disappear. A sudden increase in the combustion voltage is sometimes caused. Consequently, a flicker sometimes occurs. Tungsten of the disappeared protrusions sometimes adheres to a sealing body of the lamp to cause blackening and devitrification. Therefore, in the driving method, there is a problem in that the life of a discharge lamp decreases.

SUMMARY

An advantage of some aspects of the invention is to provide a discharge lamp driving device that can improve the life of a discharge lamp, a light source device including the discharge lamp driving device, a projector including the light source device, and a discharge lamp driving method that can improve the life of a discharge lamp.

A discharge lamp driving device according to an aspect of the invention includes: a discharge lamp driving section configured to supply a driving current to a discharge lamp including a first electrode and a second electrode; a control section configured to control the discharge lamp driving section; and a voltage detecting section configured to detect an inter-electrode voltage of the discharge lamp. The control section is configured to supply the discharge lamp with a driving current including a first alternating current when the inter-electrode voltage is equal to or higher than a first voltage. The control section is configured to supply the discharge lamp with a driving current including a second alternating current having a frequency which is lower than a frequency of the first alternating current when the inter-electrode voltage is lower than the first voltage and equal to or higher than a second voltage lower than the first voltage. The control section is configured to supply the discharge lamp with a driving current including a third alternating current having a frequency which is higher than the frequency of the first alternating current when the inter-electrode voltage is lower than the second voltage.

In the discharge lamp driving device according to the aspect of the invention, when the inter-electrode voltage is lower than the first voltage, the driving current including the second alternating current, the frequency of which is lower than the frequency of the first alternating current, is supplied to the discharge lamp. Therefore, a melting degree of a protrusion of the first electrode and a protrusion of the second electrode increases. It is possible to form the protrusions thick and large. Consequently, it is possible to suppress deterioration of the discharge lamp from being accelerated. Since the melting degree of the protrusions increases, an inter-electrode distance increases. Therefore, the inter-electrode voltage easily increases.

When the inter-electrode voltage further decreases, if the inter-electrode voltage is lower than the second voltage lower than the first voltage, the driving current including the third alternating current, the frequency of which is higher than the frequency of the first alternating current, is supplied to the discharge lamp. Consequently, it is possible to increase the inter-electrode voltage while suppressing the protrusions from being flattened.

As explained above, with the discharge lamp driving device according to the aspect of the invention, when the inter-electrode voltage is lower than the first voltage, it is possible to increase the inter-electrode voltage and suppress the inter-electrode voltage from becoming excessively low while stably forming the protrusions. Therefore, it is possible to make it easy to maintain the inter-electrode voltage while suppressing the deterioration of the discharge lamp from being accelerated. As a result, it is possible to improve the life of the discharge lamp.

The frequency of the second alternating current may be a first low frequency lower than a first frequency of the first alternating current when the inter-electrode voltage is lower than the first voltage and is equal to or higher than the second voltage. The frequency of the second alternating current may be a second low frequency lower than the first low frequency when the inter-electrode voltage is lower than a third voltage lower than the second voltage, and then the control section supplies a driving current including the second alternating current having the second low frequency to the discharge lamp.

With this configuration, when the inter-electrode voltage further decreases, it is easier to increase the inter-electrode voltage.

The frequency of the third alternating current may be a first high frequency higher than the first frequency when the inter-electrode voltage is lower than the second voltage and equal to or higher than the third voltage. The frequency of the third alternating current may be a second high frequency higher than the first high frequency when the inter-electrode voltage is lower than a fourth voltage lower than the third voltage, and then the control section supplies a driving current including the third alternating current having the second high frequency to the discharge lamp.

With this configuration, when the inter-electrode voltage further decreases, it is easier to increase the inter-electrode voltage.

The frequency of the second alternating current may decrease, as driving power supplied to the discharge lamp is smaller.

With this configuration, it is possible to suitably suppress a decrease of the inter-electrode voltage in a low power mode in which the driving power is relatively low and the protrusions easily grow.

The frequency of the third alternating current may increase, as driving power supplied to the discharge lamp is smaller.

With this configuration, it is possible to suitably suppress a decrease of the inter-electrode voltage in a low power mode in which the driving power is relatively low and the protrusions easily grow.

A discharge lamp driving device according to an aspect of the invention includes: a discharge lamp driving section configured to supply a driving current to a discharge lamp including a first electrode and a second electrode; a control section configured to control the discharge lamp driving section; and a voltage detecting section configured to detect an inter-electrode voltage of the discharge lamp. The control section is configured to alternately provide a first period including a first direct current period in which a direct current having a first polarity is supplied to the discharge lamp and a first alternating current period in which an alternating current is supplied to the discharge lamp and a second period including a second direct current period in which a direct current having a second polarity is supplied to the discharge lamp and a second alternating current period in which the alternating current is supplied to the discharge lamp. Length of a direct current period including the first direct current period and the second direct current period is a first length when the inter-electrode voltage is equal to or higher than a first voltage. The length of the direct current period is larger than the first length when the inter-electrode voltage is lower than the first voltage and equal to or higher than a second voltage lower than the first voltage. The length of the direct current period is smaller than the first length when the inter-electrode voltage is lower than the second voltage.

With the discharge lamp driving device according to the aspect of the invention, the length of the direct current period is larger than the first length when the inter-electrode voltage is lower than the first voltage. Therefore, a melting degree of a protrusion of the first electrode and the second electrode increases. It is possible to form the protrusions thick and large. Consequently, it is possible to suppress deterioration of the discharge lamp from being accelerated. Since the melting degree of the protrusions increases, an inter-electrode distance increases. Therefore, the inter-electrode voltage easily increases.

When the inter-electrode voltage further decreases, if the inter-electrode voltage is lower than the second voltage lower than the first voltage, the length of the direct current period is smaller than the first length. Therefore, a ratio of the alternating current period in the driving current increases. It is possible to increase the inter-electrode voltage while suppressing the protrusions from being flattened.

As explained above, with the discharge lamp driving device according to the aspect of the invention, when the inter-electrode voltage is lower than the first voltage, it is possible to increase the inter-electrode voltage and suppress the inter-electrode voltage from becoming excessively low while stably forming the protrusions. Therefore, it is easy to maintain the inter-electrode voltage while suppressing the deterioration of the discharge lamp from being accelerated. As a result, it is possible to improve the life of the discharge lamp.

The length of the direct current period may be a first high-heat-load length larger than the first length when the inter-electrode voltage is lower than the first voltage and equal to or higher than the second voltage. The length of the direct current period may be a second high-heat-load length larger than the first high-heat-load length when the inter-electrode voltage is lower than a third voltage lower than the second voltage.

With this configuration, when the inter-electrode voltage further decrease, it is easier to increase the inter-electrode voltage.

The length of the direct current period may be a first low-heat-load length smaller than the first length when the inter-electrode voltage is lower than the second voltage and equal to or higher than the third voltage. The length of the direct current period may be a second low-heat-load length smaller than the first low-heat-load length when the inter-electrode voltage is lower than a fourth voltage lower than the third voltage.

With this configuration, when the inter-electrode voltage further decreases, it is easier to increase the inter-electrode voltage.

The first direct current period and the second direct current period may be alternately provided across the first alternating current period or the second alternating current period.

With this configuration, it is possible to stably maintain the protrusions in both of the first electrode and the second electrode.

The first period may include a first biased period consisting of a plurality of the first direct current periods and a first opposite polarity period in which the direct current having the second polarity is supplied to the discharge lamp, the first opposite polarity period provided between the first direct current periods. The second period may include a second biased period consisting of a plurality of the second direct current periods and a second opposite polarity period in which the direct current having the first polarity is supplied to the discharge lamp, the second opposite polarity period provided between the second direct current periods. Length of the first opposite polarity may be smaller than length of the first direct current period and smaller than 0.5 ms. Length of the second opposite polarity period may be smaller than length of the second direct current period and smaller than 0.5 ms.

With this configuration, it is possible to increase the length of the direct current period while suppressing the temperature of the electrode on a side functioning as a cathode from excessively decreasing.

When the inter-electrode voltage is lower than the first voltage and equal to or higher than the second voltage, at least one of a number of the first direct current periods included in the first biased period and a number of the second direct current periods included in the second biased period may be larger than both a number of the first direct current periods included in the first biased period and a number of the second direct current periods included in the second biased period when the inter-electrode voltage is equal to or higher than the first voltage. When the inter-electrode voltage is lower than the second voltage, at least one of the number of the first direct current periods included in the first biased period and the number of the second direct current periods included in the second biased period may be smaller than both the number of the first direct current periods included in the first biased period and the number of the second direct current periods included in the second biased period when the inter-electrode voltage is equal to or higher than the first voltage.

With this configuration, it is possible to change the length of the direct current period without changing the length of the first direct current period and the length of the second direct current period.

Length of the direct current period when the length of the direct current period is larger than the first length may increase, as driving power supplied to the discharge lamp is smaller.

With this configuration, it is possible to suitably suppress a decrease of the inter-electrode voltage in a low power mode in which the driving power is relatively low and the protrusions easily grow.

Length of the direct current period when the length of the direct current period is smaller than the first length may decrease, as driving power supplied to the discharge lamp is smaller.

With this configuration, it is possible to suitably suppress a decrease of the inter-electrode voltage in a low power mode in which the driving power is relatively low and the protrusions easily grow.

A discharge lamp driving device according to another aspect of the invention includes: a discharge lamp driving section configured to supply a driving current to a discharge lamp including a first electrode and a second electrode; a control section configured to control the discharge lamp driving section; and a voltage detecting section configured to detect an inter-electrode voltage of the discharge lamp. The control section is configured to provide a third alternating current period alternately including a fourth alternating current period in which a fourth alternating current is supplied to the discharge lamp and a fifth alternating current period in which a fifth alternating current having a frequency which is lower than a frequency of the fourth alternating current is supplied to the discharge lamp. A ratio of the fifth alternating current period in the third alternating current period is a first ratio when the inter-electrode voltage is equal to or higher than a first voltage. The ratio of the fifth alternating current period is larger than the first ratio when the inter-electrode voltage is lower than the first voltage and equal to or higher than a second voltage lower than the first voltage. The ratio of the fifth alternating current period is smaller than the first ratio when the inter-electrode voltage is lower than the second voltage.

With the discharge lamp driving device according to the aspect of the invention, when the inter-electrode voltage is lower than the first voltage, the ratio of the fifth alternating current period is larger than the first ratio. In the fifth alternating current period, the fifth alternating current, the frequency of which is lower than frequency of the fourth alternating current, is supplied to the discharge lamp. Therefore, a melting degree of a protrusion of the first electrode and a protrusion of the second electrode increases. It is possible to form the protrusions thick and large. Consequently, it is possible to suppress deterioration of the discharge lamp from being accelerated. Since the melting degree of the protrusions increases, an inter-electrode distance increases. Therefore, the inter-electrode voltage easily increases.

When the inter-electrode voltage further decreases, if the inter-electrode voltage is lower than the second voltage lower than the first voltage, the ratio of the fifth alternating current period is smaller than the first ratio. Therefore, an average frequency in the driving current increases. It is possible to increase the inter-electrode voltage while suppressing the protrusions from being flattened.

As explained above, with the discharge lamp driving device according to the aspect of the invention, when the inter-electrode voltage is lower than the first voltage, it is possible to increase the inter-electrode voltage and suppress the inter-electrode voltage from becoming excessively low while stably forming the protrusions. Therefore, it is easy to maintain the inter-electrode voltage while suppressing deterioration of the discharge lamp from being accelerated. As a result, it is possible to improve the life of the discharge lamp.

The ratio of the fifth alternating current period may be a first high-heat-load ratio larger than the first ratio when the inter-electrode voltage is lower than the first voltage and equal to or higher than the second voltage. The ratio of the fifth alternating current period may be a second high-heat-load ratio larger than the first high-heat-load ratio when the inter-electrode voltage is lower than a third voltage lower than the second voltage.

With this configuration, when the inter-electrode voltage further decreases, it is easier to increase the inter-electrode voltage.

The ratio of the fifth alternating current period may be a first low-heat-load ratio smaller than the first ratio when the inter-electrode voltage is lower than the second voltage and equal to or higher than the third voltage. The ratio of the fifth alternating current period may be a second low-heat-load ratio smaller than the first low-heat-load ratio when the inter-electrode voltage is lower than a fourth voltage lower than the third voltage.

With this configuration, when the inter-electrode voltage further decreases, it is easier to increase the inter-electrode voltage.

The control section may change the ratio of the fifth alternating current period by changing length of the fourth alternating current period.

With this configuration, it is possible to change an interval for providing the fifth alternating current period to increase a heat load applied to the electrodes.

The fourth alternating current period may include a plurality of periods in which frequencies of the fourth alternating current are different from one another.

With this configuration, it is easier to grow the protrusions.

The fifth alternating current in a half cycle may be supplied to the discharge lamp in the fifth alternating current period.

With this configuration, an electrode heated in one fifth alternating current period can be set to only one of the first electrode and the second electrode. Consequently, in the fifth alternating current period, it is possible to further increase a melting degree of the electrodes.

The fifth alternating current period may include a first polarity period in which the fifth alternating current in a half cycle having a first polarity is supplied to the discharge lamp and a second polarity period in which the fifth alternating current in a half cycle having a second polarity is supplied to the discharge lamp. The first polarity period and the second polarity period may be alternately provided across the fourth alternating current period.

With this configuration, it is possible to stably maintain the protrusions in both of the first electrode and the second electrode.

A frequency of the fifth alternating current may be a second frequency when the inter-electrode voltage is equal to or higher than the first voltage. The frequency of the fifth alternating current may be lower than the second frequency when the inter-electrode voltage is lower than the first voltage and equal to or higher than the second voltage. The frequency of the fifth alternating current may be higher than the second frequency when the inter-electrode voltage is lower than the second voltage.

With this configuration, it is possible to change a heat load per time applied to the electrodes in the fifth alternating current period. Therefore, it is easy to adjust a heat load applied to the electrodes.

A ratio of the fifth alternating current period when the ratio of the fifth alternating current period is larger than the first ratio may increase, as driving power supplied to the discharge lamp is smaller.

With this configuration, it is possible to suitably suppress a decrease of the inter-electrode voltage in a low power mode in which driving power is relatively low and the protrusions easily grow.

A ratio of the fifth alternating current period when the ratio of the fifth alternating current period is smaller than the first ratio may decrease, as driving power supplied to the discharge lamp is smaller.

With this configuration, it is possible to suitably suppress a decrease of the inter-electrode voltage in a low power mode in which driving power is relatively low and the protrusions easily grow.

A light source device according to an aspect of the invention includes: a discharge lamp configured to emit light; and the discharge lamp driving device explained above.

With the light source device according to the aspect of the invention, since the light source device includes the discharge lamp driving device, it is possible to improve the life of the discharge lamp.

A projector according to an aspect of the invention includes: the light source device explained above; a light modulating device configured to modulate, according to an image signal, light emitted from the light source device; and a projection optical system configured to project the light modulated by the light modulating device.

With the projector according to the aspect of the invention, since the projector includes the light source device, it is possible to improve the life of the discharge lamp.

A discharge lamp driving method according to an aspect of the invention is a discharge lamp driving method for supplying a driving current to a discharge lamp including a first electrode and a second electrode and driving the discharge lamp, the discharge lamp driving method including: supplying a driving current including a first alternating current to the discharge lamp when an inter-electrode voltage of the discharge lamp is equal to or higher than a first voltage; supplying a driving current including a second alternating current having a frequency which is lower than a frequency of the first alternating current, to the discharge lamp when the inter-electrode voltage is lower than the first voltage and equal to or higher than a second voltage lower than the first voltage; and supplying a driving current including a third alternating current having a frequency which is higher than the frequency of the first alternating current, to the discharge lamp when the inter-electrode voltage is lower than the second voltage.

With the discharge lamp driving method according to the aspect of the invention, as explained above, it is possible to improve the life of the discharge lamp.

A discharge lamp driving method according to an aspect of the invention is a discharge lamp driving method for supplying a driving current to a discharge lamp including a first electrode and a second electrode and driving the discharge lamp, the discharge lamp driving method including: supplying, to the discharge lamp, the driving current alternately including a first period including a first direct current period in which a direct current having a first polarity is supplied to the discharge lamp and a first alternating current period in which an alternating current is supplied to the discharge lamp and a second period including a second direct current period in which a direct current having a second polarity is supplied to the discharge lamp and a second alternating current period in which the alternating current is supplied to the discharge lamp; setting length of a direct current period including the first direct current period and the second direct current period to a first length when an inter-electrode voltage of the discharge lamp is equal to or higher than a first voltage; setting the length of the direct current period to be larger than the first length when the inter-electrode voltage is lower than the first voltage and equal to or higher than a second voltage lower than the first voltage; and setting the length of the direct current period to be smaller than the first length when the inter-electrode voltage is lower than the second voltage.

With the discharge lamp driving method according to the aspect of the invention, as explained above, it is possible to improve the life of the discharge lamp.

A discharge lamp driving method according to an aspect of the invention is a discharge lamp driving method for supplying a driving current to a discharge lamp including a first electrode and a second electrode and driving the discharge lamp, the discharge lamp driving method including: supplying, to the discharge lamp, the driving current including a third alternating current period alternately including a fourth alternating current period in which a fourth alternating current is supplied to the discharge lamp and a fifth alternating current period in which a fifth alternating current having a frequency which is lower than a frequency of the fourth alternating current is supplied to the discharge lamp; setting a ratio of the fifth alternating current period in the third alternating current period to a first ratio when an inter-electrode voltage of the discharge lamp is equal to or higher than a first voltage; setting the ratio of the fifth alternating current period to be larger than the first ratio when the inter-electrode voltage is lower than the first voltage and equal to or higher than a second voltage lower than the first voltage; and setting the ratio of the fifth alternating current period to be smaller than the first ratio when the inter-electrode voltage is lower than the second voltage.

With the discharge lamp driving method according to the aspect of the invention, as explained above, it is possible to improve the life of the discharge lamp.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
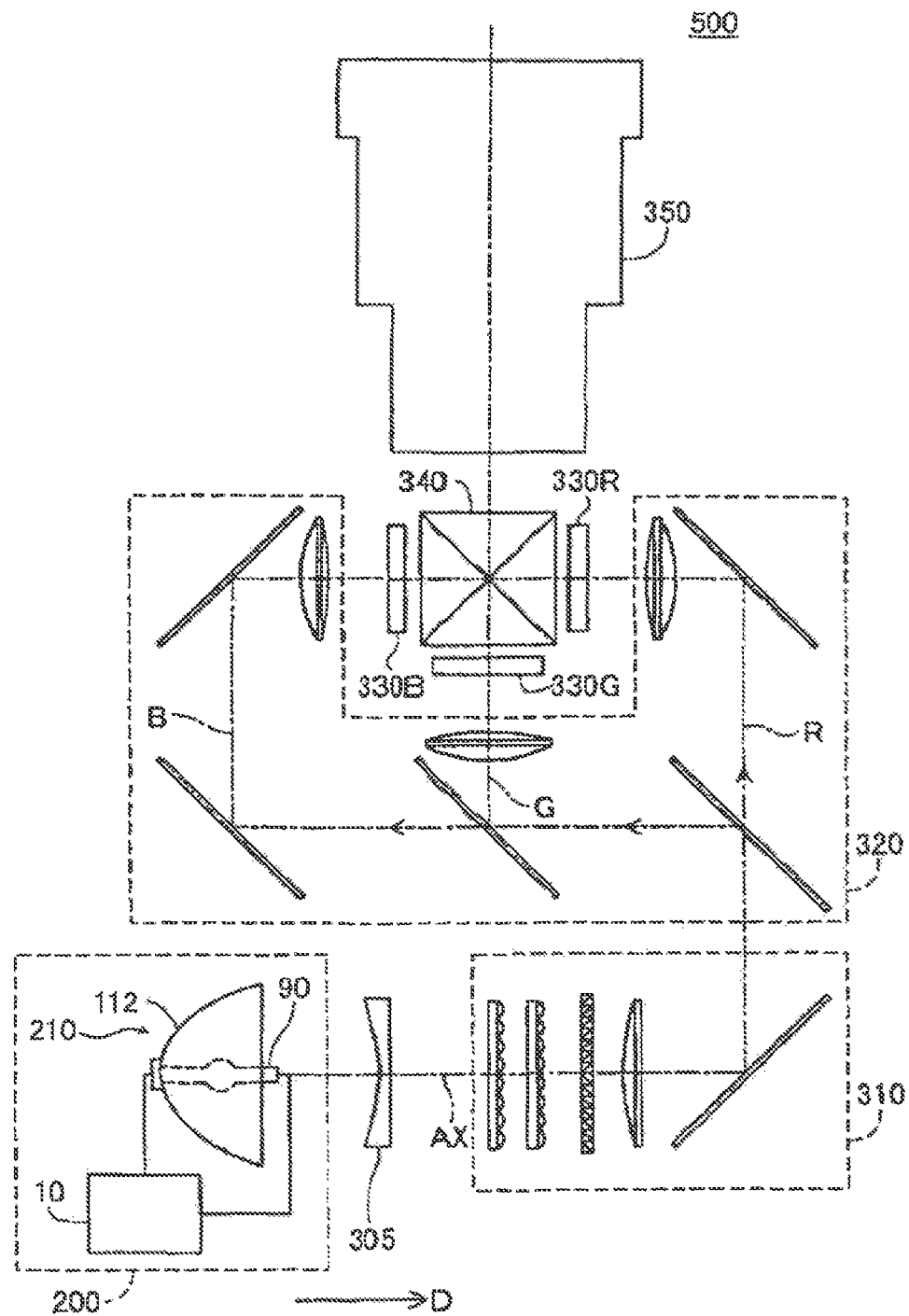
FIG. 1 is a schematic configuration diagram of a projector in a first embodiment.

Projectors according to embodiments of the invention are explained below with reference to the drawings.

Note that the scope of the invention is not limited to the embodiments explained below and can be optionally changed within the scope of the technical idea of the invention. In the drawings referred to below, scales, numbers, and the like in structures are sometimes differentiated from those in actual structures in order to clearly show components.

First Embodiment

As shown in FIG. 1, a projector 500 in this embodiment includes a light source device 200, a collimating lens 305, an illumination optical system 310, a color separation optical system 320, three liquid crystal light valves (light modulating devices) 330R, 330G, and 330B, a cross dichroic prism 340, and a projection optical system 350.

Light emitted from the light source device 200 passes through the collimating lens 305 and is made incident on the illumination optical system 310. The collimating lens 305 collimates the light from the light source device 200.

The illumination optical system 310 adjusts the illuminance of the light emitted from the light source device 200 to be equalized on the liquid crystal light valves 330R, 330G, and 330B. Further, the illumination optical system 310 aligns polarization directions of the light emitted from the light source device 200 in one direction. This is for the purpose of effectively using the light emitted from the light source device 200 in the liquid crystal light valves 330R, 330G, and 330B.

The light with the illuminance distribution and the polarization directions adjusted is made incident on the color separation optical system 320. The color separation optical system 320 separates the incident light into three color lights, that is, red light (R), green light (G), and blue light (B). The three color lights are respectively modulated according to video signals by the liquid crystal light valves 330R, 330G, and 330B associated with the color lights. The liquid crystal light valves 330R, 330G, and 330B include liquid crystal panels 560R, 560G, and 560B explained below and polarizing plates (not shown in the figure). The polarizing plates are disposed on a light incident side and a light emission side of each of the liquid crystal panels 560R, 560G, and 560B.

The modulated three color lights are combined by the cross dichroic prism 340. Combined light is made incident on the projection optical system 350. The projection optical system 350 projects the incident light on a screen 700 (see FIG. 3). Consequently, a video is displayed on the screen 700. Note that well-known configurations can be adopted as the respective configurations of the collimating lens 305, the illumination optical system 310, the color separation optical system 320, the cross dichroic prism 340, and the projection optical system 350.

Figure 2:
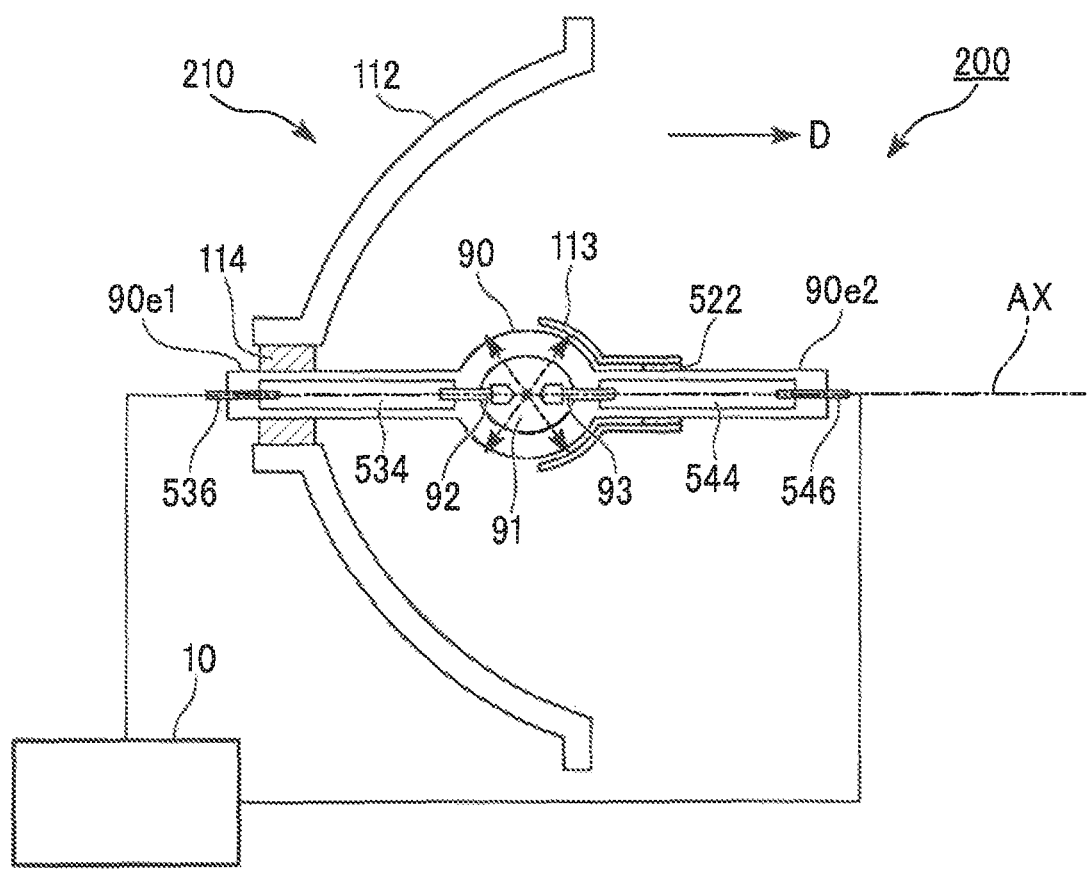
FIG. 2 is a diagram showing a discharge lamp in the first embodiment.

FIG. 2 is a sectional view showing the configuration of the light source device 200. The light source device 200 includes a light source unit 210 and a discharge lamp lighting device (a discharge lamp driving device) 10. In FIG. 2, a sectional view of the light source unit 210 is shown. The light source unit 210 includes a main reflection mirror 112, a discharge lamp 90, and a sub-reflection mirror 113.

The discharge lamp lighting device 10 supplies a driving current I to the discharge lamp 90 and lights the discharge lamp 90. The main reflection mirror 112 reflects light discharged from the discharge lamp 90 toward a radiating direction D. The radiating direction D is parallel to an optical axis AX of the discharge lamp 90.

The shape of the discharge lamp 90 is a bar shape extending along the radiating direction D. One end portion of the discharge lamp 90 is referred to as first end portion 90e1. The other end portion of the discharge lamp 90 is referred to as second end portion 90e2. The material of the discharge lamp 90 is, for example, a translucent material such as quartz glass. The center of the discharge lamp 90 is swelled in a spherical shape. The inside of the discharge lamp 90 is a discharge space 91. In the discharge space 91, gas, which is an electric discharge medium, including rare gas and a metal halogen compound is encapsulated.

The distal ends of a first electrode 92 and a second electrode 93 project into the discharge space 91. The first electrode 92 is disposed on the first end portion 90e1 side of the discharge space 91. The second electrode 93 is disposed on the second end portion 90e2 side of the discharge space 91. The shape of the first electrode 92 and the second electrode 93 are a bar shape extending along the optical axis AX. In the discharge space 91, electrode distal end portions of the first electrode 92 and the second electrode 93 are disposed to be spaced apart by a predetermined distance and opposed to each other. The material of the first electrode 92 and the second electrode 93 is metal such as tungsten.

A first terminal 536 is provided at the first end portion 90e1 of the discharge lamp 90. The first terminal 536 and the first electrode 92 are electrically connected by a conductive member 534 that pierces through the inside of the discharge lamp 90. Similarly, a second terminal 546 is provided at the second end portion 90e2 of the discharge lamp 90. The second terminal 546 and the second electrode 93 are electrically connected by a conductive member 544 that pierces through the inside of the discharge lamp 90. The material of the first terminal 536 and the second terminal 546 is metal such as tungsten. As the material of the conductive members 534 and 544, for example, molybdenum foil is used.

The first terminal 536 and the second terminal 546 are connected to the discharge lamp lighting device 10. The discharge lamp lighting device 10 supplies the driving current I for driving the discharge lamp 90 to the first terminal 536 and the second terminal 546. As a result, arc discharge occurs between the first electrode 92 and the second electrode 93. Light (discharged light) generated by the arc discharge is radiated toward all directions from a discharge position as indicated by broken line arrows.

The main reflection mirror 112 is fixed to the first end portion 90e1 of the discharge lamp 90 by a fixing member 114. The main reflection mirror 112 reflects, toward the radiating direction D, in the discharged light, light traveling toward the opposite side of the radiating direction D. The shape of a reflection surface (a surface on the discharge lamp 90 side) of the main reflection mirror 112 is not particularly limited within a range in which the discharged light can be reflected toward the radiating direction D. For example, the shape may be a spheroidal shape or may be a rotated parabolic shape. For example, when the shape of the reflection surface of the main reflection mirror 112 is the rotated parabolic shape, the main reflection mirror 112 can convert the discharged light into light substantially parallel to the optical axis AX. Consequently, the collimating lens 305 can be omitted.

The sub-reflection mirror 113 is fixed to the second end portion 90e2 side of the discharge lamp 90 by a fixing member 522. The shape of a reflection surface (a surface on the discharge lamp 90 side) of the sub-reflection mirror 113 is a spherical shape surrounding a portion on the second end portion 90e2 side of the discharge space 91. The sub-reflection mirror 113 reflects, toward the main reflection mirror 112, in the discharged light, light traveling toward the opposite side of a side where the main reflection mirror 112 is disposed. Consequently, it is possible to improve efficiency of use of the light radiated from the discharge space 91.

The material of the fixing members 114 and 522 is not particularly limited within a range in which the material is a heat resistant material that can withstand heat generation from the discharge lamp 90. The material is, for example, an inorganic adhesive. A method of fixing the disposition of the main reflection mirror 112 and the sub-reflection mirror 113 and the discharge lamp 90 is not limited to a method of fixing the main reflection mirror 112 and the sub-reflection mirror 113 to the discharge lamp 90. Any method can be adopted. For example, the discharge lamp 90 and the main reflection mirror 112 may be independently fixed to a housing (not shown in the figure) of the projector 500. The same applies to the sub-reflection mirror 113.

A circuit configuration of the projector 500 is explained below.

Figure 3:
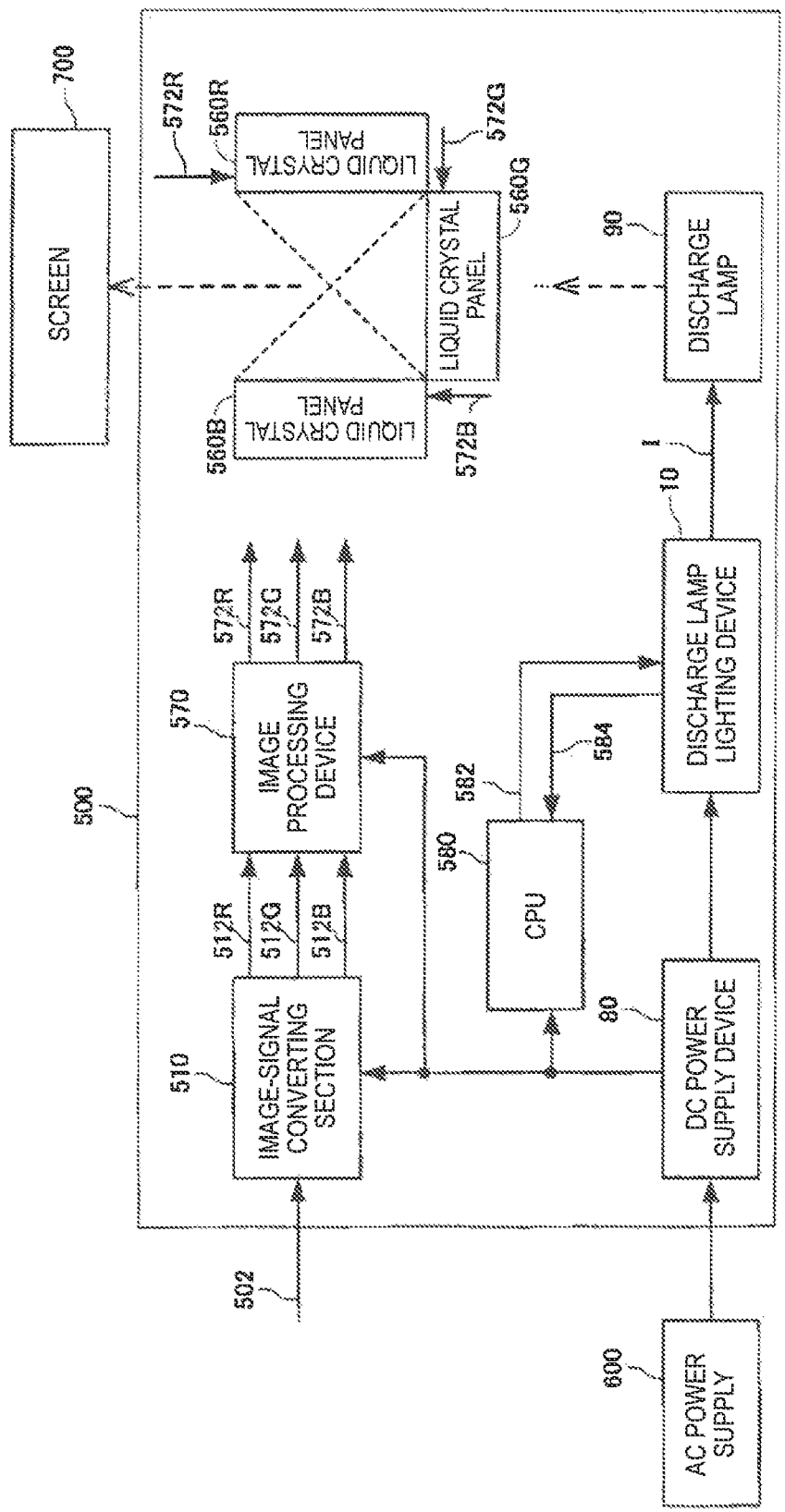
FIG. 3 is a block diagram showing various components of the projector in the first embodiment.

FIG. 3 is a diagram showing the circuit configuration of the projector 500 in this embodiment. The projector 500 includes, besides the optical system shown in FIG. 1, an image-signal converting section 510, a DC power supply device 80, liquid crystal panels 560R, 560G, and 560B, an image processing device 570, and a CPU (Central Processing Unit) 580.

The image-signal converting section 510 converts an image signal 502 (a luminance-color difference signal, an analog RGB signal, etc.) input from the outside into a digital RGB signal having predetermined word length to generate image signals 512R, 512G, and 512B and supplies the image signals 512R, 512G, and 512B to the image processing device 570.

The image processing device 570 performs image processing respectively on the three image signals 512R, 512G, and 512B. The image processing device 570 supplies driving signals 572R, 572G, and 572B for respectively driving the liquid crystal panels 560R, 560G, and 560B to the liquid crystal panels 560R, 560G, and 560B.

The DC power supply device 80 converts an AC voltage supplied from an external AC power supply 600 into a constant DC voltage. The DC power supply device 80 supplies the DC voltage to the image-signal converting section 510 present on a secondary side of a transformer (although not shown in the figure, included in the DC power supply device 80), the image processing device 570, and the discharge lamp lighting device 10 present on a primary side of the transformer.

The discharge lamp lighting device 10 generates a high voltage between the electrodes of the discharge lamp 90 during a start and causes dielectric breakdown to form a discharge path. Thereafter, the discharge lamp lighting device 10 supplies the driving current I for the discharge lamp 90 to maintain electric discharge.

The liquid crystal panels 560R, 560G, and 560B are respectively provided in the liquid crystal light valves 330R, 330G, and 330B explained above. The liquid crystal panels 560R, 560G, and 560B respectively modulate, on the basis of the driving signals 572R, 572G, and 572B, transmittances (luminances) of the color lights made incident on the liquid crystal panels 560R, 560G, and 560B via the optical system explained above.

The CPU 580 controls various operations from a lighting start to extinction of the projector 500. For example, in FIG. 3, the CPU 580 outputs a lighting command and an extinguishing command to the discharge lamp lighting device 10 via a communication signal 582. The CPU 580 receives lighting information of the discharge lamp 90 from the discharge lamp lighting device 10 via a communication signal 584.

The configuration of the discharge lamp lighting device 10 is explained below.

Figure 4:
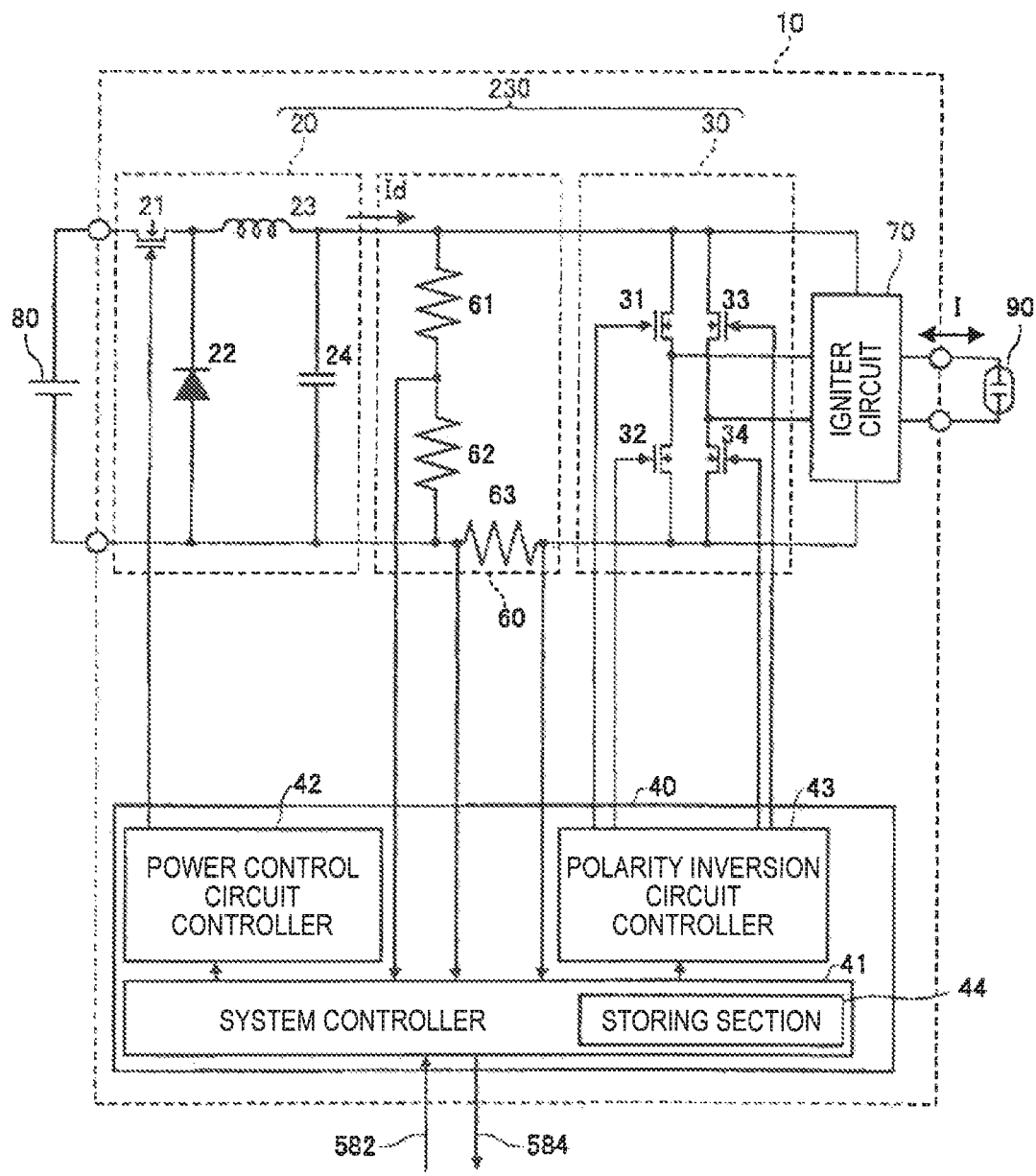
FIG. 4 is a circuit diagram of a discharge lamp lighting device in the first embodiment.

FIG. 4 is a diagram showing an example of a circuit configuration of the discharge lamp lighting device 10.

The discharge lamp lighting device 10 includes, as shown in FIG. 4, a power control circuit 20, a polarity inversion circuit 30, a control section 40, an operation detecting section 60, and an igniter circuit 70.

The power control circuit 20 generates driving power Wd supplied to the discharge lamp 90. In this embodiment, the power control circuit 20 is configured by a down-chopper circuit that receives a voltage from the DC power supply device 80 as an input, steps down the input voltage, and outputs a direct current Id.

The power control circuit 20 includes a switch element 21, a diode 22, a coil 23, and a capacitor 24. The switch element 21 is configured by, for example, a transistor. In this embodiment, one end of the switch element 21 is connected to a positive voltage side of the DC power supply device 80. The other end is connected to a cathode terminal of the diode 22 and one end of the coil 23.

One end of the capacitor 24 is connected to the other end of the coil 23. The other end of the capacitor 24 is connected to an anode terminal of the diode 22 and a negative voltage side of the DC power supply device 80. A current control signal is input to a control terminal of the switch element 21 from the control section 40 explained below and ON/OFF of the switch element 21 is controlled. As the current control signal, for example, a PWM (Pulse Width Modulation) control signal may be used.

When the switch element 21 is turned on, an electric current flows to the coil 23 and energy is accumulated in the coil 23. Thereafter, when the switch element 21 is turned off, the energy accumulated in the coil 23 is emitted through a route passing the capacitor 24 and the diode 22. As a result, the direct current Id corresponding to a ratio of ON time of the switch element 21 is generated.

The polarity inversion circuit 30 inverts, at predetermined timing, the polarity of the direct current Id input from the power control circuit 20. Consequently, the polarity inversion circuit 30 generates the driving current I, which is a direct current continuing for a controlled time, or the driving current I, which is an alternating current having any frequency, and outputs the driving current I. In this embodiment, the polarity inversion circuit 30 is configured by an inverter-bridge circuit (a full-bridge circuit).

The polarity inversion circuit 30 includes a first switch element 31, a second switch element 32, a third switch element 33, and a fourth switch element 34 configured by transistors or the like. The polarity inversion circuit 30 includes a configuration in which the first switch element 31 and the second switch element 32 connected in series and the third switch element 33 and the fourth switch element 34 connected in series are connected in parallel to each other. Polarity inversion control signals are respectively input to control terminals of the first switch element 31, the second switch element 32, the third switch element 33, and the fourth switch element 34 from the control section 40. ON/OFF operation of the first switch element 31, the second switch element 32, the third switch element 33, and the fourth switch element 34 is controlled on the basis of the polarity inversion control signals.

In the polarity inversion circuit 30, operation for alternately turning on and off the first and fourth switch elements 31 and 34 and the second and third switch elements 32 and 33 is repeated. Consequently, the polarity of the direct current Id output from the power control circuit 20 is alternately inverted. The polarity inversion circuit 30 generates the driving current I, which is a direct current that continues the same polarity state for a controlled time, or the driving current I, which is an alternating current having a controlled frequency f, and outputs the driving current I from a common connection point of the first switch element 31 and the second switch element 32 and a common connection point of the third switch element 33 and the fourth switch element 34.

That is, the polarity inversion circuit 30 is controlled such that, when the first switch element 31 and the fourth switch element 34 are on, the second switch element 32 and the third switch element 33 are off and, when the first switch element 31 and the fourth switch element 34 are off, the second switch element 32 and the third switch element 33 are on. Therefore, when the first switch element 31 and the fourth switch element 34 are on, the driving current I flowing from one end of the capacitor 24 to the first switch element 31, the discharge lamp 90, and the fourth switch element 34 in this order is generated. When the second switch element 32 and the third switch element 33 are on, the driving current I flowing from one end of the capacitor 24 to the third switch element 33, the discharge lamp 90, and the second switch element 32 in this order is generated.

In this embodiment, a combined portion of the power control circuit 20 and the polarity inversion circuit 30 corresponds to a discharge lamp driving section 230. That is, the discharge lamp driving section 230 supplies the driving current I for driving the discharge lamp 90 to the discharge lamp 90.

The control section 40 controls the discharge lamp driving section 230. In the example shown in FIG. 4, the control section 40 controls the power control circuit 20 and the polarity inversion circuit 30 to thereby control parameters such as a retention time in which the driving current I continues in the same polarity, a current value of the driving current I (a power value of driving power Wd), and a frequency of the driving current I. The control section 40 performs, on the polarity inversion circuit 30, according to polarity inversion timing for the driving current I, polarity inversion control for controlling the retention time in which the driving current I continues in the same polarity, the frequency of the driving current I, and the like. The control section 40 performs, on the power control circuit 20, current control for controlling a current value of the direct current Id to be output.

The configuration of the control section 40 is not particularly limited. In this embodiment, the control section 40 includes a system controller 41, a power control circuit controller 42, and a polarity inversion circuit controller 43. Note that a part or the entire control section 40 may be configured by a semiconductor integrated circuit.

The system controller 41 controls the power control circuit controller 42 and the polarity inversion circuit controller 43 to thereby control the power control circuit 20 and the polarity inversion circuit 30. The system controller 41 may control the power control circuit controller 42 and the polarity inversion circuit controller 43 on the basis of a lamp voltage (an inter-electrode voltage) Vla detected by the operation detecting section 60 and the driving current I.

In this embodiment, a storing section 44 is connected to the system controller 41.

The system controller 41 may control the power control circuit 20 and the polarity inversion circuit 30 on the basis of information stored in the storing section 44. In the storing section 44, information concerning driving parameters such as a retention time in which the driving current I continues in the same polarity and a current value, a frequency f, a waveform, and a modulation pattern of the driving current I may be stored.

The power control circuit controller 42 outputs a current control signal to the power control circuit 20 on the basis of a control signal from the system controller 41 to thereby control the power control circuit 20.

The polarity inversion circuit controller 43 outputs a polarity inversion control signal to the polarity inversion circuit 30 on the basis of a control signal from the system controller 41 to thereby control the polarity inversion circuit 30.

The control section 40 is realized using a dedicated circuit to be capable of performing the control explained above and various kinds of control of processing explained below. On the other hand, for example, a CPU executes a control program stored in the storing section 44, whereby the control section 40 functions as a computer to be capable of performing the various kinds of control of the processing.

Figure 5:
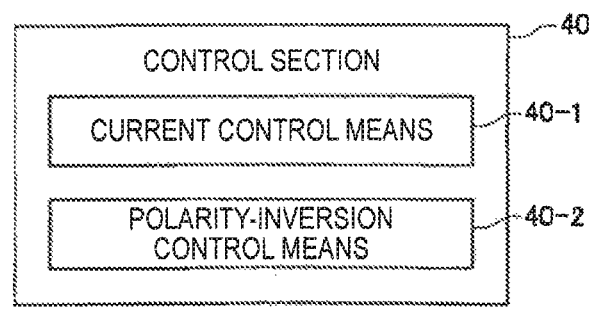
FIG. 5 is a block diagram showing a configuration example of a control section in the first embodiment.

FIG. 5 is a diagram for explaining another configuration example of the control section 40. As shown in FIG. 5, the control section 40 may be configured to function as, according to a control program, a current control unit 40-1 that controls the power control circuit 20 and a polarity inversion control unit 40-2 that controls the polarity inversion circuit 30.

In the example shown in FIG. 4, the control section 40 is configured as a part of the discharge lamp lighting device 10. On the other hand, the CPU 580 may be configured to perform a part of the functions of the control section 40.

In this embodiment, the operation detecting section 60 includes a voltage detecting section that detects the lamp voltage Vla of the discharge lamp 90 and outputs lamp voltage information to the control section 40. The operation detecting section 60 may include a current detecting section that detects the driving current I and outputs driving current information to the control section 40. In this embodiment, the operation detecting section 60 includes a first resistor 61, a second resistor 62, and a third resistor 63.

In this embodiment, the voltage detecting section of the operation detecting section 60 detects the lamp voltage Vla according to voltages divided by the first resistor 61 and the second resistor 62 connected in parallel to the discharge lamp 90 and connected in series to each other. In this embodiment, the current detecting section detects the driving current I according to a voltage generated in the third resistor 63 connected in series to the discharge lamp 90.

The igniter circuit 70 operates only during a lighting start of the discharge lamp 90. The igniter circuit 70 supplies, to between the electrodes (between the first electrode 92 and the second electrode 93) of the discharge lamp 90, a high voltage (a voltage higher than a voltage during normal lighting of the discharge lamp 90) necessary to performing dielectric breakdown to form a discharge path between the electrodes (between the first electrode 92 and the second electrode 93) of the discharge lamp 90 during a lighting start of the discharge lamp 90. In this embodiment, the igniter circuit 70 is connected in parallel to the discharge lamp 90.

Figure 6A:
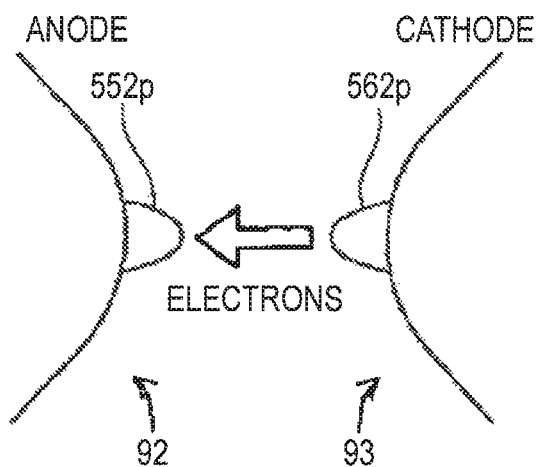
FIG. 6A is a diagram showing a state of protrusions at electrode distal ends of the discharge lamp.
Figure 6B:
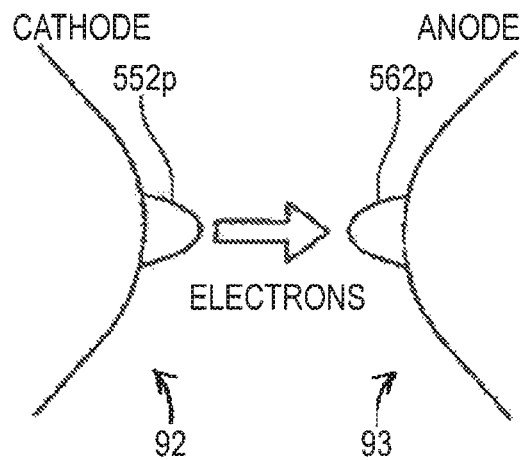
FIG. 6B is a diagram showing a state of the protrusions at the electrode distal ends of the discharge lamp.

In FIGS. 6A and 6B, distal end portions of the first electrode 92 and the second electrode 93 are shown. Protrusions 552p and 562p are respectively formed at the distal ends of the first electrode 92 and the second electrode 93.

Electric discharge that occurs between the first electrode 92 and the second electrode 93 mainly occurs between the protrusion 552p and the protrusion 562p. When the protrusions 552p and 562p are present as in this embodiment, compared with when protrusions are absent, it is possible to suppress movement of electric discharge positions (arc positions) in the first electrode 92 and the second electrode 93.

FIG. 6A shows a first polarity state in which the first electrode 92 operates as an anode and the second electrode 93 operates as a cathode. In the first polarity state, electrons move from the second electrode 93 (the cathode) to the first electrode 92 (the anode) according to electric discharge. The electrons are emitted from the cathode (the second electrode 93). The electrons emitted from the cathode (the second electrode 93) collide with the distal end of the anode (the first electrode 92). Heat is generated by the collision. The temperature at the distal end (the protrusion 552p) of the anode (the first electrode 92) increases.

FIG. 6B shows a second polarity state in which the first electrode 92 operates as a cathode and the second electrode 93 operates as an anode. In the second polarity state, conversely to the first polarity state, electrons move from the first electrode 92 to the second electrode 93. As a result, the temperature at the distal end (the protrusion 562p) of the second electrode 93 increases.

In this way, the driving current I is supplied to the discharge lamp 90, whereby the temperature of the anode, with which the electrons collide, increases. On the other hand, the temperature of the cathode, which emits the electrons, decreases while the cathode is emitting the electrons toward the anode.

The inter-electrode distance between the first electrode 92 and the second electrode 93 increases according to deterioration of the protrusions 552p and 562p. This is because the protrusions 552p and 562p wear. When the inter-electrode distance increases, since the resistance between the first electrode 92 and the second electrode 93 increases, the lamp voltage Vla increases. Therefore, it is possible to detect a change in the inter-electrode distance, that is, a deterioration degree of the discharge lamp 90 by referring to the lamp voltage Vla.

Note that, since the first electrode 92 and the second electrode 93 have the same configuration, in the following explanation, only the first electrode 92 is sometimes representatively explained. Since the protrusion 552p at the distal end of the first electrode 92 and the protrusion 562p at the distal end of the second electrode 93 have the same configuration, in the following explanation, only the protrusion 552p is sometimes representatively explained.

Control of the discharge lamp driving section 230 by the control section 40 in this embodiment is explained below.

Figure 7:
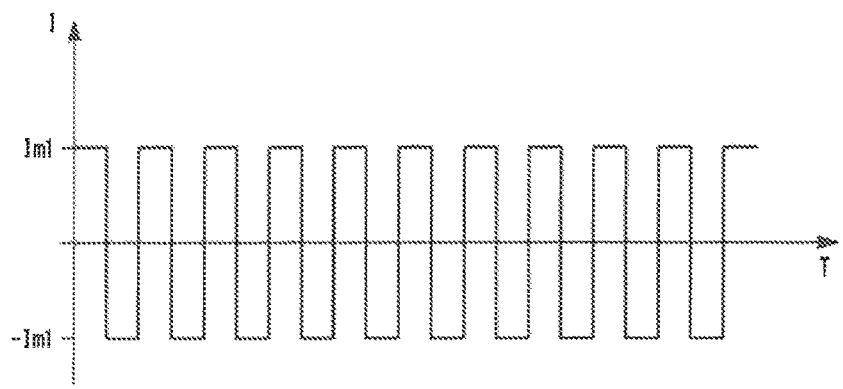
FIG. 7 is a schematic diagram showing an example of a driving current in the first embodiment.

FIG. 7 is a diagram showing an example of the driving current I supplied to the discharge lamp 90 in this embodiment. In FIG. 7, the vertical axis indicates the driving current I and the horizontal axis indicates time T. The driving current I is shown as positive when the driving current I is in the first polarity state and is shown as negative when the driving current I is in the second polarity state. As shown in FIG. 7, an alternating current supplied to the discharge lamp 90 in this embodiment is, for example, a rectangular wave alternating current, the polarity of which is inverted a plurality of times between a current value Im1 and a current value −Im1.

In this embodiment, the control section 40 is capable of executing steady driving, low frequency driving, and high frequency driving as driving modes of the discharge lamp 90. In this embodiment, the steady driving is driving for supplying the driving current I, the frequency f of which is a steady frequency (a first frequency) f0, to the discharge lamp 90. The low frequency driving is driving for supplying the driving current I, the frequency f of which is lower than the steady frequency f0, to the discharge lamp 90. The high frequency driving is driving for supplying the driving current I, the frequency f of which is higher than the steady frequency f0, to the discharge lamp 90. The control section 40 switches the steady driving, the low frequency driving, and the high frequency driving according to the lamp voltage Vla.

Figure 8:
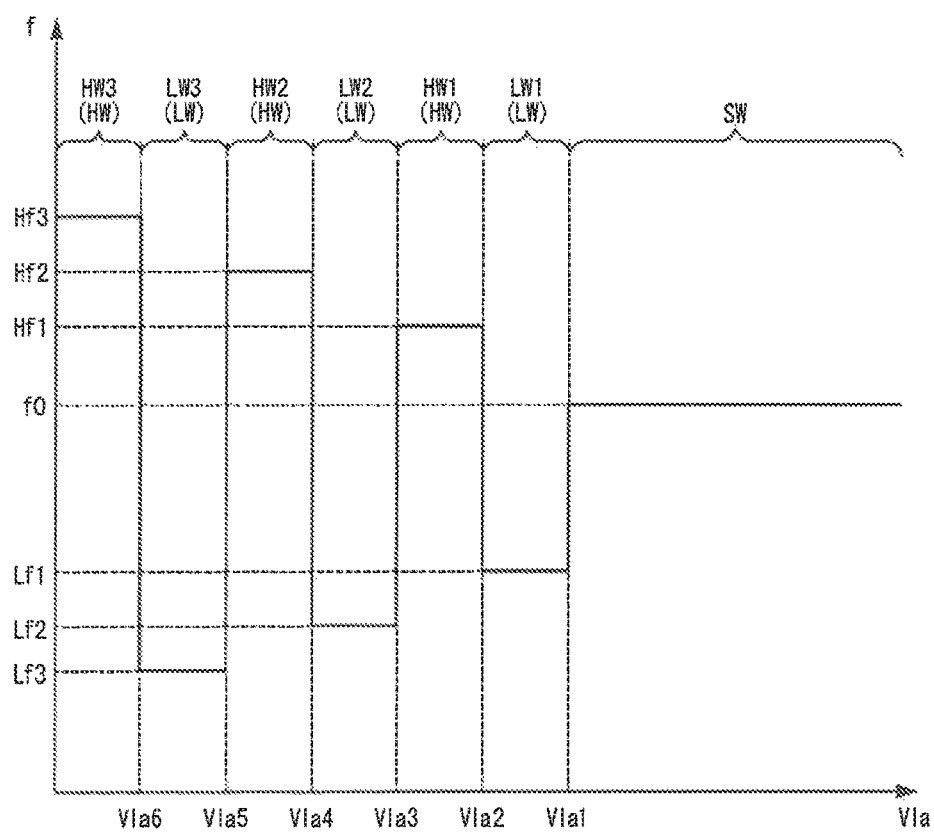
FIG. 8 is a graph showing a change in the frequency of the driving current with respect to a lamp voltage in the first embodiment.

FIG. 8 is a graph showing a change in the frequency f of the driving current I with respect to the lamp voltage Vla. In FIG. 8, the vertical axis indicates the frequency f and the horizontal axis indicates the lamp voltage Vla. In FIG. 8, numerical value regions of the lamp voltage Vla are also shown in which the driving current I, that is, a steady alternating current (a first alternating current) SW, a low frequency alternating current (a second alternating current)

LW, and a high frequency alternating current (a third alternating current) HW are supplied to the discharge lamp 90.

The steady alternating current SW is the driving current I supplied to the discharge lamp 90 in the steady driving. The low frequency alternating current LW is the driving current I supplied to the discharge lamp 90 in the low frequency driving. The high frequency alternating current HW is the driving current I supplied to the discharge lamp 90 in the high frequency driving. In this embodiment, for example, the alternating current has waveforms same as the waveform of the driving current I shown in FIG. 7 and have the frequencies f different from one another.

As shown in FIG. 8, when the lamp voltage Vla is equal to or higher than a first voltage Vla1, the steady driving is executed and the driving current I is the steady alternating current SW. When the lamp voltage Vla is lower than the first voltage Vla1, the low frequency driving and the high frequency driving are alternately executed according to a decrease of the lamp voltage Vla. That is, the driving current I is alternately switched between the low frequency alternating current LW and the high frequency alternating current HW.

In the example shown in FIG. 8, the low frequency alternating current LW includes a first low frequency alternating current LW1, a second low frequency alternating current LW2, and a third low frequency alternating current LW3. The high frequency alternating current HW includes a first high frequency alternating current HW1, a second high frequency alternating current HW2, and a third high frequency alternating current HW3. The alternating current is provided in the order of the first low frequency alternating current LW1, the first high frequency alternating current HW1, the second low frequency alternating current LW2, the second high frequency alternating current HW2, the third low frequency alternating current LW3, and the third high frequency alternating current HW3 according to the decrease of the lamp voltage Vla.

The first low frequency alternating current LW1 is the driving current I supplied to the discharge lamp 90 when the lamp voltage Vla is lower than the first voltage Vla1 and equal to or higher than a second voltage Vla2 lower than the first voltage Vla1. The frequency f of the first low frequency alternating current LW1 is a first low frequency Lf1. The first low frequency Lf1 is lower than the steady frequency f0.

The first high frequency alternating current HW1 is the driving current I supplied to the discharge lamp 90 when the lamp voltage Vla is lower than the second voltage Vla2 and equal to or higher than a third voltage Vla3 lower than the second voltage Vla2. The frequency f of the first high frequency alternating current HW1 is a first high frequency Hf1. The first high frequency Hf1 is higher than the steady frequency f0.

The second low frequency alternating current LW2 is the driving current I supplied to the discharge lamp 90 when the lamp voltage Vla is lower than the third voltage Vla3 and equal to or higher than a fourth voltage Vla4 lower than the third voltage Vla3. The frequency f of the second low frequency alternating current LW2 is a second low frequency Lf2. The second low frequency Lf2 is lower than the steady frequency f0 and lower than the first low frequency Lf1.

The second high frequency alternating current HW2 is the driving current I supplied to the discharge lamp 90 when the lamp voltage Vla is lower than the fourth voltage Vla4 and equal to or higher than a fifth voltage Vla5 lower than the fourth voltage Vla4. The frequency f of the second high frequency alternating current HW2 is a second high frequency Hf2. The second high frequency Hf2 is higher than the steady frequency f0 and higher than the first high frequency Hf1.

The third low frequency alternating current LW3 is the driving current I supplied to the discharge lamp 90 when the lamp voltage Vla is lower than the fifth voltage Vla5 and equal to or higher than a sixth voltage Vla6 lower than the fifth voltage Vla5. The frequency f of the third low frequency alternating current LW3 is a third low frequency Lf3. The third low frequency Lf3 is lower than the steady frequency f0 and lower than the second low frequency Lf2.

The third high frequency alternating current HW3 is the driving current I supplied to the discharge lamp 90 when the lamp voltage Vla is lower than the sixth voltage Vla5. The frequency f of the third high frequency alternating current HW3 is a third high frequency Hf3. The third high frequency Hf3 is higher than the steady frequency f0 and higher than the second high frequency Hf2.

An example of the frequencies f of the alternating current and voltage values is shown in Table 1.

TABLE 1

| Lamp voltage Vla [V] | Driving current I | Frequency [Hz] | |
|---|---|---|---|
| 60 or higher | Steady alternating current SW | Steady frequency f0 | 410 |
| 58 or higher, lower than 60 | First low frequency alternating current LW1 | First low frequency Lf1 | 133 |
| 55 or higher, lower than 58 | First high frequency alternating current HW1 | First high frequency Hf1 | 448 |
| 53 or higher, lower than 55 | Second low frequency alternating current LW2 | Second low frequency Lf2 | 109 |
| 50 or higher, lower than 53 | Second high frequency alternating current HW2 | Second high frequency Hf2 | 513 |
| 47 or higher, lower than 50 | Third low frequency alternating current LW3 | Third low frequency Lf3 | 87 |
| Lower than 47 | Third high frequency alternating current HW3 | Third high frequency Hf3 | 650 |

In the example shown in Table 1, the first voltage Vla1 is 60 V. The second voltage Vla2 is 58 V. The third voltage Vla3 is 55 V. The fourth voltage Vla4 is 53 V. The fifth voltage Vla5 is 50 V. The sixth voltage Vla6 is 47 V. In the case of Table 1, an initial lamp voltage Vla of the discharge lamp 90 is, for example, 65 V. Note that the same applies to examples of other tables shown blow.

In the following explanation, driving in which the first low frequency alternating current LW1 is supplied to the discharge lamp 90 is referred to as first low frequency driving. Driving in which the second low frequency alternating current LW2 is supplied to the discharge lamp 90 is referred to as second low frequency driving. Driving in which the third low frequency alternating current LW3 is supplied to the discharge lamp 90 is referred to as third low frequency driving. Driving in which the first high frequency alternating current HW1 is supplied to the discharge lamp 90 is referred to as first high frequency driving. Driving in which the second high frequency alternating current HW2 is supplied to the discharge lamp 90 is referred to as second high frequency driving. Driving in which the third high frequency alternating current HW3 is supplied to the discharge lamp 90 is referred to as third high frequency driving.

Figure 9:
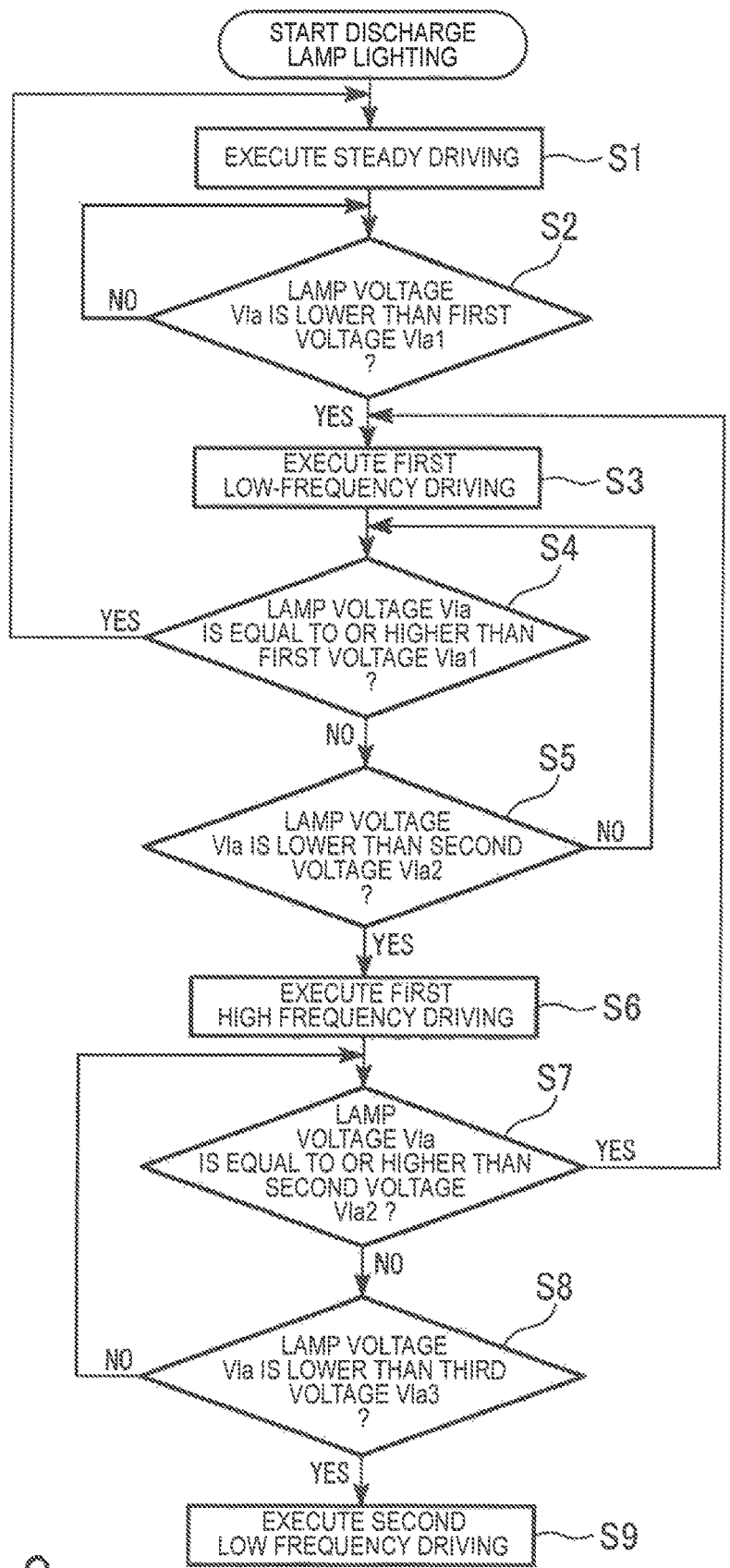
FIG. 9 is a flowchart for explaining an example of a control procedure by the control section in the first embodiment.

FIG. 9 is a flowchart for explaining an example of a control procedure by the control section 40 in this embodiment. In FIG. 9, a procedure for switching the driving of the discharge lamp 90 is shown. As shown in FIG. 9, in an initial state, the control section 40 executes the steady driving (step S1). During the execution of the steady driving, the control section 40 causes the voltage detecting section of the operation detecting section 60 to detect the lamp voltage Vla and determines whether the detected lamp voltage Vla is lower than the first voltage Vla1 (step S2).

When the lamp voltage Vla is equal to or higher than the first voltage Vla1 (NO in step S2), the control section 40 continuously executes the steady driving. That is, when the lamp voltage Vla is equal to or higher than the first voltage Vla1, the control section 40 supplies the driving current I including the steady alternating current SW to the discharge lamp 90. Note that the initial lamp voltage Vla is higher than the first voltage Vla1.

On the other hand, when the lamp voltage Vla is lower than the first voltage Vla1 (YES in step S2), the control section 40 switches the driving from the steady driving and executes the first low frequency driving (step S3).

During the execution of the first low frequency driving, the control section 40 determines whether the lamp voltage Vla is equal to or higher than the first voltage Vla1 (step S4) and determines whether the lamp voltage Vla is lower than the second voltage Vla2 (step S5). When the lamp voltage Vla increases and the lamp voltage Vla is equal to or higher than the first voltage Vla1 according to the execution of the first low frequency driving (YES in step S4), the control section 40 switches the driving from the first low frequency driving and executes the steady driving again (step S1).

When the lamp voltage Vla remains lower than the first voltage Vla1 (NO ins step S4) and when the lamp voltage Vla is equal to or higher than the second voltage Vla2 (NO in step S5), the control section 40 continuously executes the first low frequency driving. That is, when the lamp voltage Vla is lower than the first voltage Vla1 and equal to or higher than the second voltage Vla2 lower than the first voltage Vla1, the control section 40 supplies the driving current I including the low frequency alternating current LW, the frequency f of which is lower than the frequency f of the steady alternating current SW, to the discharge lamp 90. In this case, the low frequency alternating current LW supplied to the discharge lamp 90 is the first low frequency alternating current LW1, the frequency f of which is the first low frequency Lf1. That is, when the lamp voltage Vla is lower than the first voltage Vla1 and equal to or higher than the second voltage Vla2 lower than the first voltage Vla1, the control section 40 sets the frequency f of the low frequency alternating current LW to the first low frequency Lf1 lower than the steady frequency f0.

When the lamp voltage Vla is lower than the second voltage Vla2 (YES in step S5), the control section 40 executes the first high frequency driving (step S6). That is, when the lamp voltage Vla is lower than the second voltage Vla2, the control section 40 supplies the driving current I including the high frequency alternating current HW (the first high frequency alternating current HW1), the frequency f of which is higher than the frequency f of the steady alternating current SW, to the discharge lamp 90.

During the execution of the first high frequency driving, the control section 40 determines whether the lamp voltage Vla is equal to or higher than the second voltage Vla2 (step S7) and determines whether the lamp voltage Vla is lower than the third voltage Vla3 (step S8). When the lamp voltage Vla increases and the lamp voltage Vla is equal to or higher than the second voltage Vla2 according to the execution of the first high frequency driving (YES in step S7), the control section 40 switches the driving from the first high frequency driving and executes the first low frequency driving again (Step S3).

When the lamp voltage Vla remains lower than the second voltage Vla2 (NO in step S7) and when the lamp voltage Vla is equal to or higher than the third voltage Vla3 (NO in step S8), the control section 40 continuously executes the first high frequency driving. That is, when the lamp voltage Vla is lower than the second voltage Vla2 and equal to or higher than the third voltage Vla3 lower than the second voltage Vla2, the control section 40 supplies the driving current I including the high frequency alternating current HW, the frequency f of which is higher than the frequency f of the steady alternating current SW, to the discharge lamp 90. In this case, the high frequency alternating current HW supplied to the discharge lamp 90 is the first high frequency alternating current HW1, the frequency f of which is the first high frequency Hf1. That is, when the lamp voltage Vla is lower than the second voltage Vla2 and equal to or higher than the third voltage Vla3, the control section 40 sets the frequency f of the high frequency alternating current HW to the first high frequency Hf1 higher than the steady frequency f0.

When the lamp voltage Vla is lower than the third voltage Vla3 (YES in step S8), the control section 40 executes the second low frequency driving (step S9). That is, when the lamp voltage Vla is lower than the third voltage Vla3 lower than the second voltage Vla2, the control section 40 sets the frequency f of the low frequency alternating current LW to the second low frequency Lf2 lower than the first low frequency Lf1 and supplies the driving current I including the low frequency alternating current LW (the second low frequency alternating current LW2) having the second low frequency Lf2 to the discharge lamp 90.

Although not shown in the figure, thereafter, during the execution of the second low frequency driving, the control section 40 determines whether the lamp voltage Vla is equal to or higher than the third voltage Vla3 and determines whether the lamp voltage Vla is lower than the fourth voltage Vla4. Consequently, if the lamp voltage Vla is equal to or higher than the third voltage Vla3, the control section 40 executes the first high frequency driving again. If the lamp voltage Vla is lower than the third voltage Vla3 and equal to or higher than the fourth voltage Vla4, the control section 40 continuously executes the second low frequency driving. That is, when the lamp voltage Vla is lower than the fourth voltage Vla4 lower than the third voltage Vla3, the control section 40 sets the frequency f of the high frequency alternating current HW to the second high frequency Hf2 higher than the first high frequency Hf1 and supplies the driving current I including the high frequency alternating current HW (the second high frequency alternating current HW2) having the second high frequency Hf2 to the discharge lamp 90.

When the lamp voltage Vla is lower than the fourth voltage Vla4, the control section 40 executes the second high frequency driving. Thereafter, in the same manner, the control section 40 executes the third low frequency driving and the third high frequency driving according to a decrease of the lamp voltage Vla.

As explained above, the control section 40 switches the respective kinds of driving and switches the driving current I supplied to the discharge lamp 90 according to the lamp voltage Vla.

Figure 10:
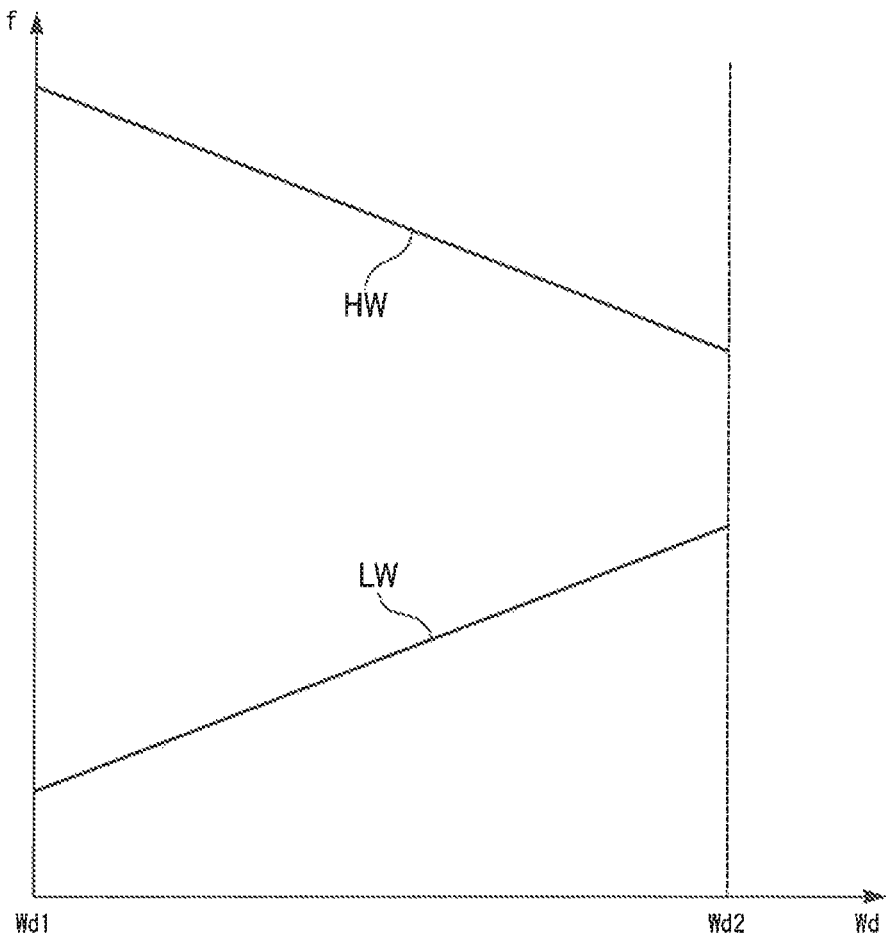
FIG. 10 is a graph showing a change in the frequency of the driving current with respect to driving power in the first embodiment.

In this embodiment, the control section 40 changes the frequency f of the low frequency alternating current LW and the frequency f of the high frequency alternating current HW according to the driving power Wd. FIG. 10 is a graph showing a frequency change of the driving current I with respect to the driving power Wd in this embodiment. In FIG.

10, the vertical axis indicates the frequency f and the horizontal axis indicates the driving power Wd.

As shown in FIG. 10, the frequency f of the low frequency alternating current LW decreases according to a decrease in the driving power Wd. That is, the control section 40 sets the frequency f of the low frequency alternating current LW lower as the driving power Wd supplied to the discharge lamp 90 is smaller. In this embodiment, a relation between the frequency f of the low frequency alternating current LW and the driving power Wd can be represented by, for example, a linear function.

The frequency f of the high frequency alternating current HW increases as the driving power Wd decreases. That is, the control section 40 sets the frequency f of the high frequency alternating current HW higher as the driving power Wd supplied to the discharge lamp 90 is smaller. In this embodiment, a relation between the frequency f of the high frequency alternating current HW and the driving power Wd can be represented by, for example, a linear function.

For example, when the driving power Wd changes from second driving power Wd2 to first driving power Wd1 smaller than the second driving power Wd2, the first low frequency Lf1, the second low frequency Lf2, and the third low frequency Lf3 respectively decrease and the first high frequency Hf1, the second high frequency Hf2, and the third high frequency Hf3 respectively increase. The first driving power Wd1 is, for example, the driving power Wd in a low power mode.

Note that, at this point, decrease degrees of the low frequencies may be the same with one another or may be different from one another. Increase degrees of the high frequencies may be the same with one another or may be different from one another. The steady frequency f0 may change or may not change according to a change in the driving power Wd.

The control by the control section 40 explained above can be represented as a discharge lamp driving method as well. That is, a form of a discharge lamp driving method in this embodiment is a discharge lamp driving method for supplying the driving current I to the discharge lamp 90 including the first electrode 92 and the second electrode 93 and driving the discharge lamp 90, the discharge lamp driving method including supplying the driving current I including the steady alternating current SW to the discharge lamp 90 when the lamp voltage Vla of the discharge lamp 90 is equal to or higher than the first voltage Vla1, supplying the driving current I including the low frequency alternating current LW, the frequency f of which is lower than the frequency f of the steady current SW, to the discharge lamp 90 when the lamp voltage Vla is lower than the first voltage Vla1 and equal to or higher than the second voltage Vla2 lower than the first voltage Vla1, and supplying the driving current I including the high frequency alternating current HW, the frequency f of which is higher than the frequency f of the steady alternating current SW, to the discharge lamp 90 when the lamp voltage Vla is lower than the second voltage Vla2.

In an initial state in which the discharge lamp 90 is relatively not deteriorated, in some case, the protrusion 552p of the first electrode 92 grows and the inter-electrode distance is excessively short during the execution of the steady driving. In this case, the lamp voltage Vla is excessively low. It is sometimes necessary to supply the driving current I larger than a limit current value to the discharge lamp 90 in order to supply desired driving power Wd to the discharge lamp 90. In this case, in some case, the desired driving power Wd is not obtained as a result and the luminance of the discharge lamp 90 decreases. If the inter-electrode distance is excessively short, mercury bridge sometimes occurs in which mercury Hg encapsulated in the discharge space 91 adheres to the first electrode 92 and the second electrode 93 and the first electrode 92 and the second electrode 93 are short-circuited.

On the other hand, it is also conceivable to adopt a method of, when the lamp voltage Vla decreases to be lower than a predetermined value, increasing the frequency f of the driving current I and increasing the lamp voltage Vla. However, this method has a problem in that the protrusion 552p is reduced in thickness and size to accelerate the deterioration of the discharge lamp 90. When the lamp voltage Vla increase according to the method and the driving returns to the steady driving, the protrusion 552p reduced in thickness sometimes disappears because of a sudden change in a heat load.

When the lamp voltage Vla does not increase and further decrease in this method, it is conceivable to reduce the frequency f of the driving current I to be lower than the frequency f in the steady driving. However, in this case, in some case, a large heat load is applied to the first electrode 92 and the protrusion 552p reduced in thickness and size disappears. When the protrusion 552p disappears, there are problems in that, for example, the lamp voltage Vla suddenly increases, a flicker occurs, tungsten of the disappeared protrusion 552p adheres to the inside of the discharge lamp 90, and blackening and devitrification occur.

On the other hand, according to this embodiment, when the lamp voltage Vla decreases to be lower than the first voltage Vla1 in the steady driving, the low frequency driving, in which the frequency f supplied to the discharge lamp 90 is lower than the frequency f in the steady driving, is executed. That is, in this embodiment, the first low frequency alternating current LW1 having the first low frequency Lf1 is supplied to the discharge lamp 90. Therefore, the melting degree of the protrusion 552p of the first electrode 92 increases. The protrusion 552p can be formed thick and large. Consequently, it is possible to suppress the deterioration of the discharge lamp 90 from being accelerated. Since the melting degree of the protrusion 552p increases, the inter-electrode distance increases and the lamp voltage Vla easily increases.

Since the protrusion 552p is formed thick and large, it is possible to suppress the protrusion 552p from disappearing even when the lamp voltage Vla increases and the driving returns to the steady driving. Even when the high frequency driving is executed as the low frequency driving, the protrusion 552p is not excessively reduced in thickness. When the driving is switched from the high frequency driving to the low frequency driving, it is possible to suppress the protrusion 552p from disappearing. Therefore, according to this embodiment, it is possible to suppress a flicker and blackening and devitrification from occurring.

In some case, even if the low frequency driving is executed, the lamp voltage Vla less easily increases and further decreases because of fluctuation in the quality of the discharge lamp 90, in particular, fluctuation in the quality of the first electrode 92 and the second electrode 93. At this point, if the low frequency driving is continued, since the melting degree of the protrusion 552p is large, the decrease of the lamp voltage Vla is sometimes accelerated. In some case, the protrusion 552p is flattened, a bright spot of arc discharge easily moves on the protrusion 552p, and a flicker easily occurs. Since the bright spot of the arc discharge moves, in some case, fluctuation in an angle of light emitted from the discharge lamp 90 increases and light eclipsed by an optical system of the projector 500 increases. Consequently, the illuminance of the projector 500 sometimes decreases.

On the other hand, according to this embodiment, when the lamp voltage Vla continues to decrease even if the low frequency driving is executed, if the lamp voltage Vla is lower than the second voltage Vla2 lower than the first voltage Vla1, the high frequency driving, the frequency f of which is higher than the frequency f of the steady driving, is executed. That is, in this embodiment, the first high frequency alternating current HW1 having the first high frequency Hf1 is supplied to the discharge lamp 90. Consequently, it is possible to increases the lamp voltage Vla while suppressing the protrusion 552p from being flattened. At this point, immediately after the driving is switched to the high frequency driving, the protrusion 552p temporarily grows and the lamp voltage Vla further decrease. However, thereafter, since the protrusion 552p to be formed is reduced in thickness and size, the lamp voltage Vla increases.

As explained above, according to this embodiment, when the lamp voltage Vla excessively decreases in a relatively initial state or the like, it is possible to increase the lamp voltage Vla and suppress the lamp voltage Vla from becoming excessively low while stably forming the protrusion 552p. Therefore, it is easy to maintain the lamp voltage Vla while suppressing deterioration of the discharge lamp 90 from being accelerated. As a result, it is possible to improve the life of the discharge lamp 90.

In some case, the lamp voltage Vla less easily increases and further decreases even if the high frequency driving is executed. On the other hand, according to this embodiment, when the lamp voltage Vla further continues to decrease even if the high frequency driving is executed, if the lamp voltage Vla is lower than the third voltage Vla3 lower than the second voltage Vla2, the low frequency driving is executed again. At this point, in this embodiment, the low frequency alternating current LW supplied to the discharge lamp 90 in the low frequency driving changes to the second low frequency alternating current LW2, the frequency f of which is lower than the frequency f of the first low frequency alternating current LW1. Therefore, it is possible to further increase the melting degree of the protrusion 552p. It is easier to increase the lamp voltage Vla.

In some case, the lamp voltage Vla less easily increases and further decreases even if the low frequency driving is executed again. On the other hand, according to this embodiment, when the lamp voltage Vla further continues to decrease even if the low frequency driving is executed again, if the lamp voltage Vla is lower than the fourth voltage Vla4 lower than the third voltage Vla3, the high frequency driving is executed again. At this point, in this embodiment, the high frequency alternating current HW supplied to the discharge lamp 90 in the high frequency driving changes to the second high frequency alternating current HW2, the frequency f of which is higher than the frequency f of the first high frequency alternating current HW1. Therefore, it is easier to form the protrusion 552p thin and small. It is easier to increase the lamp voltage Vla.

When the lamp voltage Vla still decreases even if the driving explained above is executed, it is possible to increase the lamp voltage Vla by further alternately performing the low frequency driving and the high frequency driving.

As explained above, according to this embodiment, when the lamp voltage Vla is lower than the first voltage Vla1, the driving is alternately switched in the order of the low frequency driving and the high frequency driving as the lamp voltage Vla decreases. Consequently, first, after the protrusion 552p is increased in thickness and size in the low frequency driving, it is possible to increase the lamp voltage Vla while stabilizing the shape of the protrusion 552p by repeating the high frequency driving and the low frequency driving. As a result, it is possible to suitably suppress the lamp voltage Vla from excessively decreasing irrespective of fluctuation of the discharge lamp 90.

If a difference between heat loads of the low frequency alternating current LW and the high frequency alternating current HW is excessively large, when the high frequency alternating current HW shifts to the low frequency alternating current LW, the protrusion 552p sometimes easily disappears.

On the other hand, according to this embodiment, the frequency f of the low frequency alternating current LW decreases stepwise from the first low frequency alternating current LW1 toward the third low frequency alternating current LW3. The frequency f of the high frequency alternating current HW increases stepwise from the first high frequency alternating current HW1 toward the third high frequency alternating current HW3. Consequently, the frequency f is relatively higher in the low frequency alternating current LW provided when the lamp voltage Vla is high. The frequency f is relatively lower in the high frequency alternating current HW provided when the lamp voltage Vla is high. Therefore, in a stage when the lamp voltage Vla starts to decrease from the first voltage Vla1, a difference between changes of the heat loads can be set relatively small. Thereafter, the difference can be gradually increased as the lamp voltage Vla decreases. Consequently, it is possible to suitably apply a heat load to the first electrode 92 and suppress the lamp voltage Vla from excessively decreasing while suppressing the protrusion 552p from disappearing.

In the low power mode in which the driving power Wd is relatively smaller, the protrusion 552p more easily grows and the lamp voltage Vla more easily decreases. In the low power mode, the protrusion 552p is more easily reduced in thickness and size. Therefore, the effect of this embodiment explained above can be obtained particularly greatly in the low power mode.

According to the embodiment of the invention, the frequency f of the low frequency alternating current LW is lower as the driving power Wd is smaller. Therefore, in the low power mode in which the decrease of the lamp voltage Vla more easily occurs, it is easier to increase the melting degree of the protrusion 552p and increase the lamp voltage Vla. Consequently, it is possible to further suppress the lamp voltage Vla from excessively decreasing.

According to this embodiment, as the driving power Wd is smaller, the frequency f of the high frequency alternating current HW is higher. Therefore, in the low power mode in which the decrease of the lamp voltage Vla more easily occurs, it is easier to form the protrusion 552p thin and small and increase the lamp voltage Vla. Consequently, it is possible to further suppress the lamp voltage Vla from excessively decreasing.

When the driving power Wd is relatively large, the frequency f of the low frequency alternating current LW is relatively high and the frequency f of the high frequency alternating current HW is relatively low. When the driving power Wd is relatively large, since the heat load applied to the first electrode 92 is large, if the frequency f of the low frequency alternating current LW is set excessively low and the frequency f of the high frequency alternating current HW is set excessively high, the protrusion 552p sometimes easily disappears. According to this embodiment, when the driving power Wd is relatively large, it is possible to set the frequency f of the low frequency alternating current LW relatively high and set the frequency f of the high frequency alternating current HW relatively low. Consequently, when the driving power Wd is relatively large, it is possible to suppress the protrusion 552p from disappearing.

Note that, in this embodiment, it is also possible to adopt a configuration and a method explained below.

In the above explanation, as the low frequency alternating current LW, the three kinds of the low frequency alternating current LW, that is, the first low frequency alternating current LW1 to the third low frequency alternating current LW3 are described. As the high frequency alternating current HW, three kinds of the high frequency alternating current HW, that is, the first high frequency alternating current HW1 to the third high frequency alternating HW3 are described. However, the low frequency alternating current LW and the high frequency alternating current HW are not limited to this. Each of the low frequency alternating current LW and the high frequency alternating current HW may be two or less kinds or four or more kinds of the low frequency alternating current and the high frequency alternating current.

In this embodiment, the first low frequency Lf1, the second low frequency Lf2, and the third low frequency Lf3 may be the same value with one another. The first high frequency Hf1, the second high frequency Hf2, and the third high frequency Hf3 may be the same value with one another. When the low frequencies and the high frequencies are respectively the same, as the lamp voltage Vla decreases in a range in which the lamp voltage Vla is lower than the first voltage Vla1, one kinds of the low frequency alternating current LW and one kind of the high frequency alternating current HW are alternately provided. In this case as well, it is possible to suppress the lamp voltage Vla from excessively decreasing.

In the above explanation, the alternating current is explained as the rectangular wave alternating current having one kind of the frequency f. However, the alternating current is not limited to this. The alternating current may include a plurality of frequencies f. In this case, the value of the frequency f may be an average of the plurality of frequencies f.

When the alternating current explained above is supplied to the discharge lamp 90, the driving current I including the alternating current and electric current having other driving waveforms may be supplied to the discharge lamp 90. As an example, when the first low frequency alternating current LW1 is supplied to the discharge lamp 90, the driving current I obtained by combining the first low frequency alternating current LW1 and the direct current may be supplied to the discharge lamp 90.

A pattern of a change in the frequency f of the low frequency alternating current LW and a pattern of a change in the frequency f of the high frequency alternating current HW corresponding to the driving power Wd are not particularly limited. The frequency f of the low frequency alternating current LW and the frequency f of the high frequency alternating current HW may change stepwise with respect to the driving power Wd. A relation between the frequency f of the low frequency alternating current LW and the driving power Wd and a relation between the frequency f of the high frequency alternating current HW and the driving power Wd may be represented by a quadratic function, an exponential function, or the like. Only one of the frequency f of the low frequency alternating current LW and the frequency f of the high frequency alternating current HW may change according to the driving power Wd. Both of the frequency f of the low frequency alternating current LW and the frequency f of the high frequency alternating current HW may not change according to the driving power Wd.

In this embodiment, after starting the projector 500, in a start-up period until the discharge lamp 90 is steadily lit, the control section 40 may determine driving to be executed. In this case, immediately after the projector 500 is started, the low frequency driving or the high frequency driving is sometimes executed. In the start-up period, the lamp voltage Vla applied to the discharge lamp 90 gradually increases toward the lamp voltage Vla at the steady lighting time. Therefore, when the driving executed in the start-up period is determined, a value of the lamp voltage Vla at the steady lighting time is estimated from the detected lamp voltage Vla.

Second Embodiment

A second embodiment is different from the first embodiment in that a direct current period is provided and the control section 40 changes the length of the direct current period. Note that, for example, components same as the components in the first embodiment are sometimes designated by the same reference numerals and signs to omit explanation of the components.

Figure 11:
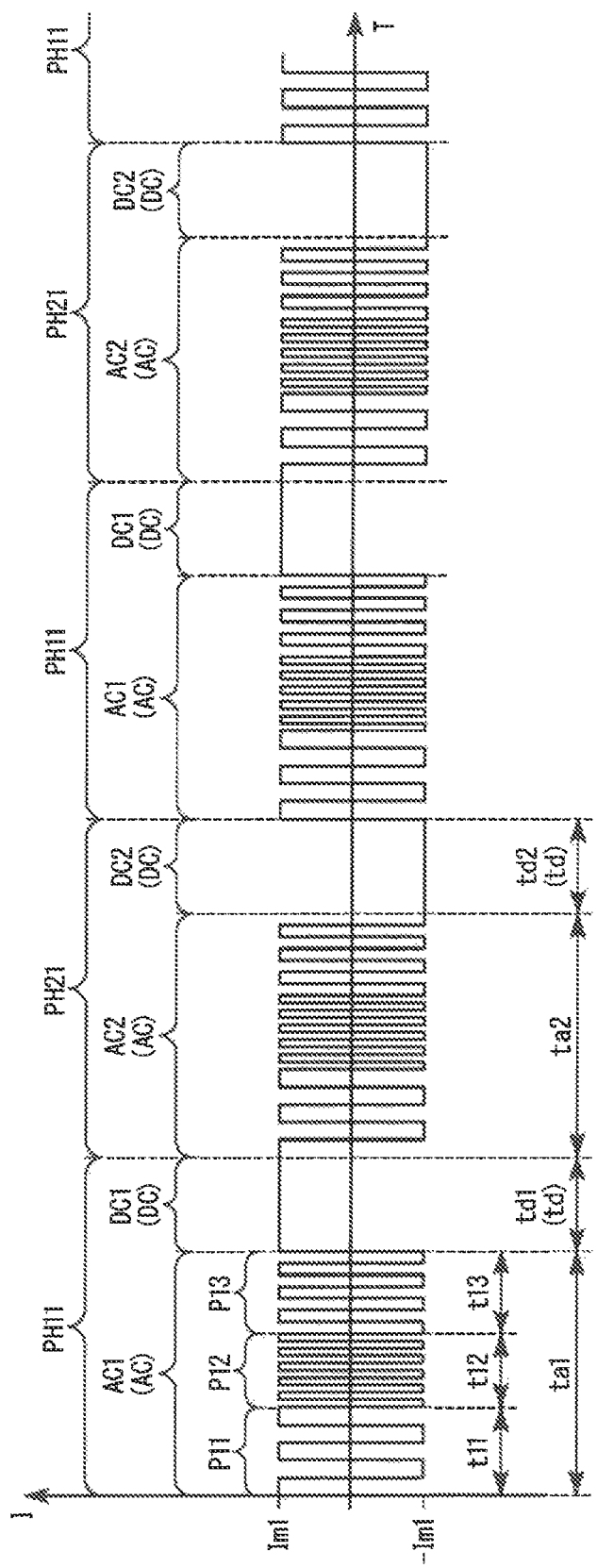
FIG. 11 is a diagram showing an example of a driving current in a second embodiment.

FIG. 11 is a diagram showing an example of the driving current I supplied to the discharge lamp 90 in this embodiment. In FIG. 11, the vertical axis indicates the driving current I and the horizontal axis indicates the time T. The driving current I is shown as positive when the driving current I is in a first polarity state and is shown as negative when the driving current I is in a second polarity state.

As shown in FIG. 11, in this embodiment, the control section 40 controls the discharge lamp driving section 230 such that a first period PH11 and a second period PH21 are alternately provided. The first period PH11 includes a first direct current period DC1 and a first alternating current period AC1. In the first period PH11 in this embodiment, one first alternating current period AC1 and one first direct current period DC1 are provided in this order. The first direct current period DC1 is a period in which a direct current having a first polarity is supplied to the discharge lamp 90. In the example shown in FIG. 11, in the first direct current period DC1, the driving current I having a constant current value Im1 is supplied to the discharge lamp 90.

The first alternating current period AC1 is a period in which an alternating current is supplied to the discharge lamp 90. In the example shown in FIG. 11, in the first alternating current period AC1, the driving current I of a rectangular wave, the polarity of which is inverted a plurality of times between a current value Im1 and a current value −Im1, is supplied to the discharge lamp 90. For example, length ta1 of the first alternating current period AC1 is larger than length td1 of the first direct current period DC1. Note that, for example, the length ta1 of the first alternating current period AC1 may be smaller than the length td1 of the first direct current period DC1 or may be the same as the length td1 of the first direct current period DC1.

In this embodiment, the first alternating current period AC1 includes a first frequency period P11, a second frequency period P12, and a third frequency period P13. The first frequency period P11, the second frequency period P12, and the third frequency period P13 are different from one another in the frequency f of the driving current I supplied to the discharge lamp 90. That is, in this embodiment, the first alternating current period AC1 includes a plurality of periods in which the frequencies f of the alternating current supplied to the discharge lamp 90 are different from one another.

In the example shown in FIG. 11, the frequency f of the alternating current supplied to the discharge lamp 90 increases in the order of the first frequency period P11, the third frequency period P13, and the second frequency period P12. As an example, the frequency f of the alternating current supplied to the discharge lamp 90 in the first frequency period P11 is 135 Hz. The frequency f of the alternating current supplied to the discharge lamp 90 in the second frequency period P12 is 280 Hz. The frequency f of the alternating current supplied to the discharge lamp 90 in the third frequency period P13 is 165 Hz. Length t11 of the first frequency period P11, length t12 of the second frequency period P12, and length t13 of the third frequency period P13 may be the same with one another or may be different from one another.

The second period PH21 includes a second direct current period DC2 and a second alternating current period AC2. In the second period PH21 in this embodiment, one second alternating current period AC2 and one second direct current period DC2 are provided in this order. The second direct current period DC2 is a period in which a direct current having the second polarity is supplied to the discharge lamp 90. In the example shown in FIG. 11, in the second direct current period DC2, the driving current I having a constant current value −Im1 is supplied to the discharge lamp 90. That is, in the second direct current period DC2, a direct current having a polarity opposite to the polarity of the direct current in the first direct current period DC1 is supplied to the discharge lamp 90.

The second alternating current period AC2 is a period in which an alternating current is supplied to the discharge lamp 90. In the example shown in FIG. 11, in the second alternating current period AC2, the driving current I of a rectangular wave, the polarity of which is inverted a plurality of times between the current value Im1 and the current value −Im1, is supplied to the discharge lamp 90. For example, length ta2 of the second alternating current period AC2 is larger than length td2 of the second direct current period DC2. Note that, for example, the length ta2 of the second alternating current period AC2 may be smaller than the length td2 of the second direct current period DC2 or may be the same as the length td2 of the second direct current period DC2. In the second alternating current period AC2 in this embodiment, for example, an alternating current having a waveform same as the waveform of the alternating current supplied to the discharge lamp 90 in the first alternating current period AC1 is supplied to the discharge lamp 90.

In this embodiment, the first direct current period DC1 and the second direct current period DC2 are alternately provided across the first alternating current period AC1 or the second alternating current period AC2. In this embodiment, the length td1 of the first direct current period DC1 and the length td2 of the second direct current period DC2 are the same. Note that the length td1 of the first direct current period DC1 and the length td2 of the second direct current period DC2 may be different from each other.

In the following explanation, a period including the first direct current period DC1 and the second direct current period DC2 is referred to as direct current period DC. A period including the first alternating current period AC1 and the second alternating current period AC2 is referred to as alternating current period AC.

In this embodiment, the control section 40 is capable of executing steady driving, high-heat-load driving, and low-heat-load driving as driving modes of the discharge lamp 90. In the respective kinds of driving, lengths td of direct current periods DC are different from one another. The high-heat-load driving is driving in which the length td of the direct current period DC is large with respect to the steady driving. Consequently, a heat load applied to the first electrode 92 in the high-heat-load driving is larger than the heat load in the steady driving. The low-heat-load driving is driving in which the length td of the direct current period DC is small with respect to the steady driving. Consequently, a heat load applied to the first electrode 92 in the low-heat-load driving is smaller than the heat load in the steady driving. The control section 40 switches the steady driving, the high-heat-load driving, and the low-heat-load driving according to the lamp voltage Vla.

Note that, in this specification, the length td of the direct current period DC includes length obtained by adding up the length td1 of the first direct current period DC1 and the length td2 of the second direct current period DC2.

Figure 12:
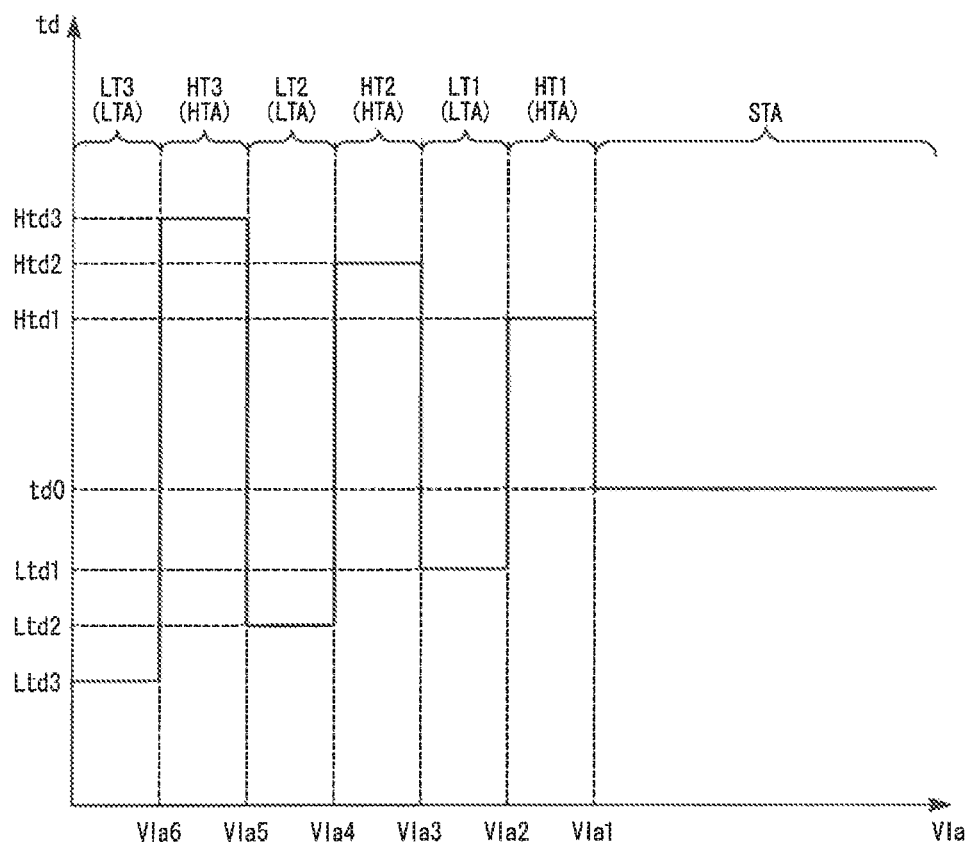
FIG. 12 is a graph showing a change in the length of a direct current period with respect to a lamp voltage in the second embodiment.

FIG. 12 is a graph showing a change in the length td of the direct current period DC with respect to the lamp voltage Vla. In FIG. 12, the vertical axis indicates the length td of the direct current period and the horizontal axis indicates the lamp voltage Vla. In FIG. 12, numerical value regions of the lamp voltage Vla are also shown in which the driving current I, that is, a steady current STA, a high-heat-load current HTA, and a low-heat-load current LTA are supplied to the discharge lamp 90.

The steady current STA is the driving current I supplied to the discharge lamp 90 in the steady driving in this embodiment. The high-heat-load current HTA is the driving current I supplied to the discharge lamp 90 in the high-heat-load driving in this embodiment. The low-heat-load current LTA is the driving current I supplied to the discharge lamp 90 in the low-heat-load driving in this embodiment. In this embodiment, for example, the electric current is the same as the driving current I shown in FIG. 11 in waveforms and are different from the driving current I in the lengths td of the direct current periods DC.

As shown in FIG. 12, when the lamp voltage Vla is equal to or higher than the first voltage Vla1, the steady driving is executed and the driving current I is the steady current STA. The length td of the direct current period DC in the steady current STA is a steady length (a first length) td0. When the lamp voltage Vla is lower than the first voltage Vla1, the high-heat-load driving and the low-heat-load driving are alternately executed as the lamp voltage Vla decreases. That is, the driving current I is alternately switched between the high-heat-load current HTA and the low-heat-load current LTA.

In an example shown in FIG. 12, the high-heat-load current HTA includes a first high-heat-load current HT1, a second high-heat-load current HT2, and a third high-heat-load current HT3. The low-heat-load current LTA includes a first low-heat-load current LT1, a second low-heat-load current LT2, and a third low-heat-load current LT3. The electric current is provided in the order of the first high-heat-load current HT1, the first low-heat-load current LT1, the second high-heat-load current HT2, the second low-heat-load current LT2, the third high-heat-load current HT3, and the third low-heat-load current LT3 as the lamp voltage Vla decreases.

The first high-heat-load current HT1 is the driving current I supplied to the discharge lamp 90 when the lamp voltage Vla is lower than the first voltage Vla1 and equal to or higher than the second voltage Vla2 lower than the first voltage Vla1. The length td of the direct current period DC in the first high-heat-load current HT1 is a first high-heat-load length (a second length) Htd1. The first high-heat-load length Htd1 is larger than the steady length td0.

The first low-heat-load current LT1 is the driving current I supplied to the discharge lamp 90 when the lamp voltage Vla is lower than the second voltage Vla2 and equal to or higher than the third voltage Vla3 lower than the second voltage Vla2. The length td of the direct current period DC in the first low-heat-load current LT1 is a first low-heat-load length (a third length) Ltd1. The first low-heat-load length Ltd1 is smaller than the steady length td0.

The second high-heat-load current HT2 is the driving current I supplied to the discharge lamp 90 when the lamp voltage Vla is lower than the third voltage Vla3 and equal to or higher than the fourth voltage Vla4 lower than the third voltage Vla3. The length td of the direct current period DC in the second high-heat-load current HT2 is a second high-heat-load length (a fourth length) Htd2. The second high-heat-load length Htd2 is larger than the steady length td0 and larger than the first high-heat load length Htd1.

The second low-heat-load current LT2 is the driving current I supplied to the discharge lamp 90 when the lamp voltage Vla is lower than the fourth voltage Vla4 and equal to or higher than the fifth voltage Vla5 lower than the fourth voltage Vla4. The length td of the direct current period DC in the second low-heat-load current LT2 is a second low-heat-load length (a fifth length) Ltd2. The second low-heat-load length Ltd2 is smaller than the steady length td0 and smaller than the first low-heat-load length Ltd1.

The third high-heat-load current HT3 is the driving current I supplied to the discharge lamp 90 when the lamp voltage Vla is lower than the fifth voltage Vla5 and equal to or higher than the sixth voltage Vla6 lower than the fifth voltage Vla5. The length td of the direct current period DC in the third high-heat-load current HT3 is a third high-heat-load length Htd3. The third high-heat-load length Htd3 is larger than the steady length td0 and larger than the second high-heat-load length Htd2.

The third low-heat-load current LT3 is the driving current I supplied to the discharge lamp 90 when the lamp voltage Vla is lower than the sixth voltage Vla6. The length td of the direct current period DC in the third low-heat-load current LT3 is a third low-heat-load length Ltd3. The third low-heat-load length Ltd3 is smaller than the steady length td0 and smaller than the second low-heat-load length Ltd2.

An example of the lengths td1 of the first direct current period DC1 and voltage values in the electric current is shown in Table 2.

TABLE 2

| Lamp voltage Vla [V] | Driving current I | Length td1 of the first direct current period DC1 [ms] |
|---|---|---|
| 60 or higher | Steady current STA | 10 |
| 58 or higher, lower than 60 | First high-heat-load current HT1 | 30 |
| 55 or higher, lower than 58 | First low-heat-load current LT1 | 4 |
| 53 or higher, lower than 55 | Second high-heat-load current HT2 | 35 |
| 50 or higher, lower than 53 | Second low-heat-load current LT2 | 2 |
| 47 or higher, lower than 50 | Third high-heat-load current HT3 | 40 |

TABLE 2-continued

| Lamp voltage Vla [V] | Driving current I | Length td1 of the first direct current period DC1 [ms] |
|---|---|---|
| Lower than 47 | Third low-heat-load current LT3 | 1 |

Note that the length td2 of the second direct current period DC2 can be set the same as the length td1 of the first direct current period DC1 in Table 2.

In the following explanation, driving in which the first high-heat-load current HT1 is supplied to the discharge lamp 90 is referred to as first high-heat-load driving. Driving in which the second high-heat-load current HT2 is supplied to the discharge lamp 90 is referred to as second high-heat-load driving. Driving in which the third high-heat-load current HT3 is supplied to the discharge lamp 90 is referred to as third high-heat-load driving. Driving in which the first low-heat-load current LT1 is supplied to the discharge lamp 90 is referred to as first low-heat-load driving. Driving in which the second low-heat-load current LT2 is supplied to the discharge lamp 90 is referred to as second low-heat-load driving. Driving in which the third low-heat-load current LT3 is supplied to the discharge lamp 90 is referred to as third low-heat-load driving.

Figure 13:
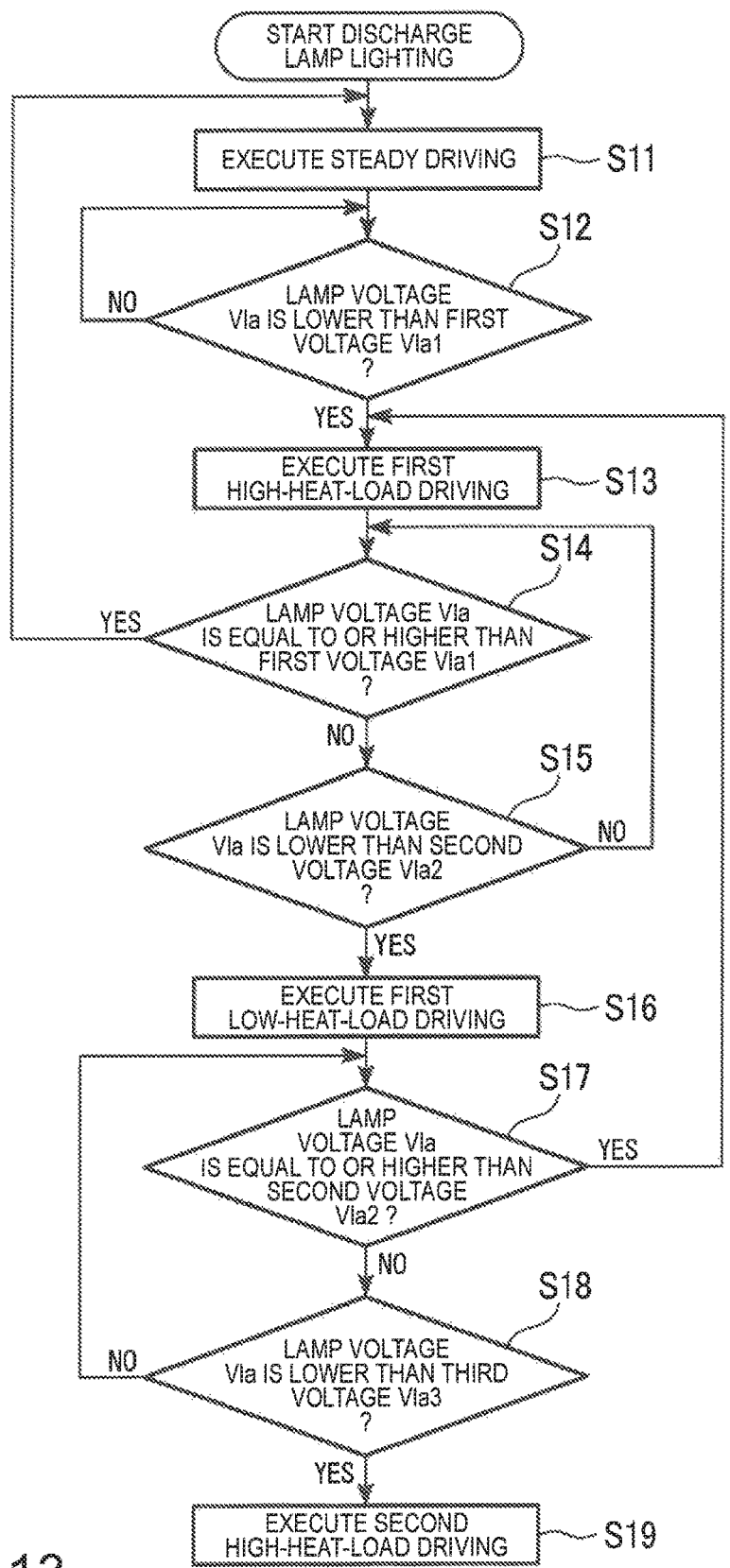
FIG. 13 is a flowchart for explaining an example of a control procedure by a control section in the second embodiment.

FIG. 13 is a flowchart for explaining an example of a control procedure by the control section 40 in this embodiment. In FIG. 13, a switching procedure of the driving of the discharge lamp 90 is shown. As shown in FIG. 13, in an initial state, the control section 40 executes the steady driving (step S11). During the execution of the steady driving, the control section 40 causes the voltage detecting section of the operation detecting section 60 to detect the lamp voltage Vla and determines whether the detected lamp voltage Vla is lower than the first voltage Vla1 (step S12).

When the lamp voltage Vla is equal to or higher than the first voltage Vla1 (NO in step S12), the control section 40 continuously executes the steady driving. That is, when the lamp voltage Vla is equal to or higher than the first voltage Vla1, the control section 40 sets the length td of the direct current period DC including the first direct current period DC1 and the second direct current period DC2 to the steady length td0. Note that the lamp voltage Vla in the initial period is higher than the first voltage Vla1.

On the other hand, when the lamp voltage Vla is lower than the first voltage Vla1 (YES in step S12), the control section 40 switches the driving from the steady driving and executes the first high-heat-load driving (step S13).

During the execution of the first high-heat-load driving, the control section 40 determines whether the lamp voltage Vla is equal to or higher than the first voltage Vla1 (step S14) and determines whether the lamp voltage Vla is lower than the second voltage Vla2 (step S15). When the lamp voltage Vla increases according to the execution of the first high-heat-load driving and the lamp voltage Vla is equal to or higher than the first voltage Vla1 (YES in step S14), the control section 40 switches the driving from the first high-heat-load driving and executes the steady driving again (step S11).

When the lamp voltage Vla remains lower than the first voltage Vla1 (NO in step S14) and the lamp voltage Vla is equal to or higher than the second voltage Vla2 (NO in step S15), the control section 40 continuously executes the first high-heat-load driving. That is, when the lamp voltage Vla is lower than the first voltage Vla1 and equal to or higher than the second voltage Vla2 lower than the first voltage Vla1, the control section 40 sets the length td of the direct current period DC to be larger than the steady length td0. In this case, the high-heat-load current HTA supplied to the discharge lamp 90 is the first high-heat-load current HT1, the length td of the direct current period DC of which is the first high-heat-load length Htd1. That is, when the lamp voltage Vla is lower than the first voltage Vla1 and equal to or higher than the second voltage Vla2 lower than the first voltage Vla1, the control section 40 sets the length td of the direct current period DC to the first high-heat-load length Htd1 to be larger than the steady length td0.

When the lamp voltage Vla is lower than the second voltage Vla2 (YES in step S15), the control section 40 executes the first low-heat-load driving (step S16). That is, when the lamp voltage Vla is lower than the second voltage Vla2, the control section 40 sets the length td of the direct current period DC to be smaller than the steady length td0.

During the execution of the first low-heat-load driving, the control section 40 determines whether the lamp voltage Vla is equal to or higher than the second voltage Vla2 (step S17) and determines whether the lamp voltage Vla is lower than the third voltage Vla3 (step S18). When the lamp voltage Vla increases according to the execution of the first low-heat-load driving and the lamp voltage Vla is equal to or higher than the second voltage Vla2 (YES in step S17), the control section 40 switches the driving from the first low-heat-load driving and executes the first high-heat-load driving again (step S13).

When the lamp voltage Vla remains lower than the second voltage Vla2 (NO in step S17) and the lamp voltage Vla is equal to or higher than the third voltage Vla3 (NO in step S18), the control section 40 continuously executes the first low-heat-load driving. In this case, the low-heat-load current LTA supplied to the discharge lamp 90 is the first low-heat-load current LT1, the length td of the direct current period DC of which is the first low-heat-load length Ltd1. That is, when the lamp voltage Vla is lower than the second voltage Vla2 and equal to or higher than the third voltage Vla3, the control section 40 sets the length td of the direct current period DC to the first low-heat-load length Ltd1 smaller than the steady length td0.

When the lamp voltage Vla is lower than the third voltage Vla3 (YES in step S18), the control section 40 executes the second high-heat-load driving (step S19). In this case, the high-heat-load current HTA supplied to the discharge lamp 90 is the second high-heat-load current HT2, the length td of the direct current period DC of which is the second high-heat-load length Htd2. That is, when the lamp voltage Vla is lower than the third voltage Vla3 lower than the second voltage Vla2, the control section 40 sets the length td of the direct current period DC to the second high-heat-load length Htd2 larger than the first high-heat-load length Htd1.

Although not shown in the figure, thereafter, during the execution of the second high-heat-load driving, the control section 40 determines whether the lamp voltage Vla is equal to or higher than the third voltage Vla3 and determines whether the lamp voltage Vla is lower than the fourth voltage Vla4. Consequently, if the lamp voltage Vla is equal to or higher than the third voltage Vla3, the control section 40 executes the first low-heat-load driving again. If the lamp voltage Vla is lower than the third voltage Vla3 and equal to or higher than the fourth voltage Vla4, the control section 40 continuously executes the second high-heat-load driving.

When the lamp voltage Vla is lower than the fourth voltage Vla4, the control section 40 executes the second low-heat-load driving. In this case, the low-heat-load current LTA supplied to the discharge lamp 90 is the second low-heat-load current LT2, the length td of the direct current period DC of which is the second low-heat-load length Ltd2. That is, when the lamp voltage Vla is lower than the fourth voltage Vla4 lower than the third voltage Vla3, the control section 40 sets the length td of the direct current period DC to the second low-heat-load length Ltd2 smaller than the first low-heat-load length Ltd1. Thereafter, in the same manner, the control section 40 executes the third high-heat-load driving and the third low-heat-load driving according to a decrease of the lamp voltage Vla.

As explained above, according to the lamp voltage Vla, the control section 40 switches the respective kinds of driving and switches the driving current I supplied to the discharge lamp 90.

Figure 14:
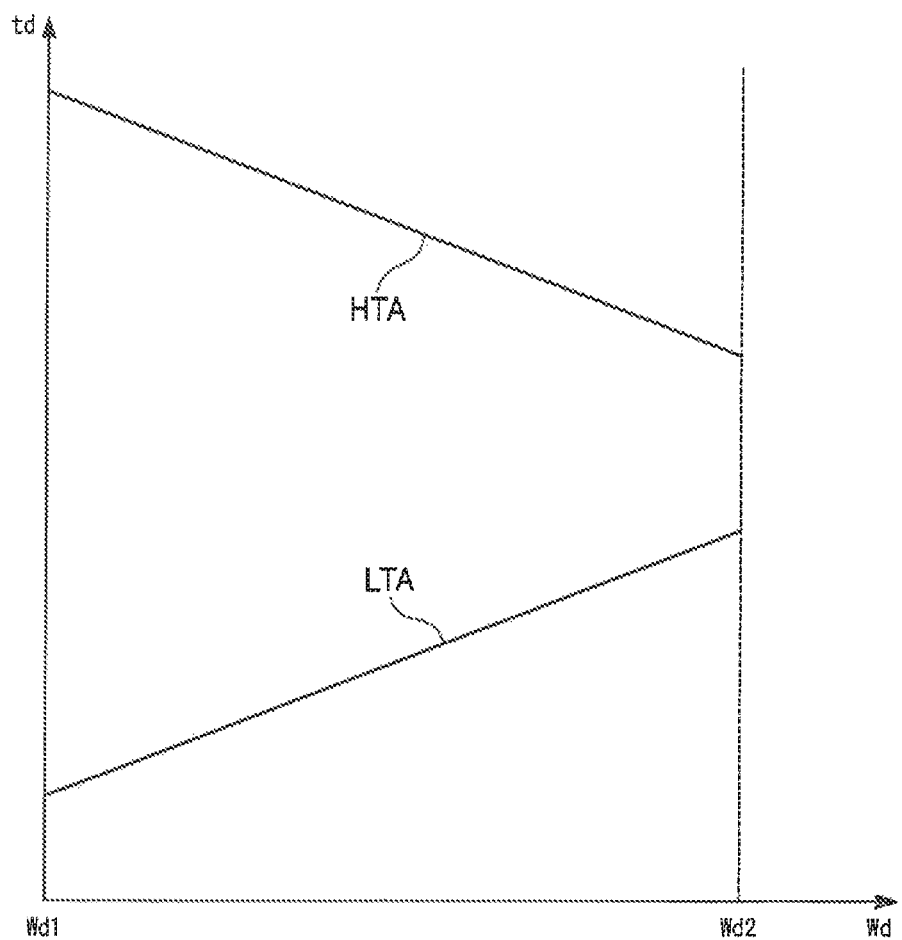
FIG. 14 is a graph showing a change in the length of the direct current period with respect to driving power in the second embodiment.

In this embodiment, the control section 40 changes, according to the driving power Wd, the length td of the direct current period DC in the high-heat-load current HTA and the length td of the direct current period DC in the low-heat-load current LTA. FIG. 14 is a graph showing a change in the length td of the direct current period DC with respect to the driving power Wd in this embodiment. In FIG. 14, the vertical axis indicates the length td of the direct current period DC and the vertical axis indicates the driving power Wd.

As shown in FIG. 14, the length td of the direct current period DC in the high-heat-load current HTA increases as the driving power Wd decreases. That is, as the driving power Wd supplied to the discharge lamp 90 is smaller, the control section 40 sets the length td of the direct current period DC larger when the length td of the direct current period DC is larger than the steady length td0. In this embodiment, a relation between the length td of the direct current period DC in the high-heat-load current HTA and the driving power Wd can be represented by, for example, a linear function.

The length td of the direct current period DC in the low-heat-load current LTA decreases as the driving power Wd decreases. That is, as the driving power Wd supplied to the discharge lamp 90 is smaller, the control section 40 sets the length td of the direct current period DC smaller when the length td of the direct current period DC is smaller than the steady length td0. In this embodiment, a relation between the length td of the direct current period DC in the low-heat-load current LTA and the driving power Wd can be represented by, for example, a linear function.

For example, when the driving power Wd changes from the second driving power Wd2 to the first driving power Wd1 smaller than the second driving power Wd2, the first high-heat-load length Htd1, the second high-heat-load length Htd2, and the third high-heat-load length Htd3 respectively increase and the first low-heat-load length Ltd1, the second low-heat-load length Ltd2, and the third low-heat-load length Ltd3 respectively decrease.

Note that, at this point, increasing degrees of the length td of the direct current periods DC in the high-heat-load current HTA may be the same with one another or may be different from one another. Decreasing degrees of the lengths td of the direct current periods DC in the low-heat-load current LTA may be the same with one another or may be different from one another. The steady length td0 may change or may not change according to the change in the driving power Wd.

The control by the control section 40 explained above can be represented as a discharge lamp driving method as well. That is, a form of the discharge lamp driving method in this embodiment is a discharge lamp driving method for supplying the driving current I to the discharge lamp 90 including the first electrode 92 and the second electrode 93 and driving the discharge lamp 90, the discharge lamp driving method including supplying, to the discharge lamp 90, the driving current I alternately including the first period PH11 including the first direct current period DC1 in which the direct current having the first polarity is supplied to the discharge lamp 90 and the first alternating current period AC1 in which the alternating current is supplied to the discharge lamp 90 and the second period PH21 including the second direct current period DC2 in which the direct current having the second polarity is supplied to the discharge lamp 90 and the second alternating current period AC2 in which the alternating current is supplied to the discharge lamp 90, setting the length td of the direct current period DC including the first direct current period DC1 and the second direct current period DC2 to the steady length td0 when the lamp voltage Vla of the discharge lamp 90 is equal to or higher than the first voltage Vla1, setting the length td1 of the direct current period DC to be larger than the steady length td0 when the lamp voltage Vla is lower than the first voltage Vla1 and equal to or higher than the second voltage Vla2 lower than the first voltage Vla1, and setting the length td of the direct current period DC to be smaller than the steady length td0 when the lamp voltage Vla is lower than the second voltage Vla2.

According to this embodiment, when the lamp voltage Vla decreases to be lower than the first voltage Vla1 in the steady driving, the high-heat-load driving, in which the length td of the direct current period DC is larger than the length td in the steady driving, is executed. That is, in this embodiment, the first high-heat-load current HT1, the length td of the direct current period DC of which is the first high-heat-load length Htd1, is supplied to the discharge lamp 90. Therefore, the melting degree of the protrusion 552p of the first electrode 92 increases and the protrusion 552p can be formed thick and large. Consequently, it is possible to suppress the deterioration of the discharge lamp 90 from being accelerated. Since the melting degree of the protrusion 552p increases, the inter-electrode distance increases and the lamp voltage Vla easily increases.

Since the protrusion 552p is formed thick and large, it is possible to suppress the protrusion 552p from disappearing even when the lamp voltage Vla increases and driving returns to the steady driving. Even when the low-heat-load driving is executed after the high-heat-load driving, the protrusion 552p is not excessively reduced in thickness. It is possible to suppress the protrusion 552p from disappearing when the driving is switched from the low-heat-load driving to the high-heat-load driving. Therefore, according to this embodiment, it is possible to suppress a flicker and blackening and devitrification from occurring.

In some case, even if the high-heat-load driving in this embodiment is executed, the lamp voltage Vla less easily increases and further decreases because of fluctuation in the quality of the discharge lamp 90, in particular, fluctuation in the quality of the first electrode 92 and the second electrode 93. At this point, if the high-heat-load driving is continued, since the melting degree of the protrusion 552p is large, the decrease of the lamp voltage Vla is sometimes accelerated. In some case, the protrusion 552p is flattened, a bright spot of arc discharge easily moves on the protrusion 552p, and a flicker easily occurs. Since the bright spot of the arc discharge moves, in some case, fluctuation in an angle of light emitted from the discharge lamp 90 increases and light eclipsed by an optical system of the projector 500 increases. Consequently, the illuminance of the projector 500 sometimes decreases.

On the other hand, according to this embodiment, when the lamp voltage Vla continues to decrease even if the high-heat-load driving is executed, if the lamp voltage Vla is lower than the second voltage Vla2 lower than the first voltage Vla1, the low-heat-load driving, in which the length td of the direct current period DC is smaller than the length td in the steady driving, is executed. That is, in this embodiment, the first low-heat-load current LT1, the length td of the direct current period DC of which is the first low-heat-load length Ltd1, is supplied to the discharge lamp 90. A ratio of an alternating current period AC in the driving current I is larger as the length td of the direct current period DC is smaller. Therefore, by reducing the length td of the direct current period DC, it is possible to obtain action and effect equivalent to the action and effect obtained when the frequency f of the driving current I is increased. Consequently, it is possible to increase the lamp voltage Vla while suppressing the protrusion 552p from being flattened. At this point, immediately after the driving is switched to the low-heat-load driving, the protrusion 552p temporarily grows and the lamp voltage Vla further decreases. However, thereafter, since the protrusion 552p to be formed is reduced in thickness and size, the lamp voltage Vla increases.

As explained above, according to this embodiment, when the lamp voltage Vla excessively decreases in a relatively initial state or the like, it is possible to increase the lamp voltage Vla and suppress the lamp voltage Vla from becoming excessively low while stably forming the protrusion 552p. Therefore, it is easy to maintain the lamp voltage Vla while suppressing deterioration of the discharge lamp 90 from being accelerated. As a result, it is possible to improve the life of the discharge lamp 90.

In some case, the lamp voltage Vla less easily increases and further decreases even if the low-heat-load driving in this embodiment is executed. On the other hand, according to this embodiment, when the lamp voltage Vla further continues to decrease even if the low-heat-load driving is executed, if the lamp voltage Vla is lower than the third voltage Vla3 lower than the second voltage Vla2, the high-heat-load driving is executed again. At this point, in this embodiment, the high-heat-load current HTA supplied to the discharge lamp 90 in the high-heat-load driving changes to the second high-heat-load current HT2, the length td of the direct current period DC of which is larger than the length td of the direct current period DC of the first high-heat-load current HT1. Therefore, it is possible to further increase the melting degree of the protrusion 552p. It is easier to increase the lamp voltage Vla.

In some case, the lamp voltage Vla less easily increases and further decreases even if the high-heat-load driving is executed again. On the other hand, according to this embodiment, when the lamp voltage Vla further continues to decrease even if the high-heat-load driving is executed again, if the lamp voltage Vla is lower than the fourth voltage Vla4 lower than the third voltage Vla3, the low-heat-load driving is executed again. At this point, in this embodiment, the low-heat-load current LTA supplied to the discharge lamp 90 in the low-heat-load driving changes to the second low-heat-load current LT2, the length td of the direct current period DC of which is smaller than the length td of the direct current period DC of the first low-heat-load current LT1. Therefore, it is possible to obtain action and effect equivalent to the action and effect obtained when the frequency f of the driving current I is further increased. Consequently, it is easier to form the protrusion 552p thin and small. It is easier to increase the lamp voltage Vla.

When the lamp voltage Vla still decrease even if the driving explained above is executed, it is possible to increase the lamp voltage Vla by further alternately performing the high-heat-load driving and the low-heat-load driving.

As explained above, according to this embodiment, when the lamp voltage Vla is lower than the first voltage Vla1, the driving is alternately switched in the order of the high-heat-load driving and the low-heat-load driving as the lamp voltage Vla decreases. Consequently, first, after the protrusion 552p is increased in thickness and size in the high-heat-load driving, it is possible to increase the lamp voltage Vla while stabilizing the shape of the protrusion 552p by repeating the low-heat-load driving and the high-heat-load driving. As a result, it is possible to suitably suppress the lamp voltage Vla from excessively decreasing irrespective of fluctuation of the discharge lamp 90.

If a difference between heat loads of the high-heat-load current HTA and the low-heat-load current LTA is excessively large, when the low-heat-load current LTA shifts to the high-heat-load current HTA, the protrusion 552p sometimes easily disappears.

On the other hand, according to this embodiment, the length td of the direct current period DC of the high-heat-load current HTA increases stepwise from the first high-heat-load current HT1 toward the third high-heat-load current HT3. The length td of the direct current period DC of the low-heat-load current LTA decreases stepwise from the first low-heat-load current LT1 toward the third low-heat-load current LT3. Consequently, the length td of the direct current period DC is relatively smaller in the high-heat-load current HTA provided when the lamp voltage Vla is high. The length td of the direct current period DC is relatively larger in the low-heat-load current LTA provided when the lamp voltage Vla is high. Therefore, in a stage when the lamp voltage Vla starts to decrease from the first voltage Vla1, a difference between changes of the heat loads can be set relatively small. Thereafter, the difference can be gradually increased as the lamp voltage Vla decreases. Consequently, it is possible to suitably apply a heat load to the first electrode 92 and suppress the lamp voltage Vla from excessively decreasing while suppressing the protrusion 552p from disappearing.

According to this embodiment, the first direct current period DC1 and the second direct current period DC2 are alternately provided across the first alternating current period AC1 or the second alternating current period AC2. Therefore, in both of the first electrode 92 and the second electrode 93, it is possible to stably maintain the protrusions 552p and 562p. Therefore, it is possible to further improve the life of the discharge lamp 90.

In the low power mode in which the driving power Wd is relatively smaller, the protrusion 552p more easily grows and the lamp voltage Vla more easily decreases. In the low power mode, the protrusion 552p is more easily reduced in thickness and size. Therefore, the effect explained above can be obtained particularly greatly in the low power mode.

According to this embodiment, the length td of the direct current period DC in the high-heat-load current HTA is larger as the driving power Wd is smaller. Therefore, in the low power mode in which the decrease of the lamp voltage Vla more easily occurs, it is easier to increase the melting degree of the protrusion 552p and increase the lamp voltage Vla. Consequently, it is possible to further suppress the lamp voltage Vla from excessively decreasing.

According to this embodiment, as the driving power Wd is smaller, the length td of the direct current period DC in the low-heat-load current LTA is smaller. Therefore, in the low power mode in which the decrease of the lamp voltage Vla more easily occurs, it is easier to increase the ratio of the alternating current period AC, form the protrusion 552p thin and small, and increase the lamp voltage Vla. Consequently, it is possible to further suppress the lamp voltage Vla from excessively decreasing.

When the driving power Wd is relatively large, the length td of the direct current period DC in the high-heat-load current HTA is relatively small and the length td of the direct current period DC in the low-heat-load current LTA is relatively large. When the driving power Wd is relatively large, since the heat load applied to the first electrode 92 is large, if the length td of the direct current period DC in the high-heat-load current HTA is set excessively large and the length td of the direct current period DC in the low-heat-load current LTA is set excessively small, the protrusion 552p sometimes easily disappears. According to this embodiment, when the driving power Wd is relatively large, it is possible to set the length td of the direct current period DC in the high-heat-load current HTA relatively small and set the length td of the direct current period DC in the low-heat-load current LTA relatively large. Consequently, when the driving power Wd is relatively large, it is possible to suppress the protrusion 552p from disappearing.

Note that, in this embodiment, it is also possible to adopt a configuration and a method explained below.

In the above explanation, as the high-heat-load current HTA, the three kinds of the high-heat-load current HTA, that is, the first high-heat-load current HT1 to the third high-heat-load current HT3 are described. As the low-heat-load current LTA, three kinds of the low-heat-load current LTA, that is, the first low-heat-load current LT1 to the third low-heat-load current LT3 are described. However, the high-heat-load current HTA and the low-heat-load current LTA are not limited to this. Each of the high-heat-load current HTA and the low-heat-load current LTA may be two or less kinds or four or more kinds of the high-heat-load current and the low-heat-load current.

In this embodiment, the first high-heat-load length Htd1, the second high-heat-load length Htd2, and the third high-heat-load length Htd3 may be the same value with one another. The first low-heat-load length Ltd1, the second low-heat-load length Ltd2, and the third low-heat-load length Ltd3 may be the same value with one another. When the high-heat-load lengths and the low-heat-load lengths are respectively the same, as the lamp voltage Vla decreases in a range in which the lamp voltage Vla is lower than the first voltage Vla1, one kind of the high-heat-load current HTA and one kind of the low-heat-load current LTA are alternately provided. In this case as well, it is possible to suppress the lamp voltage Vla from excessively decreasing.

When the length td of the direct current period DC is changed, only one of the length td1 of the first direct current period DC1 and the length td2 of the second direct current period DC2 may be changed. When both of the length td1 of the first direct current period DC1 and the length td2 of the second direct current period DC2 are changed, a change degree of the length td1 of the first direct current period DC1 and a change degree of the length td2 of the second direct current period DC2 may be different from each other.

The first period PH11 may include a plurality of first direct current periods DC1 and a plurality of first alternating current periods AC1. In this case, in the first period PH11, the first direct current periods DC1 and the first alternating current periods AC1 may be alternately repeated a plurality of times. The second period PH21 may include a plurality of second direct current periods DC2 and a plurality of second alternating current periods AC2. In this case, in the second period PH21, the second direct current periods DC2 and the second alternating current periods AC2 may be alternately repeated a plurality of times.

In the above explanation, the first alternating current period AC1 includes the three periods (the first frequency period P11 to the third frequency period P13) in which the frequencies f are different from one another. However, the first alternating current period AC1 is not limited to this. The alternating current period AC may be a period in which an alternating current having one frequency f is supplied to the discharge lamp 90 or may include periods in which alternating current having four or more frequencies f different from one another are supplied to the discharge lamp 90. The same applies to the second alternating current period AC2. The number of frequency periods included in the first alternating current period AC1 and the number of frequency periods included in the second alternating current period AC2 may be different from each other. A waveform of the alternating current in the first alternating current period AC1 and a waveform of the alternating current in the second alternating current period AC2 may be different from each other.

A pattern of a change in the length td of the direct current period DC in the high-heat-load current HTA and a pattern of a change in the length td of the direct current period DC in the low-heat-load current LTA corresponding to the driving power Wd are not particularly limited. The length td of the direct current period DC in the high-heat-load current HTA and the length td of the direct current period DC in the low-heat-load current LTA may change stepwise with respect to the driving power Wd. A relation between the length td of the direct current period DC in the high-heat-load current HTA and the driving power Wd and a relation between the length td of the direct current period DC in the low-heat-load current LTA and the driving power Wd may be represented by a quadratic function, an exponential function, or the like. Only one of the length td of the direct current period DC in the high-heat-load current HTA and the length td of the direct current period DC in the low-heat-load current LTA may change according to the driving power Wd. Both of the length td of the direct current period DC in the high-heat-load current HTA and the length td of the direct current period DC in the low-heat-load current LTA may not change according to the driving power Wd.

In this embodiment, after starting the projector 500, in a start-up period until the discharge lamp 90 is steadily lit, the control section 40 may determine driving to be executed. In this case, immediately after the projector 500 is started, the high-heat-load driving or the low-heat-load driving is sometimes executed. In the start-up period, the lamp voltage Vla applied to the discharge lamp 90 gradually increases toward the lamp voltage Vla at the steady lighting time. Therefore, when the driving executed in the start-up period is determined, a value of the lamp voltage Vla at the steady lighting time is estimated from the detected lamp voltage Vla.

Third Embodiment

A third embodiment is different from the second embodiment in a waveform of the driving current I. Note that, for example, components same as the components in the embodiments explained above are sometimes designated by the same reference numerals and signs to omit explanation of the components.

Figure 15:
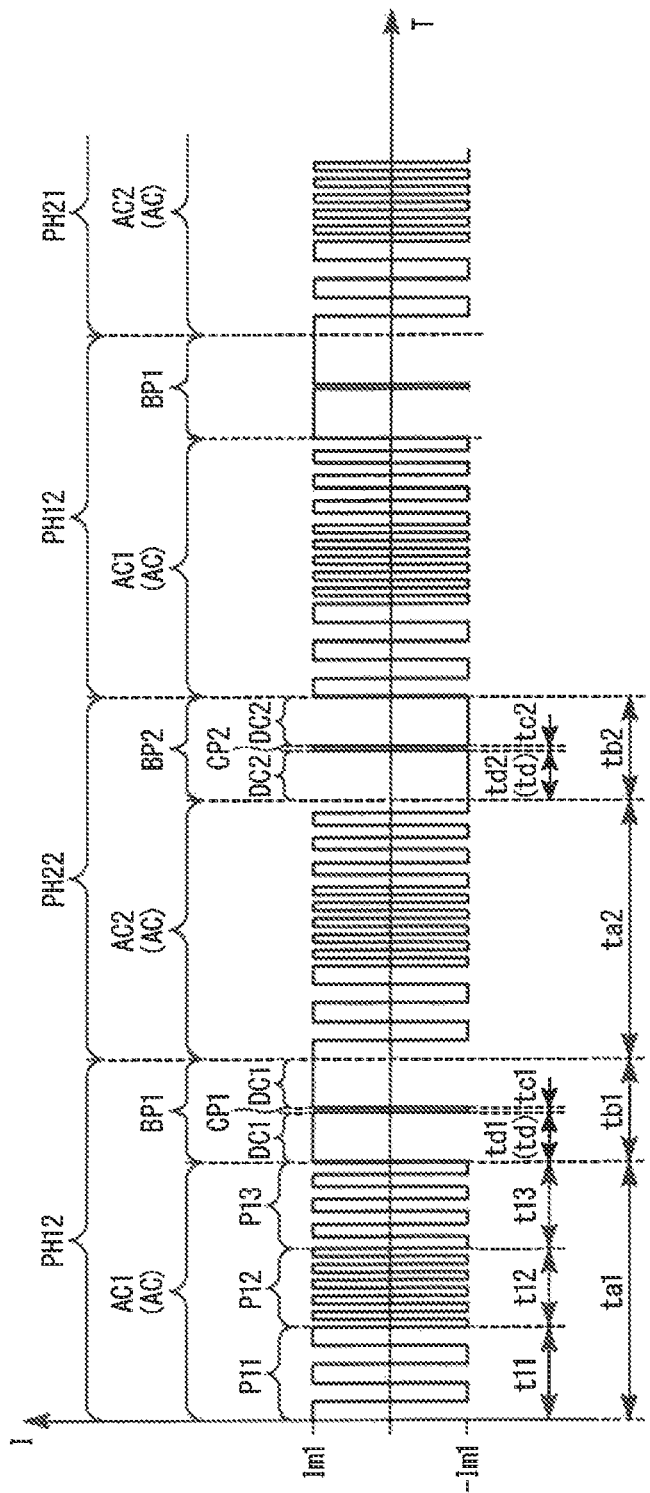
FIG. 15 is a diagram showing an example of a driving current in a third embodiment.

FIG. 15 is a diagram showing an example of the driving current I supplied to the discharge lamp 90 in this embodiment. In FIG. 15, the vertical axis indicates the driving current I and the horizontal axis indicates the time T. The driving current I is shown as positive when the driving current I is in a first polarity state and is shown as negative when the driving current I is in a second polarity state.

As shown in FIG. 15, in this embodiment, the control section 40 controls the discharge lamp driving section 230 such that a first period PH12 and a second period PH22 are alternately provided. The first period PH12 includes a first alternating current period AC1 and a first biased period BP1. In the first period PH12 in this embodiment, one first alternating current period AC1 and one first biased period BP1 are provided in this order. The first biased period BP1 consists of a plurality of first direct current periods DC1 and a first opposite polarity period CP1. In the example shown in FIG. 15, two first direct current periods DC1 and one first opposite polarity period CP1 are provided for each first biased period BP1.

The first opposite polarity period CP1 is a period provided between the first direct current periods DC1. A direct current having a second polarity is supplied to the discharge lamp 90 in the first opposite polarity period CP1. That is, in the first opposite polarity period CP1, a direct current having a polarity opposite to the polarity of the direct current supplied to the discharge lamp 90 in the first direct current periods DC1 is supplied to the discharge lamp 90. Length tc1 of the first opposite polarity period CP1 is smaller than length td1 of the first direct current period DC1 and smaller than 0.5 ms.

The second period PH22 includes a second alternating current period AC2 and a second biased period BP2. In the second period PH22 in this embodiment, one second alternating current period AC2 and one second biased period BP2 are provided in this order. The second biased period BP2 consists of a plurality of second direct current periods DC2 and a second opposite polarity period CP2. In the example shown in FIG. 15, two second direct current periods DC2 and one second opposite polarity period CP2 are provided for each second biased period BP2.

The second opposite polarity period CP2 is a period provided between the second direct current periods DC2. A direct current having a first polarity is supplied to the discharge lamp 90 in the second opposite polarity period CP2. That is, in the second opposite polarity period CP2, a direct current having a polarity opposite to the polarity of the direct current supplied to the discharge lamp 90 in the second direct current period DC2 is supplied to the discharge lamp 90. Length tc2 of the second opposite polarity period CP2 is smaller than length td2 of the second direct current period DC2 and smaller than 0.5 ms. In this embodiment, the configuration of the second biased period BP2 is the same as the configuration of the first biased period BP1 except that the polarity is inverted.

In this embodiment, the control section 40 changes the number of first direct current periods DC1 included in the first biased period BP1 and the number of second direct current periods DC2 included in the second biased period BP2 to change the length td of the direct current period DC. Specifically, for example, when the lamp voltage Vla is lower than the first voltage Vla1 and equal to or higher than the second voltage Vla2 lower than the first voltage Vla1, the control section 40 sets at least one of the number of first direct current periods DC1 included in the first biased period BP1 and the number of second direct current periods DC2 included in the second biased period BP2 to be larger than the number of first direct current periods DC1 included in the first biased period BP1 and the number of second direct current periods DC2 included in the second biased period BP2 when the lamp voltage Vla is equal to or higher than the first voltage Vla1. Consequently, it is possible to increase the length td of the direct current period DC.

When the lamp voltage Vla is lower than the second voltage Vla2, the control section 40 sets at least one of the number of first direct current periods DC1 included in the first biased period BP1 and the number of second direct current periods DC2 included in the second biased period BP2 to be smaller than the number of first direct current periods DC1 included in the first biased period BP1 and the number of second direct current periods DC2 included in the second biased period BP2 when the lamp voltage Vla is equal to or higher than the first voltage Vla1. Consequently, it is possible to reduce the length td of the direct current period DC.

The control section 40 changes the number of first direct current periods DC1 included in the first biased period BP1 and the number of second direct current periods DC2 included in the second biased period BP2 such that the length td of the direct current period DC changes in the same manner as the change in the length td of the direct current period DC explained in the second embodiment in accordance with a decrease of the lamp voltage Vla.

An example of the number of first direct current periods DC1 included in the first biased period BP1 and voltage values in electric current is shown in Table 3.

TABLE 3

| Lamp voltage Vla [V] | Driving current I | Number of first direct current periods DC1 included in the first biased period BP1 |
| --- | --- | --- |
| 60 or higher | Steady current STA | 2 |
| 58 or higher, lower than 60 | First high-heat-load current HT1 | 6 |
| 55 or higher, lower than 58 | First low-heat-load current LT1 | 1 |
| 53 or higher, lower than 55 | Second high-heat-load current HT2 | 7 |
| 50 or higher, lower than 53 | Second low-heat-load current LT2 | 0.5 |
| 47 or higher, lower than 50 | Third high-heat-load current HT3 | 8 |
| Lower than 47 | Third low-heat-load current LT3 | 0.25 |

In the example shown in Table 3, lengths td1 of the plurality of first direct current periods DC1 are the same with one another. In Table 3, values smaller than 1 means that the first biased period BP1 consists of only a part of the first direct current period DC1. For example, when the number of first direct current periods DC1 is 0.5, the first biased period BP1 consists of only a half of the first direct current period DC1. When the number of first direct current periods DC1 is equal to or smaller than 1, the first opposite polarity period CP1 is not provided. A waveform of the driving current I is the same as the waveform shown in FIG. 11. The number of second direct current periods DC2 included in the second biased period BP2 is the same as, for example, Table 3.

For example, when the length td1 of the first direct current period DC1 is increased to be equal to or larger than a certain degree, the temperature of the second electrode 93 functioning as a cathode sometimes excessively decreases in the first direct current period DC1. In this case, when the second electrode 93 having the low temperature is heated and melted, in some case, the temperature of the second electrode 93 less easily increases and the protrusion 562p of the second electrode 93 is less easily melted. Consequently, the second electrode 93 is deformed and a flicker and blackening easily occur. The illuminance of the projector 500 sometimes decreases. Consequently, the life of the discharge lamp 90 sometimes cannot be suitably improved.

On the other hand, according to this embodiment, in the first biased period BP1, the first opposite polarity period CP1 is provided between the plurality of first direct current periods DC1. In the first opposite polarity period CP1, since the second electrode 93 is an anode, the second electrode 93 is heated. Consequently, it is possible to suppress the temperature of the second electrode 93 from excessively decreasing while increasing the length td of the direct current period DC with the plurality of first direct current periods DC1 and improving a melting amount of the protrusion 552p. Therefore, it is possible to suppress the deformation of the second electrode 93 and suppress the occurrence of a flicker and blackening and the decrease in the illuminance of the projector 500. As a result, according to this embodiment, it is possible to further improve the life of the discharge lamp 90. The same applies to the second biased period BP2.

According to this embodiment, the number of first direct current periods DC1 is changed to change the length td of the direct current period DC. Therefore, it is possible to change the length td of the direct current period DC in the same manner as explained in the second embodiment without changing the length td1 of the first direct current period DC1. Consequently, it is possible to improve the life of the discharge lamp 90. Even when the number of first direct current periods DC1 increases, since the first opposite polarity period CP1 is provided between the first direct current periods DC1, it is possible to suitably suppress the temperature of the second electrode 93 from excessively decreasing. The same applies to the second biased period BP2.

Note that, in this embodiment, the control section 40 may change only one of the number of first direct current periods DC1 included in the first biased period BP1 and the number of second direct current periods DC2 included in the second biased period BP2. The lengths td1 of the plurality of first direct current periods DC1 may be different from each other. The lengths td2 of the plurality of second direct current periods DC2 may be different from each other.

The number of first direct current periods DC1 included in the first biased period BP1 and the number of second direct current periods DC2 included in the second biased period BP2 may be different from each other. Length tb1 of the first biased period BP1 and length tb2 of the second biased period BP2 may be different from each other.

The first period PH12 may include a plurality of first biased periods BP1 and a plurality of first alternating current periods AC1. In this case, in the first period PH12, the first biased periods BP1 and the first alternating current periods AC1 may be alternately repeated a plurality of times. The second period PH22 may include a plurality of second biased periods BP2 and a plurality of second alternating current periods AC2. In this case, in the second period PH22, the second biased periods BP2 and the second alternating current periods AC2 may be alternately repeated a plurality of times.

The control section 40 may change the length td1 of the first direct current period DC1 and the length td2 of the second direct current period DC2 and change the length td of the direct current period DC without changing the number of first direct current periods DC1 included in the first biased period BP1 and the number of second direct current periods DC2 included in the second biased period BP2. In this case, the lengths td1 may be changed in all of the plurality of first direct current periods DC1 or the lengths td1 may be changed in a part of the plurality of first direct current periods DC1. The lengths td2 may be changed in all of the plurality of second direct current periods DC2 or the lengths td2 may be changed in a part of the plurality of second direct current periods DC2. When the lengths td1 of the plurality of first direct current periods DC1 are changed, a change amount of the length td1 may be the same or may be different for each of the first direct current periods DC1. When the lengths td2 of the plurality of second direct current periods DC2 are changed, a change amount of the length td2 may be the same or may be different for each of the second direct current periods DC2.

Fourth Embodiment

A fourth embodiment is different from the first embodiment in that an alternating current period including a plurality of periods in which alternating current having different frequencies f are supplied to the discharge lamp 90 is provided and the control section 40 changes ratios of the periods in the alternating current period. Note that, for example, components same as the components in the embodiments are sometimes designated by the same reference numerals and signs to omit explanation of the components.

Figure 16:
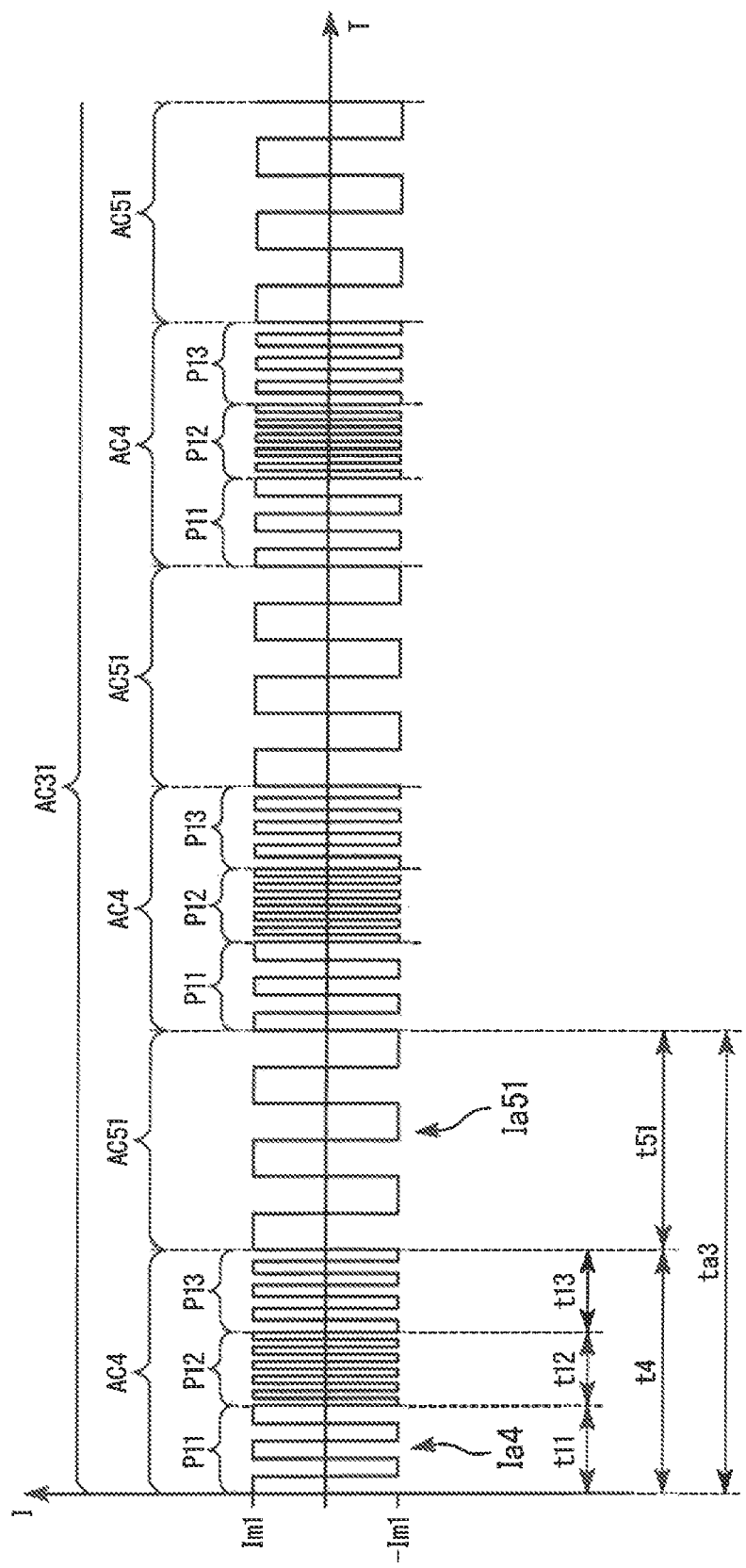
FIG. 16 is a diagram showing an example of a driving current in a fourth embodiment.

FIG. 16 is a diagram showing an example of the driving current I supplied to the discharge lamp 90 in this embodiment. In FIG. 16, the vertical axis indicates the driving current I and the horizontal axis indicates the time T. The driving current I is shown as positive when the driving current I is in a first polarity state and is shown as negative when the driving current I is in a second polarity state.

As shown in FIG. 16, in this embodiment, the control section 40 controls the discharge lamp driving section 230 such that a third alternating current period AC31 is provided. The third alternating current period AC31 is a period in which an alternating current is supplied to the discharge lamp 90. In the example shown in FIG. 16, in the third alternating current period AC31, the driving current I of a rectangular wave in which a polarity is inverted a plurality of times between the current value Im1 and the current value −Im1 is supplied to the discharge lamp 90. The third alternating current period AC31 alternately includes a fourth alternating current period AC4 and a fifth alternating current period AC51.

The fourth alternating current period AC4 is a period in which a fourth alternating current Ia4 is supplied to the discharge lamp 90. In this embodiment, the fourth alternating current period AC4 includes the first frequency period P11, the second frequency period P12, and the third frequency period P13. That is, in this embodiment, the fourth alternating current period AC4 is the same as the first alternating current period AC1 in the second embodiment. As explained above, the first frequency period P11, the second frequency period P12, and the third frequency period P13 are different from one another in the frequency f of the driving current I supplied to the discharge lamp 90. That is, in this embodiment, the fourth alternating current period AC4 includes a plurality of periods in which the frequencies f of the fourth alternating current Ia4 are different from one another.

In the example shown in FIG. 16, the frequency f of the fourth alternating current Ia4 increases in the order of the first frequency period P11, the third frequency period P13, and the second frequency period P12. As an example, the frequency f of the fourth alternating current Ia4 in the first frequency period P11 is 135 Hz. The frequency f of the fourth alternating current Ia4 in the second frequency period P12 is 280 Hz. The frequency f of the fourth alternating current Ia4 in the third frequency period P13 is 165 Hz.

The fifth alternating current period AC51 is a period in which a fifth alternating current Ia51 is supplied to the discharge lamp 90. The fifth alternating current Ia51 has the frequency f lower than the frequency f of the fourth alternating current Ia4. As an example, the frequency f of the fifth alternating current Ia51 is 55 Hz. In the example shown in FIG. 16, the frequency f of the fifth alternating current Ia51 is, for example, constant in the fifth alternating current period AC51. Length t51 of the fifth alternating current period AC51 may be the same as or may be different from length t4 of the fourth alternating current period AC4.

In this embodiment, the control section 40 is capable of executing steady driving, high-heat-load driving, and low-heat-load driving as driving modes of the discharge lamp 90. In the respective kinds of driving in this embodiment, a ratio rt of the fifth alternating current period AC51 in the third alternating current period AC31 is different from the ratio rt in the second and third embodiments. The ratio rt of the fifth alternating current period AC51 in the third alternating current period AC31 means a ratio of the sum of lengths t51 of a plurality of fifth alternating current periods AC51 to the length of the third alternating current period AC31. For example, it is assumed that, when the number of fourth alternating current periods AC4 and the number of fifth alternating current periods AC51 included in the third alternating current period AC31 are the same, lengths t4 of a plurality of fourth alternating current periods AC4 are the same with one another and the lengths t51 of the plurality of fifth alternating current periods AC51 are the same with one another. In this case, the ratio rt is a ratio of the length t51 of the fifth alternating current period AC51 to length ta3 obtained by adding up the length t4 of the fourth alternating current period AC4 and the length t51 of the fifth alternating current period AC51. Note that, in the following explanation, the ratio rt of the fifth alternating current period AC51 in the third alternating current period AC31 is sometimes simply referred to as ratio rt of the fifth alternating current period AC51.

The high-heat-load driving in this embodiment is driving in which the ratio rt of the fifth alternating current period AC51 is large with respect to the steady driving in this embodiment. The frequency f of the fifth alternating current Ia51 in the fifth alternating current period AC51 is lower than the frequency f of the fourth alternating current Ia4 in the fourth alternating current period AC4. Therefore, a heat load applied to the first electrode 92 in the fifth alternating current period AC51 is larger than a heat load applied to the first electrode 92 in the fourth alternating current period AC4. Consequently, a heat load applied to the first electrode 92 in the high-heat-load driving is larger than the heat load in the steady driving.

The low-heat-load driving in this embodiment is driving in which the ratio rt of the fifth alternating current period AC51 is small with respect to the steady driving in this embodiment. Consequently, a heat load applied to the first electrode 92 in the low-heat-load driving is smaller than the heat load in the steady driving. The control section 40 switches the steady driving, the high-heat-load driving, and the low-heat-load driving according to the lamp voltage Vla.

Figure 17:
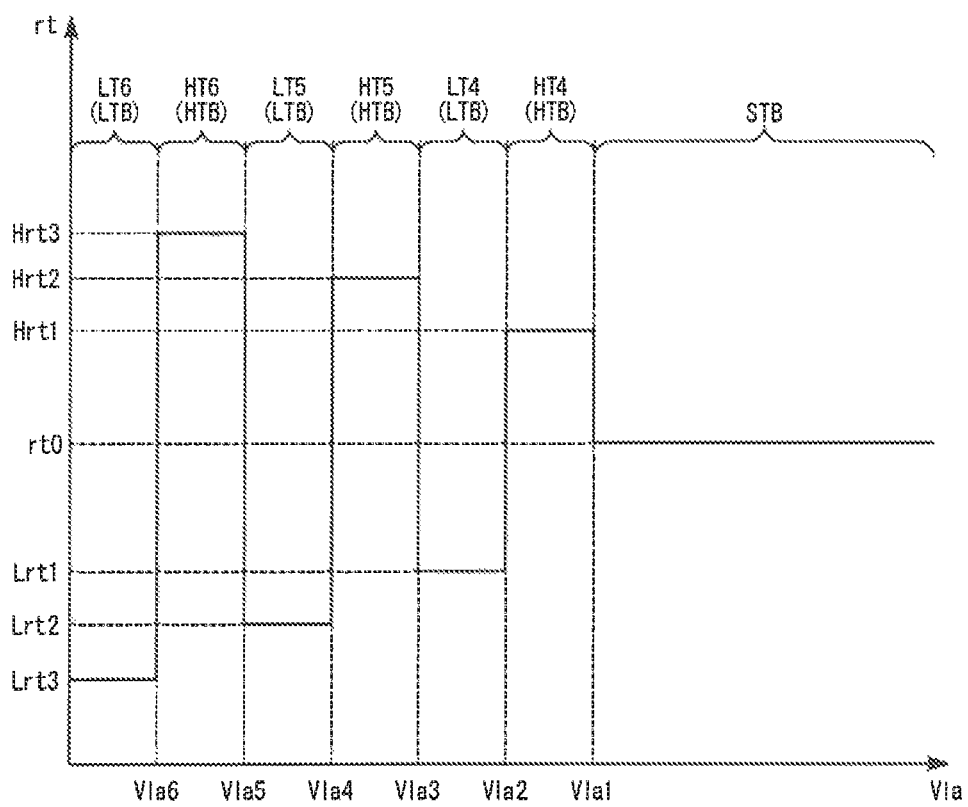
FIG. 17 is a graph showing a change in a ratio of a second alternating current period with respect to a lamp voltage in the fourth embodiment.

FIG. 17 is a graph showing a change in the ratio rt of the fifth alternating current period AC51 with respect to the lamp voltage Vla. In FIG. 17, the vertical axis indicates the ratio rt of the fifth alternating current period AC51 and the horizontal axis indicates the lamp voltage Vla. In FIG. 17, numerical value regions of the lamp voltage Vla are also shown in which the driving current I, that is, a steady current STB, a high-heat-load current HTB, and a low-heat-load current LTB are supplied to the discharge lamp 90.

The steady current STB is the driving current I supplied to the discharge lamp 90 in the steady driving in this embodiment. The high-heat-load current HTB is the driving current I supplied to the discharge lamp 90 in the high-heat-load driving in this embodiment. The low-heat-load current LTB is the driving current I supplied to the discharge lamp 90 in the low-heat-load driving in this embodiment. In this embodiment, for example, the electric current is the same as the driving current I shown in FIG. 16 in a waveform and are different from one another in the ratio rt of the fifth alternating current period AC51.

As shown in FIG. 17, when the lamp voltage Vla is equal to or higher than the first voltage Vla1, the steady driving is executed. The driving current I is the steady current STB. The ratio rt of the fifth alternating current period AC51 in the steady current STB is a steady ratio (a first ratio) rt0. When the lamp voltage Vla is lower than the first voltage Vla1, the high-heat-load driving and the low-heat-load driving are alternately executed as the lamp voltage Vla decreases. That is, the driving current I is alternately switched between the high-heat-load current HTB and the low-heat-load current LTB.

In an example shown in FIG. 17, the high-heat-load current HTB includes a fourth high-heat-load current HT4, a fifth high-heat-load current HT5, and a sixth high-heat-load current HT6. The low-heat-load current LTB includes a fourth low-heat-load current LT4, a fifth low-heat-load current LT5, and a sixth low-heat-load current LT6. The electric current is provided in the order of the fourth high-heat-load current HT4, the fourth low-heat-load current LT4, the fifth high-heat-load current HT5, the fifth low-heat-load current LT5, the sixth high-heat-load current HT6, and the sixth low-heat-load current LT6 as the lamp voltage Vla decreases.

The fourth high-heat-load current HT4 is the driving current I supplied to the discharge lamp 90 when the lamp voltage Vla is lower than the first voltage Vla1 and equal to or higher than the second voltage Vla2 lower than the first voltage Vla1. The ratio rt of the fifth alternating current period AC51 in the fourth high-heat-load current HT4 is a first high-heat-load ratio Hrt1. The first high-heat-load ratio Hrt1 is larger than the steady ratio rt0.

The fourth low-heat-load current LT4 is the driving current I supplied to the discharge lamp 90 when the lamp voltage Vla is lower than the second voltage Vla2 and equal to or higher than the third voltage Vla3 lower than the second voltage Vla2. The ratio rt of the fifth alternating current period AC51 in the fourth low-heat-load current LT4 is a first low-heat-load ratio Lrt1. The first low-heat-load ratio Lrt1 is smaller than the steady ratio rt0.

The fifth high-heat-load current HT5 is the driving current I supplied to the discharge lamp 90 when the lamp voltage Vla is lower than the third voltage Vla3 and equal to or higher than the fourth voltage Vla4 lower than the third voltage Vla3. The ratio rt of the fifth alternating current period AC51 in the fifth high-heat-load current HT5 is a second high-heat-load ratio Hrt2. The second high-heat-load ratio Hrt2 is larger than the steady ratio rt0 and larger than the first high-heat-load ratio Hrt1.

The fifth low-heat-load current LT5 is the driving current I supplied to the discharge lamp 90 when the lamp voltage Vla is lower than the fourth voltage Vla4 and equal to or higher than the fifth voltage Vla5 lower than the fourth voltage Vla4. The ratio rt of the fifth alternating current period AC51 in the fifth low-heat-load current LT5 is a second low-heat-load ratio Lrt2. The second low-heat-load ratio Lrt2 is smaller than the steady ratio rt0 and smaller than the first low-heat-load ratio Lrt1.

The sixth high-heat-load current HT6 is the driving current I supplied to the discharge lamp 90 when the lamp voltage Vla is lower than the fifth voltage Vla5 and equal to or higher than the sixth voltage Vla6 lower than the fifth voltage Vla5. The ratio rt of the fifth alternating current period AC51 in the sixth high-heat-load current HT6 is a third high-heat-load ratio Hrt3. The third high-heat-load ratio Hrt3 is larger than the steady ratio rt0 and larger than the second high-heat-load ratio Hrt2.

The sixth low-heat-load current LT6 is the driving current I supplied to the discharge lamp 90 when the lamp voltage Vla is lower than the sixth voltage Vla6. The ratio rt of the fifth alternating current period AC51 in the sixth low-heat-load current LT6 is a third low-heat-load ratio Lrt3. The third low-heat-load ratio Lrt3 is smaller than the steady ratio rt0 and smaller than the second low-heat-load ratio Lrt2.

An example of the ratios rt of the fifth alternating current period AC51 and voltage values in the electric current is shown in Table 4.

TABLE 4

| Lamp voltage Vla [V] | Driving current I | Ratio rt of the fifth alternating current period AC51 [%] |
|---|---|---|
| 60 or higher | Steady current STB | 48.4 |
| 58 or higher, lower than 60 | Fourth high-heat-load current HT4 | 78.9 |
| 55 or higher, lower than 58 | Fourth low-heat-load current LT4 | 7.4 |
| 53 or higher, lower than 55 | Fifth high-heat-load current HT5 | 96.0 |
| 50 or higher, lower than 53 | Fifth low-heat-load current LT5 | 1.3 |
| 47 or higher, lower than 50 | Sixth high-heat-load current HT6 | 99.5 |
| Lower than 47 | Sixth low-heat-load current LT6 | 0.0 |

Note that, when the ratio rt of the fifth alternating current period AC51 is 0, the fifth alternating current period AC51 is not provided. In this case, the third alternating current period AC31 consists of, for example, only the fourth alternating current period AC4.

In the following explanation, driving in which the fourth high-heat-load current HT4 is supplied to the discharge lamp 90 is referred to as fourth high-heat-load driving. Driving in which the fifth high-heat-load current HT5 is supplied to the discharge lamp 90 is referred to as fifth high-heat-load driving. Driving in which the sixth high-heat-load current HT6 is supplied to the discharge lamp 90 is referred to as sixth high-heat-load driving. Driving in which the fourth low-heat-load current LT4 is supplied to the discharge lamp 90 is referred to as fourth low-heat-load driving. Driving in which the fifth low-heat-load current LT5 is supplied to the discharge lamp 90 is referred to as fifth low-heat-load driving. Driving in which the sixth low-heat-load current LT6 is supplied to the discharge lamp 90 is referred to as sixth low-heat-load driving.

Figure 18:
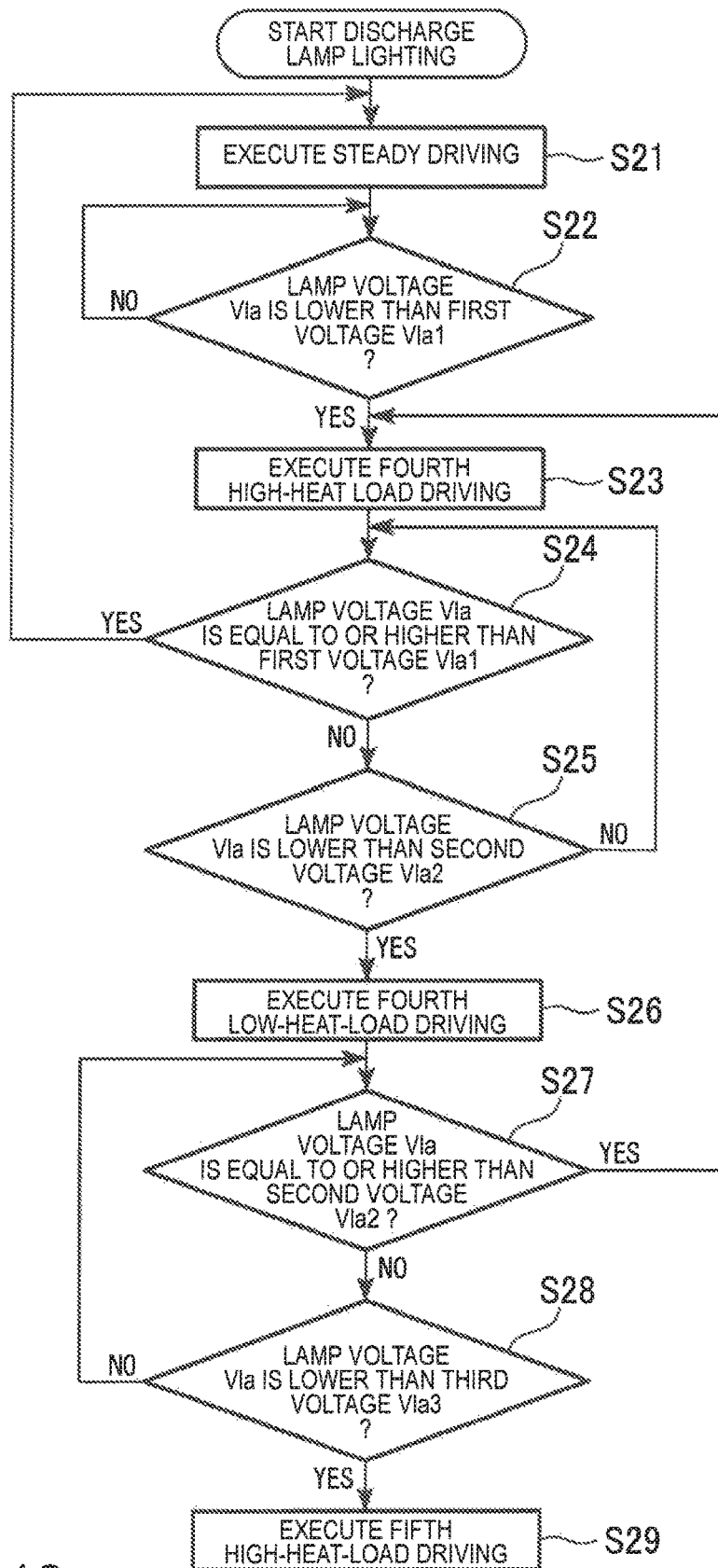
FIG. 18 is a flowchart for explaining an example of a control procedure by a control section in the fourth embodiment.

FIG. 18 is a flowchart for explaining an example of a control procedure by the control section 40 in this embodiment. In FIG. 18, a procedure for switching the driving of the discharge lamp 90 is shown. As shown in FIG. 18, in an initial state, the control section 40 executes the steady driving (step S21). During the execution of the steady driving, the control section 40 causes the voltage detecting section of the operation detecting section 60 to detect the lamp voltage Vla and determines whether the detected lamp voltage Vla is lower than the first voltage Vla1 (step S22).

When the lamp voltage Vla is equal to or higher than the first voltage Vla1 (NO in step S22), the control section 40 continuously executes the steady driving. That is, when the lamp voltage Vla is equal to or higher than the first voltage Vla1, the control section 40 sets the ratio rt of the fifth alternating current period AC51 to the steady ratio rt0. Note that the initial lamp voltage Vla is higher than the first voltage Vla1.

On the other hand, when the lamp voltage Vla is lower than the first voltage Vla1 (YES ins step S22), the control section 40 switches the driving from the steady driving and executes the fourth high-heat-load driving (step S23).

During the execution of the fourth high-heat-load driving, the control section 40 determines whether the lamp voltage Vla is equal to or higher than the first voltage Vla1 (step S24) and determines whether the lamp voltage Vla is lower than the second voltage Vla2 (step S25). The lamp voltage Vla increases according to the execution of the fourth high-heat-load driving. When the lamp voltage Vla is equal to or higher than the first voltage Vla1 (YES in step S24), the control section 40 switches the driving from the fourth high-heat-load driving and executes the steady driving again (step S21).

When the lamp voltage Vla remains lower than the first voltage Vla1 (NO in step S24) and when the lamp voltage Vla is equal to or higher than the second voltage Vla2 (NO in step S25), the control section 40 continuously executes the fourth high-heat-load driving. That is, when the lamp voltage Vla is lower than the first voltage Vla1 and equal to or higher than the second voltage Vla2 lower than the first voltage Vla1, the control section 40 sets the ratio rt of the fifth alternating current period AC51 to be larger than the steady ratio rt0. In this case, the high-heat-load current HTB supplied to the discharge lamp 90 is the fourth high-heat-load current HT4, the ratio rt of the fifth alternating current period AC51 of which is the first high-heat-load ratio Hrt1. That is, when the lamp voltage Vla is lower than the first voltage Vla1 and equal to or higher than the second voltage Vla2 lower than the first voltage Vla1, the control section 40 sets the ratio rt of the fifth alternating current period AC51 to the first high-heat-load ratio Hrt1 larger than the steady ratio rt0.

When the lamp voltage Vla is lower than the second voltage Vla2 (YES in step S25), the control section 40 executes the fourth low-heat-load driving (step S26). That is, when the lamp voltage Vla is lower than the second voltage Vla2, the control section 40 sets the ratio rt of the fifth alternating current period AC51 to be smaller than the steady ratio rt0.

During the execution of the fourth low-heat-load driving, the control section 40 determines whether the lamp voltage Vla is equal to or higher than the second voltage Vla2 (step S27) and determines whether the lamp voltage Vla is lower than the third voltage Vla3 (step S28). When the lamp voltage Vla increases according to the execution of the fourth low-heat-load driving and the lamp voltage Vla is equal to or higher than the second voltage Vla2 (YES in step S27), the control section 40 switches the driving from the fourth low-heat-load driving and executes the fourth high-heat-load driving again (step S23).

When the lamp voltage Vla remains lower than the second voltage Vla2 (NO in step S27) and when the lamp voltage Vla is equal to or higher than the third voltage Vla3 (NO in step S28), the control section 40 continuously executes the fourth low-heat-load driving. In this case, the low-heat-load current LTB supplied to the discharge lamp 90 is the fourth low-heat-load current LT4, the ratio rt of the fifth alternating current period AC51 of which is the first low-heat-load ratio Lrt1. That is, when the lamp voltage Vla is lower than the second voltage Vla2 and equal to or higher than the third voltage Vla3, the control section 40 sets the ratio rt of the fifth alternating current period AC51 to the first low-heat-load ratio Lrt1 smaller than the steady ratio rt0.

When the lamp voltage Vla is lower than the third voltage Vla3 (YES in step S28), the control section 40 executes the fifth high-heat-load driving (step S29). In this case, the high-heat-load current HTB supplied to the discharge lamp 90 is the fifth high-heat-load current HT5, the ratio rt of the fifth alternating current period AC51 of which is the second high-heat-load ratio Hrt2. That is, when the lamp voltage Vla is lower than the third voltage Vla3 lower than the second voltage Vla2, the control section 40 sets the ratio rt of the fifth alternating current period AC51 to the second high-heat-load ratio Hrt2 larger than the first high-heat-load ratio Hrt1.

Although not shown in the figure, thereafter, during the execution of the fifth high-heat-load driving, the control section 40 determines whether the lamp voltage Vla is equal to or higher than the third voltage Vla3 and determines whether the lamp voltage Vla is lower than the fourth voltage Val4. Consequently, if the lamp voltage Vla is equal to or higher than the third voltage Vla3, the control section 40 executes the fourth low-heat-load driving again. If the lamp voltage Vla is lower than the third voltage Vla3 and equal to or higher than the fourth voltage Vla4, the control section continuously executes the fifth high-heat-load driving.

When the lamp voltage Vla is lower than the fourth voltage Vla4, the control section 40 executes the fifth low-heat-load driving. In this case, the low-heat-load current LTB supplied to the discharge lamp 90 is the fifth low-heat-load current LT5, the ratio rt of the fifth alternating current period AC51 of which is the second low-heat-load ratio Lrt2. That is, when the lamp voltage Vla is lower than the fourth voltage Vla4 lower than the third voltage Vla3, the control section 40 sets the ratio rt of the fifth alternating current period AC51 to the second low-heat-load ratio Lrt2 smaller than the first low-heat-load ratio Lrt1. Thereafter, the control section 40 executes the sixth high-heat-load driving and the sixth low-heat-load driving in the same manner according to a decrease of the lamp voltage Vla.

As explained above, according to the lamp voltage Vla, the control section 40 switches the respective kinds of driving and switches the driving current I supplied to the discharge lamp 90.

Figure 19:
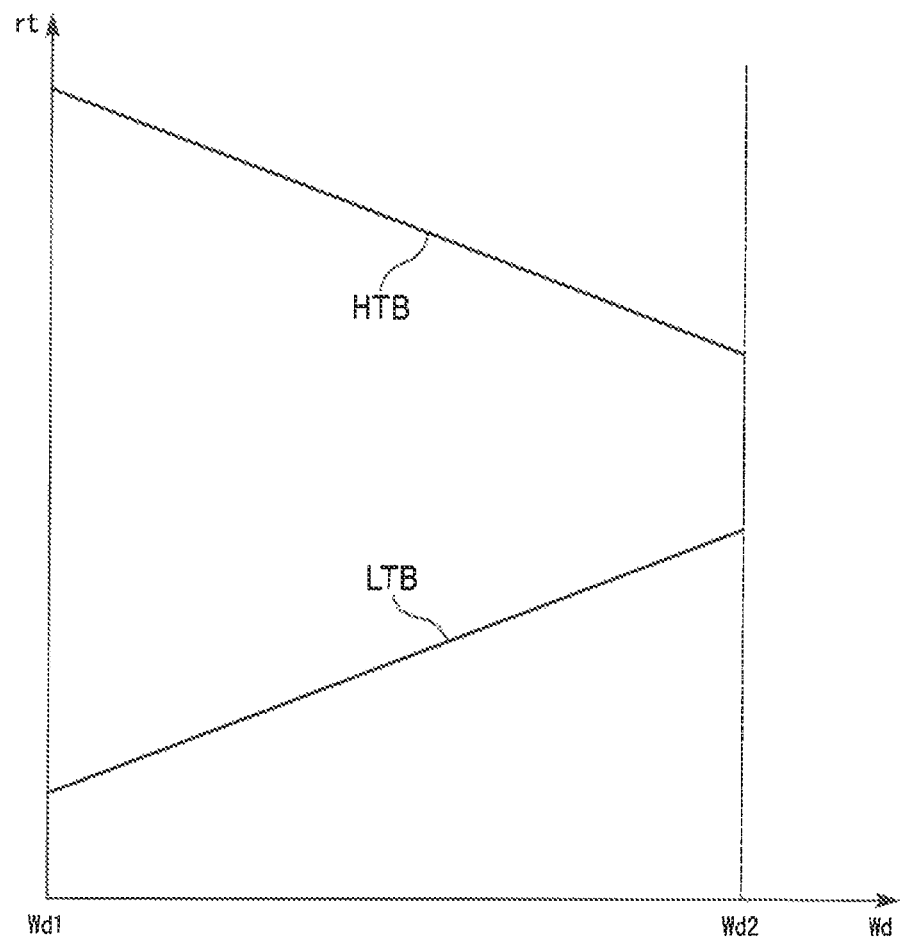
FIG. 19 is a graph showing a change in a ratio of the second alternating current period with respect to driving power in the fourth embodiment.

In this embodiment, the control section 40 changes, according to the driving power Wd, the ratio rt of the fifth alternating current period AC51 in the high-heat-load current HTB and the ratio rt of the fifth alternating current period AC51 in the low-heat-load current LTB. FIG. 19 is a graph showing a change in the ratio rt of the fifth alternating current period AC51 with respect to the driving power Wd in this embodiment. In FIG. 19, the vertical axis indicates the ratio rt of the fifth alternating current period AC51 and the horizontal axis indicates the driving power Wd.

As shown in FIG. 19, the ratio rt of the fifth alternating current period AC51 in the high-heat-load current HTB increases as the driving power Wd decreases. That is, the control section 40 sets, as the driving power Wd supplied to the discharge lamp 90 is smaller, the ratio rt of the fifth alternating current period AC51 larger when the ratio rt of the fifth alternating current period AC51 is larger than the steady ratio rt0. In this embodiment, a relation between the ratio rt of the fifth alternating current period AC51 in the high-heat-load current HTB and the driving power Wd can be represented by, for example, a linear function.

The ratio rt of the fifth alternating current period AC51 in the low-heat-load current LTB decreases as the driving power Wd decreases. That is, the control section 40 sets, as the driving power Wd supplied to the discharge lamp 90 is smaller, the ratio rt of the fifth alternating current period AC51 smaller when the ratio rt of the fifth alternating current period AC51 is smaller than the steady ratio rt0. In this embodiment, a relation between the ratio rt of the fifth alternating current period AC51 in the low-heat-load current LTB and the driving power Wd can be represented by, for example, a linear function.

For example, when the driving power Wd changes from the second driving power Wd2 to the first driving power Wd1 smaller than the second driving power Wd2, the first high-heat-load ratio Hrt1, the second high-heat-load ratio Hrt2, and the third high-heat-load ratio Hrt3 respectively increase and the first low-heat-load ratio Lrt1, the second low-heat-load ratio Lrt2, and the third low-heat-load ratio Lrt3 respectively decrease.

Note that, at this point, increasing degrees of the ratios rt of the fifth alternating current periods AC51 in the high-heat-load current HTB may be the same with one another or may be different from one another. Decreasing degrees of the ratios rt of the fifth alternating current periods AC51 in the low-heat-load current LTB may be the same with one another or may be different from one another. The steady ratio rt0 may change or may not change according to a change in the driving power Wd.

In this embodiment, the control section 40 changes the length t4 of the fourth alternating current period AC4 to change the ratio rt of the fifth alternating current period AC51. That is, in the steady driving, the high-heat-load driving, and the low-heat-load driving, the lengths t4 of the fourth alternating current periods AC4 are different from one another. Specifically, when increasing the ratio rt of the fifth alternating current period AC51, the control section 40 reduces the length t4 of the fourth alternating current period AC4. When reducing the ratio rt of the fifth alternating current period AC51, the control section 40 increases the length t4 of the fourth alternating current period AC4. In this case, in the steady driving, the high-heat-load driving, and the low-heat-load driving, the length t51 of the fifth alternating current period AC51 does not change. An example of a change in the length t4 of the fourth alternating current period AC4 with respect to a change in the lamp voltage Vla is shown in Table 5.

TABLE 5

| | Number of cycles of the fourth alternating current period AC4 | | |
|---|---|---|---|
| Lamp voltage Vla [V] | First frequency period P11 (frequency: 135 [Hz]) | Second frequency period P12 (frequency: 280 [Hz]) | Third frequency period P13 (frequency: 165 [Hz]) |
| 60 or higher | 5 | 12 | 5 |
| 58 or higher, lower than 60 | 4 | 6 | 4 |
| 55 or higher, lower than 58 | 10 | 30 | 10 |
| 53 or higher, lower than 55 | 3 | 4 | 3 |
| 50 or higher, lower than 53 | 20 | 60 | 20 |
| 47 or higher, lower than 50 | 1 | 1 | 1 |
| Lower than 47 | 40 | 120 | 40 |

In Table 5, the length t4 of the fourth alternating current period AC4 is shown as the number of cycles of the fourth alternating current period AC4. In the example shown in Table 5, the control section 40 changes the number of cycles of the fourth alternating current Ia4 supplied to the discharge lamp 90 without changing the frequencies f of the fourth alternating current Ia4 in the frequency periods and changes the length t4 of the fourth alternating current period AC4. In the example shown in Table 5, the number of cycles of the fourth alternating current Ia4 changes in all of the frequency periods, that is, the first frequency period P11, the second frequency period P12, and the third frequency period P13. Note that the number of cycles of the fourth alternating current Ia4 may be changed only in a part of the first frequency period P11, the second frequency period P12, and the third frequency period P13.

The control by the control section 40 explained above can be represented as a discharge lamp driving method as well. That is, a form of the discharge lamp driving method in this embodiment is a discharge lamp driving method for supplying the driving current I to the discharge lamp 90 including the first electrode 92 and the second electrode 93 and driving the discharge lamp 90, the discharge lamp driving method including supplying, to the discharge lamp 90, the driving current I including the third alternating current period AC31 alternately including the fourth alternating current period AC4 in which the fourth alternating current Ia4 is supplied to the discharge lamp 90 and the fifth alternating current period AC51 in which the fifth alternating current Ia51, the frequency f of which is lower than the frequency f of the fourth alternating current Ia4, is supplied to the discharge lamp 90, setting the ratio rt of the fifth alternating current period AC51 in the third alternating current period AC31 to the steady ratio rt0 when the lamp voltage Vla of the discharge lamp 90 is equal to or higher than the first voltage Vla1, setting the ratio rt of the fifth alternating current period AC51 to be larger than the steady ratio rt0 when the lamp voltage Vla is lower than the first voltage Vla1 and equal to or higher than the second voltage Vla2 lower than the first voltage Vla1, and setting the ratio rt of the fifth alternating current period AC51 to be smaller than the steady ratio rt0 when the lamp voltage Vla is lower than the second voltage Vla2.

According to this embodiment, when the lamp voltage Vla decreases to be lower than the first voltage Vla1 in the steady driving, the high-heat-load driving, in which the ratio rt of the fifth alternating current period AC51 is larger than the ratio rt in the steady driving, is executed. That is, in this embodiment, the fourth high-heat-load current HT4, the length rt of the fifth alternating current period AC51 of which is the first high-heat-load ratio Hrt1, is supplied to the discharge lamp 90. Therefore, the melting degree of the protrusion 552p of the first electrode 92 increases and the protrusion 552p can be formed thick and large. Consequently, it is possible to suppress the deterioration of the discharge lamp 90 from being accelerated. Since the melting degree of the protrusion 552p increases, the inter-electrode distance increases and the lamp voltage Vla easily increases.

Since the protrusion 552p is formed thick and large, it is possible to suppress the protrusion 552p from disappearing even when the lamp voltage Vla increases and driving returns to the steady driving. Even when the low-heat-load driving is executed after the high-heat-load driving, the protrusion 552p is not excessively reduced in thickness. It is possible to suppress the protrusion 552p from disappearing when the driving is switched from the low-heat-load driving to the high-heat-load driving. Therefore, according to this embodiment, it is possible to suppress a flicker and blackening and devitrification from occurring.

In some case, even if the high-heat-load driving in this embodiment is executed, the lamp voltage Vla less easily increases and further decreases because of fluctuation in the quality of the discharge lamp 90, in particular, fluctuation in the quality of the first electrode 92 and the second electrode 93. In this case, if the high-heat-load driving is continued, since the melting degree of the protrusion 552p is large, the decrease of the lamp voltage Vla is sometimes accelerated. In some case, the protrusion 552p is flattened, a bright spot of arc discharge easily moves on the protrusion 552p, and a flicker easily occurs. Since the bright spot of the arc discharge moves, in some case, fluctuation in an angle of light emitted from the discharge lamp 90 increases and light eclipsed by the optical system of the projector 500 increases. Consequently, the illuminance of the projector 500 sometimes decreases.

On the other hand, according to this embodiment, when the lamp voltage Vla continues to decrease even if the high-heat-load driving is executed, if the lamp voltage Vla is lower than the second voltage Vla2 lower than the first voltage Vla1, the low-heat-load driving, in which the ratio rt of the fifth alternating current period AC51 is smaller than the ratio rt in the steady driving, is executed. That is, in this embodiment, the fourth low-heat-load current LT4, the ratio rt of the fifth alternating current period AC51 of which is the first low-heat-load ratio Lrt1, is supplied to the discharge lamp 90. An average frequency in the third alternating current period AC31 is higher as the ratio rt of the fifth alternating current period AC51 is smaller. Therefore, by reducing the ratio rt of the fifth alternating current period AC51, it is possible to obtain action and effect equivalent to the action and effect obtained when the frequency f of the driving current I is increased. Consequently, it is possible to increase the lamp voltage Vla while suppressing the protrusion 552p from being flattened. At this point, immediately after the driving is switched to the low-heat-load driving, the protrusion 552p temporarily grows and the lamp voltage Vla further decrease. However, thereafter, since the protrusion 552p to be formed is reduced in thickness and size, the lamp voltage Vla increases.

As explained above, according to this embodiment, when the lamp voltage Vla excessively decreases in a relatively initial state or the like, it is possible to increase the lamp voltage Vla and suppress the lamp voltage Vla from becoming excessively low while stably forming the protrusion 552p. Therefore, it is easy to maintain the lamp voltage Vla while suppressing deterioration of the discharge lamp 90 from being accelerated. As a result, it is possible to improve the life of the discharge lamp 90.

In some case, the lamp voltage Vla less easily increases and further decrease even if the low-heat-load driving in this embodiment is executed. On the other hand, according to this embodiment, when the lamp voltage Vla further continues to decrease even if the low-heat-load driving is executed, if the lamp voltage Vla is lower than the third voltage Vla3 lower than the second voltage Vla2, the high-heat-load driving is executed again. At this point, in this embodiment, the high-heat-load current HTB supplied to the discharge lamp 90 in the high-heat-load driving changes to the fifth high-heat-load current HT5, the ratio rt of the fifth alternating current period AC51 of which is larger than the ratio rt of the fourth high-heat-load current HT4. Therefore, it is possible to further increase the melting degree of the protrusion 552p. It is easier to increase the lamp voltage Vla.

In some case, the lamp voltage Vla less easily increases and further decreases even if the high-heat-load driving is executed again. On the other hand, according to this embodiment, when the lamp voltage Vla further continues to decrease even if the high-heat-load driving is executed again, if the lamp voltage Vla is lower than the fourth voltage Vla4 lower than the third voltage Vla3, the low-heat-load driving is executed again. At this point, in this embodiment, the low-heat-load current LTB supplied to the discharge lamp 90 in the low-heat-load driving changes to the fifth low-heat-load current LT5, the ratio rt of the fifth alternating current period AC51 of which is smaller than the ratio rt of the fourth low-heat-load current LT4. Therefore, it is possible to obtain action and effect equivalent to the action and effect obtained when the frequency f of the driving current I is further increased. Consequently, it is easier to form the protrusion 552p thin and small. It is easier to increases the lamp voltage Vla.

When the lamp voltage Vla still decreases even if the driving explained above is executed, it is possible to increase the lamp voltage Vla by further alternately performing the high-heat-load driving and the low-heat-load driving.

As explained above, according to this embodiment, when the lamp voltage Vla is lower than the first voltage Vla1, the driving is alternately switched in the order of the high-heat-load driving and the low-heat-load driving as the lamp voltage Vla decreases. Consequently, first, after the protrusion 552p is increased in thickness and size in the high-heat-load driving, it is possible to increase the lamp voltage Vla while stabilizing the shape of the protrusion 552p by repeating the low-heat-load driving and the high-heat-load driving. As a result, it is possible to suitably suppress the lamp voltage Vla from excessively decreasing irrespective of fluctuation of the discharge lamp 90.

If a difference between heat loads of the high-heat-load current HTB and the low-heat-load current LTB is excessively large, when the low-heat-load current LTB shifts to the high-heat-load current HTB, the protrusion 552p sometimes easily disappears.

On the other hand, according to this embodiment, the ratio rt of the fifth alternating current period AC51 of the high-heat-load current HTB increases stepwise from the fourth high-heat-load current HT4 toward the sixth high-heat-load current HT6. The ratio rt of the fifth alternating current period AC51 of the low-heat-load current LTB decreases stepwise from the fourth low-heat-load current LT4 toward the sixth low-heat-load current LT6. Consequently, the ratio rt of the fifth alternating current period AC51 is relatively smaller in the high-heat-load current HTB provided when the lamp voltage Vla is high. The ratio rt of the fifth alternating current period AC51 is relatively larger in the low-heat-load current LTB provided when the lamp voltage Vla is high. Therefore, in a stage when the lamp voltage Vla starts to decrease from the first voltage Vla1, a difference between changes of the heat loads can be set relatively small. Thereafter, the difference can be gradually increased as the lamp voltage Vla decreases. Consequently, it is possible to suitably apply a heat load to the first electrode 92 and suppress the lamp voltage Vla from excessively decreasing while suppressing the protrusion 552p from disappearing.

According to this embodiment, the control section 40 changes the length t4 of the fourth alternating current period AC4 to change the ratio rt of the fifth alternating current period AC51. Therefore, it is possible to change an interval for providing the fifth alternating current period AC51. Consequently, in the high-heat-load driving, it is possible to reduce the interval for providing the fifth alternating current period AC51 while reducing the length t4 of the fourth alternating current period AC4 and increasing the ratio rt of the fifth alternating current period AC51. Consequently, in the high-heat-load driving, it is possible to further increase the heat load applied to the first electrode 92. In the low-heat-load driving, it is possible to increase the interval for providing the fifth alternating current period AC51 while increasing the length t4 of the fourth alternating current period AC4 and reducing the ratio rt of the fifth alternating current period AC51. Consequently, in the low-heat-load driving, it is possible to further reduce the heat load applied to the first electrode 92. Therefore, it is easy to suitably increase a difference between a heat load in the high-heat-load driving and a heat load in the low-heat-load driving. It is easier to maintain the lamp voltage Vla.

According to this embodiment, the fourth alternating current period AC4 includes a plurality of frequency periods. Therefore, in the fourth alternating current period AC4, it is possible to change a heat load applied to the first electrode 92. Consequently, it is possible to increase a stimulus due to the heat load applied to the first electrode 92 in the fourth alternating current period AC4. It is possible to further grow the protrusion 552p.

As explained above, in the low power mode in which the driving power Wd is relatively smaller, the protrusion 552p more easily grows and the lamp voltage Vla more easily decreases. In the low power mode, the protrusion 552p is more easily reduced in thickness and size. Therefore, the effect of this embodiment explained above can be obtained particularly greatly in the low power mode.

According to this embodiment, as the driving power Wd is smaller, the ratio rt of the fifth alternating current period AC51 in the high-heat-load current HTB is larger. Therefore, in the low power mode in which a decrease of the lamp voltage Vla more easily occurs, it is easier to increase a melting degree of the protrusion 552p and increase the lamp voltage Vla. Consequently, it is possible to further suppress the lamp voltage Vla from excessively decreasing.

According to this embodiment, as the driving power Wd is smaller, the ratio rt of the fifth alternating current period AC51 in the low-heat-load current LTB is smaller. Therefore, in the low power mode in which a decrease of the lamp voltage Vla more easily occurs, it is easier to increase a ratio of the third alternating current period AC31, form the protrusion 552p thin and small, and increase the lamp voltage Vla. Consequently, it is possible to further suppress the lamp voltage Vla from excessively decreasing.

When the driving power Wd is relatively large, the ratio rt of the fifth alternating current period AC51 in the high-heat-load current HTB is relatively small and the ratio rt of the fifth alternating current period AC51 in the low-heat-load current LTB is relatively large. When the driving power Wd is relatively large, since the heat load applied to the first electrode 92 is large, if the ratio rt of the fifth alternating current period AC51 in the high-heat-load current HTB is set excessively large and the ratio rt of the fifth alternating current period AC51 in the low-heat-load current LTB is set excessively small, the protrusion 552p sometimes easily disappears. According to this embodiment, when the driving power Wd is relatively large, it is possible to set the ratio rt of the fifth alternating current period AC51 in the high-heat-load current HTB relatively small and set the ratio rt of the fifth alternating current period AC51 in the low-heat-load current LTB relatively large. Consequently, when the driving power Wd is relatively large, it is possible to suppress the protrusion 552p from disappearing.

Note that, in this embodiment, it is also possible to adopt a configuration and a method explained below.

In this embodiment, the control section 40 may change the length t51 of the fifth alternating current period AC51 to change the ratio rt of the fifth alternating current period AC51. In this case, in the high-heat-load driving, the control section 40 increases the length t51 of the fifth alternating current period AC51 and increases the ratio rt of the fifth alternating current period AC51. In the low-heat-load driving, the control section 40 reduces the length t51 of the fifth alternating current period AC51 and reduces the ratio rt of the fifth alternating current period AC51. With this configuration, in the fifth alternating current period AC51 in the high-heat-load driving, it is possible to further increase the heat load applied to the first electrode 92. In the fifth alternating current period AC51 in the low-heat-load driving, it is possible to further reduce the heat load applied to the first electrode 92. Consequently, it is easy to suitably increase a difference between a heat load in the high-heat-load driving and a heat load in the low-heat-load driving. It is easier to maintain the lamp voltage Vla.

In this embodiment, the control section 40 may change both of the length t4 of the fourth alternating current period AC4 and the length t51 of the fifth alternating current period AC51 to change the ratio rt of the fifth alternating current period AC51. With this configuration, it is possible to change the length t51 of the fifth alternating current period AC51 while changing the interval for providing the fifth alternating current period AC51. Therefore, it is easy to more suitably increase the difference between the heat load in the high-heat-load driving and the heat load in the low-heat-load driving. It is easier to maintain the lamp voltage Vla. An example of the lengths of the periods in this configuration is shown in Table 6.

TABLE 6

| Lamp voltage Vla [V] | Number of cycles of the fourth alternating current period AC4 | | | Number of cycles of the fifth alternating current period AC51 (frequency: 55 [Hz]) |
|---|---|---|---|---|
| | First frequency period P11 (frequency: 135 [Hz]) | Second frequency period P12 (frequency: 280 [Hz]) | Third frequency period P13 (frequency: 165 [Hz]) | |
| 60 or higher | 6 | 12 | 8 | 7 |
| 58 or higher, lower than 60 | 6 | 12 | 8 | 28 |
| 55 or higher, lower than 58 | 30 | 60 | 40 | 3 |
| 53 or higher, lower than 55 | 4 | 6 | 4 | 100 |
| 50 or higher, lower than 53 | 60 | 120 | 80 | 1 |
| 47 or higher, lower than 50 | 2 | 3 | 2 | 400 |
| Lower than 47 | 120 | 240 | 160 | 0 |

In Table 6, the length t4 of the fourth alternating current period AC4 is shown as the number of cycles of the fourth alternating current period AC4. The length t51 of the fifth alternating current period AC51 is shown as the number of cycles of the fifth alternating current period AC51. In the example shown in Table 6, in the fourth high-heat-load driving (58≤Vla<60), only the number of cycles of the fifth alternating current period AC51 is changed with respect to the steady driving (60≤Vla). In the other kinds of driving, both of the number of cycles (the length t4) of the fourth alternating current period AC4 and the number of cycles (the length t51) of the fifth alternating current period AC51 are changed with respect to the steady driving.

In this way, in a range in which the lamp voltage Vla is relatively high, only one of the length t4 of the fourth alternating current period AC4 and the length t51 of the fifth alternating current period AC51 is changed. In a range in which the lamp voltage Vla is relatively small, both of the length t4 of the fourth alternating current period AC4 and the length t51 of the fifth alternating current period AC51 are changed. Consequently, in the range in which the lamp voltage Vla is relatively high, it is relatively easy to reduce the heat load applied to the first electrode 92. In the range in which the lamp voltage Vla is relatively small, it is relatively easy to increase the heat load applied to the first electrode 92. Therefore, it is possible to suitably change the heat load applied to the first electrode 92 according to the decrease of the lamp voltage Vla.

In the above explanation, when the length t4 of the fourth alternating current period AC4 is changed and when the length t51 of the fifth alternating current period AC51 is changed, the numbers of cycles are respectively changed. However, the change of the length t4 of the fourth alternating current period AC4 and the length t51 of the fifth alternating current period AC51 is not limited to this. In this embodiment, the control section 40 may change the frequency f of the fourth alternating current Ia4 and change the length t4 of the fourth alternating current period AC4. In this embodiment, the control section 40 may change the frequency f of the fifth alternating current Ia51 and change the length t51 of the fifth alternating current period AC51. In this case, the numbers of cycles of the alternating current may not be changed or may be changed.

Specifically, when changing the frequency f of the fifth alternating current Ia51, the control section 40 sets the frequency f of the fifth alternating current Ia51 to a second frequency f2 when the lamp voltage Vla is equal to or higher than the first voltage Vla1. The control section 40 sets the frequency f of the fifth alternating current Ia51 to be lower than the second frequency f2 when the lamp voltage Vla is lower than the first voltage Vla1 and equal to or higher than the second voltage Vla2. The control section 40 sets the frequency f of the fifth alternating current Ia51 to be higher than the second frequency f2 when the lamp voltage Vla is lower than the second voltage Vla2.

With this configuration, it is possible to change a heat load applied to the first electrode 92 per unit time in the fifth alternating current period AC51. Therefore, it is easy to adjust the heat load applied to the first electrode 92.

Examples of changed values of both of a number of periods and the frequency f of the fourth alternating current Ia4 of the fourth alternating current period AC4 and a number of periods and the frequency f of the fifth alternating current Ia51 of the fifth alternating current period AC51 are shown in Table 7 and Table 8.

TABLE 7

| | Fourth alternating current period AC4 | | | | | |
|---|---|---|---|---|---|---|
| | First frequency period P11 | | Second frequency period P12 | | Third frequency period P13 | |
| Lamp voltage Vla [V] | Frequency [Hz] | Number of cycles | Frequency [Hz] | Number of cycles | Frequency [Hz] | Number of cycles |
| 60 or higher | 135 | 6 | 280 | 12 | 165 | 8 |
| 58 or higher, lower than 60 | 135 | 6 | 280 | 12 | 165 | 8 |
| 55 or higher, lower than 58 | 220 | 50 | 280 | 60 | 190 | 45 |
| 53 or higher, lower than 55 | 135 | 4 | 280 | 6 | 165 | 4 |

TABLE 7-continued

Fourth alternating current period AC4

| Lamp voltage Vla [V] | First frequency period P11 | | Second frequency period P12 | | Third frequency period P13 | |
|---|---|---|---|---|---|---|
| | Frequency [Hz] | Number of cycles | Frequency [Hz] | Number of cycles | Frequency [Hz] | Number of cycles |
| 50 or higher, lower than 53 | 380 | 170 | 520 | 225 | 420 | 200 |
| 47 or higher, lower than 50 | 135 | 2 | 280 | 3 | 165 | 2 |
| Lower than 47 | 420 | 375 | 640 | 550 | 520 | 500 |

TABLE 8

| | Fifth alternating current period AC51 | |
|---|---|---|
| Lamp Voltage Vla [V] | Frequency [Hz] | Number of cycles |
| 60 or higher | 90 | 11 |
| 58 or higher, lower than 60 | 65 | 33 |
| 55 or higher, lower than 58 | 135 | 7 |
| 53 or higher, lower than 55 | 42 | 76 |
| 50 or higher, lower than 53 | 220 | 4 |
| 47 or higher, lower than 50 | 33 | 240 |
| Lower than 47 | — | 0 |

Table 7 shows the number of periods and the frequency f of the fourth alternating current Ia4 of the fourth alternating current period AC4. Table 8 shows the number of periods and the frequency f of the fifth alternating current Ia51 of the fifth alternating current period AC51.

In the above explanation, as the high-heat-load current HTB, the three kinds of the high-heat-load current, that is, the fourth high-heat-load current HT4 to the sixth high-heat-load current HT6 are described. As the low-heat-load current LTB, the three kinds of the low-heat-load current, that is, the fourth low-heat-load current LT4 to the sixth low-heat-load current LT6 are described. However, the high-heat-load current HTB and the low-heat-load current LTB are not limited to this. Each of the high-heat-load current HTB and the low-heat-load current LTB may be two or less kinds or four or more kinds of the high-heat-load current and the low-heat-load current.

In this embodiment, the first high-heat-load ratio Hrt1, the second high-heat-load ratio Hrt2, and the third high-heat-load ratio Hrt3 may be the same value with one another. The first low-heat-load ratio Lrt1, the second low-heat-load ratio Lrt2, and the third low-heat-load ratio Lrt3 may be the same value with one another. When the high-heat-load ratios and the low-heat-load ratios are respectively the same, one kind of the high-heat-load current HTB and one kind of the low-heat-load current LTB are alternately provided as the lamp voltage Vla decreases in a range in which the lamp voltage Vla is lower than the first voltage Vla1. In this case as well, it is possible to suppress the lamp voltage Vla from excessively decreasing.

In the above explanation, the fourth alternating current period AC4 includes the three periods (the first frequency period P11 to the third frequency period P13) in which the frequencies f are different from one another. However, the fourth alternating current period AC4 is not limited to this. The fourth alternating current period AC4 may be a period in which an alternating current having one frequency f is supplied to the discharge lamp 90 or may be a period in which alternating current having four or more frequencies f different from one another are supplied to the discharge lamp 90. The fourth alternating current period AC4 may be different from the first alternating current period AC1 in the second embodiment.

In the above explanation, the frequency f of the fifth alternating current Ia51 is constant in the fifth alternating current period AC51. However, the fifth alternating current period AC51 is not limited to this. Like the fourth alternating current period AC4, the fifth alternating current period AC51 may include a plurality of periods in which the frequencies f of the fifth alternating current Ia51 are different from one another.

A pattern of a change in the ratio rt of the fifth alternating current period AC51 in the high-heat-load current HTB and a pattern of a change in the ratio rt of the fifth alternating current period AC51 in the low-heat-load current LTB corresponding to the driving power Wd are not particularly limited. The ratio rt of the fifth alternating current period AC51 in the high-heat-load current HTB and the ratio rt of the fifth alternating current period AC51 in the low-heat-load current LTB may change stepwise with respect to the driving power Wd. A relation between the ratio rt of the fifth alternating current period AC51 in the high-heat-load current HTB and the driving power Wd and a relation between the ratio rt of the fifth alternating current period AC51 in the low-heat-load current LTB may be represented by a quadratic function, an exponential function, or the like. Only one of the ratio rt of the fifth alternating current period AC51 in the high-heat-load current HTB and the ratio rt of the fifth alternating current period AC51 in the low-heat-load current LTB may change according to the driving power Wd. Both of the ratio rt of the fifth alternating current period AC51 in the high-heat-load current HTB and the ratio rt of the fifth alternating current period AC51 in the low-heat-load current LTB may not change according to the driving power Wd.

In this embodiment, as explained above in the second embodiment, after starting the projector 500, in a start-up period until the discharge lamp 90 is steadily lit, the control section 40 may determine driving to be executed.

Fifth Embodiment

A fifth embodiment is different from the fourth embodiment in a waveform of the driving current I. Note that, for example, components same as the components in the embodiments explained above are sometimes designated by the same reference numerals and signs to omit explanation of the components.

Figure 20:
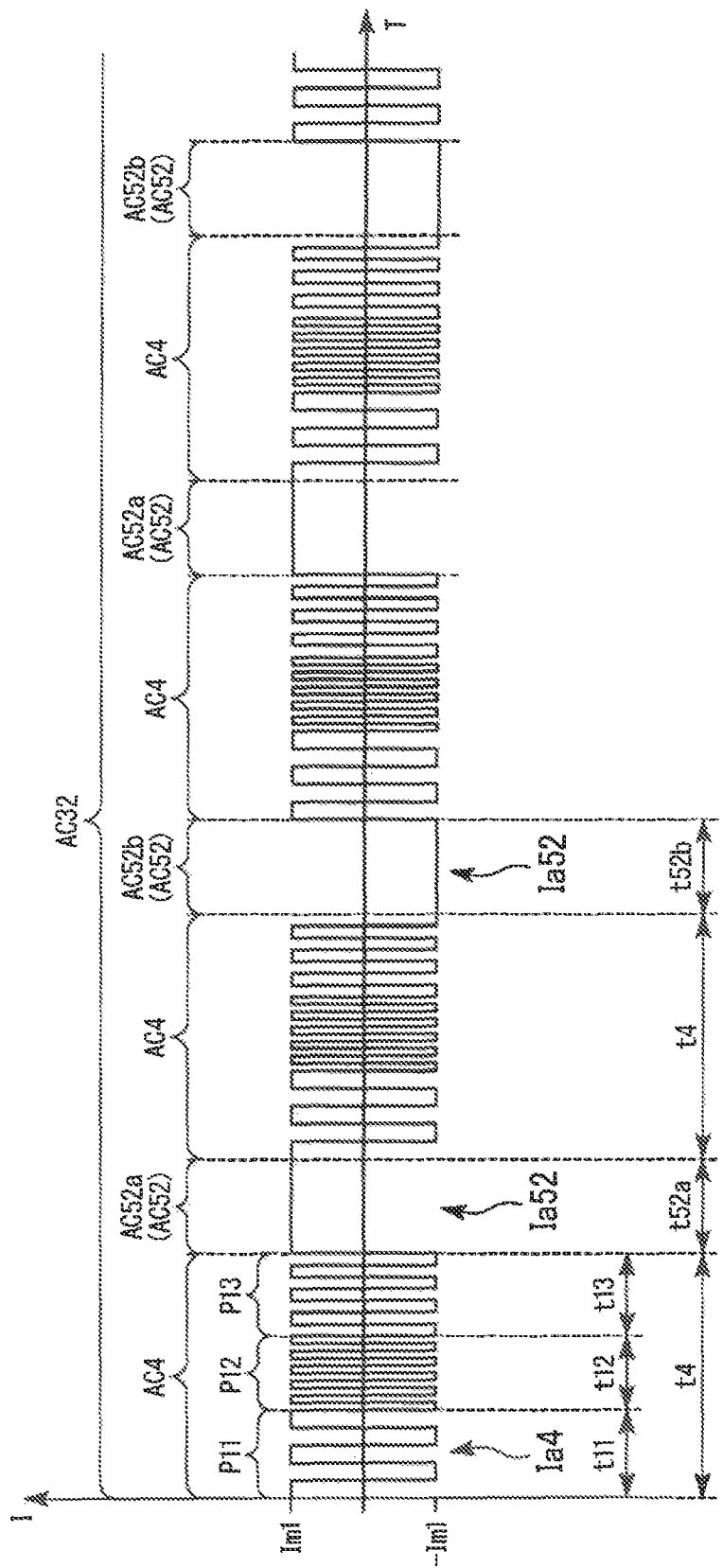
FIG. 20 is a diagram showing an example of a driving current in a fifth embodiment.

FIG. 20 is a diagram showing an example of the driving current I supplied to the discharge lamp 90 in this embodiment. In FIG. 20, the vertical axis indicates the driving current I and the horizontal axis indicates the time T. The driving current I is shown as positive when the driving current I is in a first polarity state and is shown as negative when the driving current I is in a second polarity state.

As shown in FIG. 20, in this embodiment, the control section 40 controls the discharge lamp driving section 230 such that a third alternating current period AC32 is provided.

The third alternating current period AC32 alternately includes the fourth alternating current period AC4 and a fifth alternating current period AC52.

In the fifth alternating current period AC52 in this embodiment, a fifth alternating current Ia52 in a half cycle is supplied to the discharge lamp 90. That is, in the fifth alternating current period AC52, the polarity of the fifth alternating current Ia52 is one of a first polarity in which the first electrode 92 is an anode and a second polarity in which the second electrode 93 is the anode. In this embodiment, the fifth alternating current period AC52 includes a first polarity period AC52a and a second polarity period AC52b.

The first polarity period AC52a is a period in which the fifth alternating current Ia52 in the half cycle having the first polarity is supplied to the discharge lamp 90. That is, length t52a of the first polarity period AC52a is the length of the half cycle of the fifth alternating current Ia52. In the example shown in FIG. 20, a value of the fifth alternating current Ia52 supplied to the discharge lamp 90 in the first polarity period AC52a is constant at Im1. The supply of the fifth alternating current Ia52 in the half cycle having the first polarity to the discharge lamp 90 in the first polarity period AC52a is equivalent to supply of a direct current having the first polarity to the discharge lamp 90.

The second polarity period AC52b is a period in which the fifth alternating current Ia52 in the half cycle having the second polarity is supplied to the discharge lamp 90. That is, length t52b of the second polarity period AC52b is the length of the half cycle of the fifth alternating current Ia52. In the example shown in FIG. 20, a value of the fifth alternating current Ia52 supplied to the discharge lamp 90 in the second polarity period AC52b is constant at −Im1. The supply of the fifth alternating current Ia52 in the half cycle having the second polarity to the discharge lamp 90 in the second polarity period AC52b is equivalent to supply of a direct current having the second polarity to the discharge lamp 90.

The frequency f of the fifth alternating current Ia52 supplied to the discharge lamp 90 in the first polarity period AC52a and the frequency f of the fifth alternating current Ia52 supplied to the discharge lamp 90 in the second polarity period AC52b are, for example, the same. Therefore, the length t52a of the first polarity period AC52a and the length t52b of the second polarity period AC52b are, for example, the same. The first polarity period AC52a and the second polarity period AC52b are alternately provided across the fourth alternating current period AC4.

In this embodiment, as in the fourth embodiment, the control section 40 changes the ratio rt of the fifth alternating current period AC52 as shown in FIGS. 17 and 18. Note that, when the length t52a of the first polarity period AC52a is changed and the ratio rt of the fifth alternating current period AC52 is changed, the frequency f of the fifth alternating current Ia52 is changed. Consequently, the length of the half cycle of the fifth alternating current Ia52 changes. As a result, the length t52a of the first polarity period AC52a changes. The same applies to the second polarity period AC52b.

According to this embodiment, as in the fourth embodiment, it is possible to improve the life of the discharge lamp 90.

According to this embodiment, in the fifth alternating current period AC52, the fifth alternating current Ia52 is supplied to the discharge lamp 90 only in the half cycle. Therefore, an electrode heated in one fifth alternating current period AC52 can be set to only one of the first electrode 92 and the second electrode 93. Consequently, in the fifth alternating current period AC52, it is possible to further increase a melting degree of the electrodes.

According to this embodiment, the first polarity period AC52a and the second polarity period AC52b are alternately provided across the fourth alternating current period AC4. Therefore, it is possible to suitably increase the melting degree in both of the first electrode 92 and the second electrode 93.

Note that, in this embodiment, a configuration and a method explained below can be adopted.

In this embodiment, in the driving current I, after the fourth alternating current period AC4 and the first polarity period AC52a are alternately repeated a plurality of times, the fourth alternating current period AC4 and the second polarity period AC52b may be alternately repeated a plurality of times.

In this embodiment, the frequency f of the fifth alternating current Ia52 supplied to the discharge lamp 90 in the first polarity period AC52a and the frequency f of the fifth alternating current Ia52 supplied to the discharge lamp 90 in the second polarity period AC52b may be different from each other. In this case, the length t52a of the first polarity period AC52a and the length t52b of the second polarity period AC52b are different from each other.

Note that the lengths of the periods, the frequencies f of the alternating current supplied to the discharge lamp 90 in the periods, and the like explained in the second to fifth embodiments may be the same every time the periods are provided in each of the steady driving, the high-heat-load driving, and the low-heat-load driving, may change every time the periods are provided, or may cyclically change.

In the first to fifth embodiments, the first voltage Vla1 to the sixth voltage Vla6 used as thresholds of the switching of the periods may be common to all the embodiments or may be different for each of the embodiments.

In the embodiments, an example is explained in which the invention is applied to a transmission type projector. However, the invention can be applied to a reflection type projector as well. The "transmission type" means that a liquid crystal light valve including a liquid crystal panel is a type for transmitting light. The "reflection type" means that the liquid crystal light valve is a type for reflecting light. Note that the light modulating device is not limited to the liquid crystal panel or the like and may be a light modulating device including, for example, a micro-mirror.

In the embodiments, the example of the projector 500 including the three liquid crystal panels 560R, 560G, and 560B (the liquid crystal light valves 330R, 330G, and 330B) is explained. However, the invention can also be applied to a projector including only one liquid crystal panel and a projector including four or more liquid crystal panels.

The configurations explained in the embodiments above can be combined as appropriate as long as the configurations are not contradictory to one another.

The entire disclosure of Japanese Patent Application No.: 2016-058101, filed Mar. 23, 2016, No.: 2016-058105, filed Mar. 23, 2016 and No.: 2016-058106, filed Mar. 23, 2016 are expressly incorporated by reference herein.

What is claimed is:

1. A discharge lamp driving device comprising:
a discharge lamp driving section configured to supply a driving current to a discharge lamp including a first electrode and a second electrode;
a control section configured to control the discharge lamp driving section; and
a voltage detecting section configured to detect an inter-electrode voltage of the discharge lamp, wherein the control section is configured to supply the discharge lamp with:
  a driving current including a first alternating current when the inter-electrode voltage is equal to or higher than a first voltage,
  a driving current including a second alternating current having a frequency which is lower than a frequency of the first alternating current when the inter-electrode voltage is lower than the first voltage and equal to or higher than a second voltage lower than the first voltage, and
  a driving current including a third alternating current having a frequency which is higher than the frequency of the first alternating current when the inter-electrode voltage is lower than the second voltage.

2. The discharge lamp driving device according to claim 1,
  wherein the frequency of the second alternating current is a first low frequency lower than a first frequency of the first alternating current when the inter-electrode voltage is lower than the first voltage and is equal to or higher than the second voltage, and
  wherein the frequency of the second alternating current is a second low frequency lower than the first low frequency when the inter-electrode voltage is lower than a third voltage lower than the second voltage, and the control section supplies a driving current including the second alternating current having the second low frequency to the discharge lamp.

3. The discharge lamp driving device according to claim 2,
  wherein the frequency of the third alternating current is a first high frequency higher than the first frequency when the inter-electrode voltage is lower than the second voltage and equal to or higher than the third voltage, and
  wherein the frequency of the third alternating current is a second high frequency higher than the first high frequency when the inter-electrode voltage is lower than a fourth voltage lower than the third voltage, and the control section supplies a driving current including the third alternating current having the second high frequency to the discharge lamp.

4. The discharge lamp driving device according to claim 1, wherein the frequency of the second alternating current decreases, as driving power supplied to the discharge lamp is smaller.

5. The discharge lamp driving device according to claim 1, wherein the frequency of the third alternating current increases, as driving power supplied to the discharge lamp is smaller.

6. A discharge lamp driving device comprising:
  a discharge lamp driving section configured to supply a driving current to a discharge lamp including a first electrode and a second electrode;
  a control section configured to control the discharge lamp driving section; and
  a voltage detecting section configured to detect an inter-electrode voltage of the discharge lamp,
  wherein the control section is configured to alternately provide
    a first period including a first direct current period in which a direct current having a first polarity is supplied to the discharge lamp and a first alternating current period in which an alternating current is supplied to the discharge lamp and
    a second period including a second direct current period in which a direct current having a second polarity is supplied to the discharge lamp and a second alternating current period in which the alternating current is supplied to the discharge lamp,
  wherein length of a direct current period including the first direct current period and the second direct current period is a first length when the inter-electrode voltage is equal to or higher than a first voltage,
  wherein the length of the direct current period is larger than the first length when the inter-electrode voltage is lower than the first voltage and equal to or higher than a second voltage lower than the first voltage, and
  wherein the length of the direct current period is smaller than the first length when the inter-electrode voltage is lower than the second voltage.

7. The discharge lamp driving device according to claim 6,
  wherein the length of the direct current period is a first high-heat-load length larger than the first length when the inter-electrode voltage is lower than the first voltage and equal to or higher than the second voltage, and
  wherein the length of the direct current period is a second high-heat-load length larger than the first high-heat-load length when the inter-electrode voltage is lower than a third voltage lower than the second voltage.

8. The discharge lamp driving device according to claim 7,
  wherein the length of the direct current period is a first low-heat-load length smaller than the first length when the inter-electrode voltage is lower than the second voltage and equal to or higher than the third voltage, and
  wherein the length of the direct current period is a second low-heat-load length smaller than the first low-heat-load length when the inter-electrode voltage is lower than a fourth voltage lower than the third voltage.

9. The discharge lamp driving device according to claim 6, wherein the first direct current period and the second direct current period are alternately provided across the first alternating current period or the second alternating current period.

10. The discharge lamp driving device according to claim 6, wherein
  the first period includes a first biased period consisting of a plurality of the first direct current periods and a first opposite polarity period in which the direct current having the second polarity is supplied to the discharge lamp, the first opposite polarity period provided between the first direct current periods,
  the second period includes a second biased period consisting of a plurality of the second direct current periods and a second opposite polarity period in which the direct current having the first polarity is supplied to the discharge lamp, the second opposite polarity period provided between the second direct current periods,
  length of the first opposite polarity is smaller than length of the first direct current period and smaller than 0.5 ms, and
  length of the second opposite polarity period is smaller than length of the second direct current period and smaller than 0.5 ms.

11. The discharge lamp driving device according to claim 10,
  wherein when the inter-electrode voltage is lower than the first voltage and equal to or higher than the second voltage, at least one of a number of the first direct current periods included in the first biased period and a number of the second direct current periods included in the second biased period is larger than both a number of the first direct current periods included in the first biased period and a number of the second direct current periods included in the second biased period when the inter-electrode voltage is equal to or higher than the first voltage, and wherein when the inter-electrode voltage is lower than the second voltage, at least one of the number of the first direct current periods included in the first biased period and the number of the second direct current periods included in the second biased period is smaller than both the number of the first direct current periods included in the first biased period and the number of the second direct current periods included in the second biased period when the inter-electrode voltage is equal to or higher than the first voltage.

12. The discharge lamp driving device according to claim 6, wherein length of the direct current period when the length of the direct current period is larger than the first length increases, as driving power supplied to the discharge lamp is smaller.

13. The discharge lamp driving device according to claim 6, wherein length of the direct current period when the length of the direct current period is smaller than the first length decreases, as driving power supplied to the discharge lamp is smaller.

14. A discharge lamp driving device comprising:
a discharge lamp driving section configured to supply a driving current to a discharge lamp including a first electrode and a second electrode;
a control section configured to control the discharge lamp driving section; and
a voltage detecting section configured to detect an inter-electrode voltage of the discharge lamp,
wherein the control section is configured to provide a third alternating current period alternately including
a fourth alternating current period in which a fourth alternating current is supplied to the discharge lamp and
a fifth alternating current period in which a fifth alternating current having a frequency which is lower than a frequency of the fourth alternating current is supplied to the discharge lamp,
wherein a ratio of the fifth alternating current period in the third alternating current period is a first ratio when the inter-electrode voltage is equal to or higher than a first voltage,
wherein the ratio of the fifth alternating current period is larger than the first ratio when the inter-electrode voltage is lower than the first voltage and equal to or higher than a second voltage lower than the first voltage, and
wherein the ratio of the fifth alternating current period is smaller than the first ratio when the inter-electrode voltage is lower than the second voltage.

15. The discharge lamp driving device according to claim 14,
wherein the ratio of the fifth alternating current period is a first high-heat-load ratio larger than the first ratio when the inter-electrode voltage is lower than the first voltage and equal to or higher than the second voltage, and
wherein the ratio of the fifth alternating current period is a second high-heat-load ratio larger than the first high-heat-load ratio when the inter-electrode voltage is lower than a third voltage lower than the second voltage.

16. The discharge lamp driving device according to claim 15,
wherein the ratio of the fifth alternating current period is a first low-heat-load ratio smaller than the first ratio when the inter-electrode voltage is lower than the second voltage and equal to or higher than the third voltage, and
wherein the ratio of the fifth alternating current period is a second low-heat-load ratio smaller than the first low-heat-load ratio when the inter-electrode voltage is lower than a fourth voltage lower than the third voltage.

17. The discharge lamp driving device according to claim 14, wherein the control section changes the ratio of the fifth alternating current period by changing length of the fourth alternating current period.

18. The discharge lamp driving device according to claim 14, wherein the fourth alternating current period includes a plurality of periods in which frequencies of the fourth alternating current are different from one another.

19. The discharge lamp driving device according to claim 14, wherein the fifth alternating current in a half cycle is supplied to the discharge lamp in the fifth alternating current period.

20. The discharge lamp driving device according to claim 19,
wherein the fifth alternating current period includes a first polarity period in which the fifth alternating current in a half cycle having a first polarity is supplied to the discharge lamp and a second polarity period in which the fifth alternating current in a half cycle having a second polarity is supplied to the discharge lamp, and
wherein the first polarity period and the second polarity period are alternately provided across the fourth alternating current period.

21. The discharge lamp driving device according to claim 14,
wherein a frequency of the fifth alternating current is a second frequency when the inter-electrode voltage is equal to or higher than the first voltage,
wherein the frequency of the fifth alternating current is lower than the second frequency when the inter-electrode voltage is lower than the first voltage and equal to or higher than the second voltage, and
wherein the frequency of the fifth alternating current is higher than the second frequency when the inter-electrode voltage is lower than the second voltage.

22. The discharge lamp driving device according to claim 14, wherein a ratio of the fifth alternating current period when the ratio of the fifth alternating current period is larger than the first ratio increases, as driving power supplied to the discharge lamp is smaller.

23. The discharge lamp driving device according to claim 14, wherein a ratio of the fifth alternating current period when the ratio of the fifth alternating current period is smaller than the first ratio decreases, as driving power supplied to the discharge lamp is smaller.

24. A projector comprising:
a discharge lamp configured to emit light;
the discharge lamp driving device according to claim 1.
a light modulating device configured to modulate, according to an image signal, light emitted from the discharge lamp; and a projection optical system configured to project the light modulated by the light modulating device.

* * * * *